(12) United States Patent
Little et al.

(10) Patent No.: US 8,527,973 B2
(45) Date of Patent: *Sep. 3, 2013

(54) PARALLEL PROGRAMMING INTERFACE TO DYNAMICALY ALLOCATE PROGRAM PORTIONS

(75) Inventors: John N. Little, Sherborn, MA (US); Joseph F. Hicklin, Upton, MA (US); Jocelyn Luke Martin, Burwell (GB); Nausheen B. Moulana, Framingham, MA (US); Halldor N. Stefansson, Natick, MA (US); Loren Dean, Natick, MA (US); Roy E. Lurie, Wayland, MA (US); Stephen C. Johnson, Sudbury, MA (US); Penelope L. Anderson, Newton, MA (US); Michael E. Karr, Brookline, MA (US); Jason A. Kinchen, Winchester, MA (US)

(73) Assignee: The MathWorks, Inc., Natick, MA (US)

( * ) Notice: Subject to any disclaimer, the term of this patent is extended or adjusted under 35 U.S.C. 154(b) by 70 days.

This patent is subject to a terminal disclaimer.

(21) Appl. No.: 13/214,336

(22) Filed: Aug. 22, 2011

(65) Prior Publication Data

US 2012/0011347 A1 Jan. 12, 2012

Related U.S. Application Data

(63) Continuation of application No. 11/748,938, filed on May 15, 2007, now Pat. No. 8,010,954, which is a continuation-in-part of application No. 11/706,805, filed on Feb. 14, 2007, now Pat. No. 7,975,001.

(51) Int. Cl.
*G06F 9/45* (2006.01)

(52) U.S. Cl.
USPC .................. 717/149; 717/150; 717/155

(58) Field of Classification Search
USPC .............................. 717/149–155
See application file for complete search history.

(56) References Cited

U.S. PATENT DOCUMENTS

| | | | | |
|---|---|---|---|---|
| 5,293,631 A | * | 3/1994 | Rau et al. | ...... 717/154 |
| 5,355,492 A | | 10/1994 | Frankel et al. | |
| 5,485,612 A | | 1/1996 | Ota et al. | |
| 5,535,393 A | | 7/1996 | Reeve et al. | |

(Continued)

FOREIGN PATENT DOCUMENTS

| | | |
|---|---|---|
| WO | WO 93/15457 | 8/1993 |
| WO | WO 2006/032001 A2 | 3/2006 |
| WO | WO 2006/088669 A1 | 8/2006 |
| WO | WO 2007/016658 A1 | 2/2007 |

OTHER PUBLICATIONS

Wu et al, "Query optimization for massively parallel data processing", ACM, pp. 1-13, 2011.*

(Continued)

*Primary Examiner* — Anil Khatri
(74) *Attorney, Agent, or Firm* — Harrity & Harrity, LLP

(57) ABSTRACT

A computing device-implemented method includes receiving a program created by a technical computing environment, analyzing the program, generating multiple program portions based on the analysis of the program, dynamically allocating the multiple program portions to multiple software units of execution for parallel programming, receiving multiple results associated with the multiple program portions from the multiple software units of execution, and providing the multiple results or a single result to the program.

20 Claims, 37 Drawing Sheets

(56) References Cited

U.S. PATENT DOCUMENTS

| | | | |
|---|---|---|---|
| 5,586,325 A | 12/1996 | MacDonald et al. | |
| 5,596,732 A * | 1/1997 | Hosoi | 717/155 |
| 5,721,928 A | 2/1998 | Umehara et al. | |
| 5,768,594 A | 6/1998 | Blelloch et al. | |
| 6,106,575 A | 8/2000 | Hardwick | |
| 6,112,225 A | 8/2000 | Kraft et al. | |
| 6,223,281 B1 * | 4/2001 | Bird et al. | 712/241 |
| 6,374,403 B1 * | 4/2002 | Darte et al. | 717/161 |
| 6,463,457 B1 | 10/2002 | Armentrout et al. | |
| 6,665,862 B2 | 12/2003 | Isman | |
| 6,725,448 B1 | 4/2004 | Moriya et al. | |
| 6,829,760 B1 | 12/2004 | Bera | |
| 6,865,730 B1 | 3/2005 | Burke et al. | |
| 6,961,925 B2 | 11/2005 | Callahan et al. | |
| 6,963,917 B1 | 11/2005 | Callis et al. | |
| 7,055,142 B2 * | 5/2006 | Meredith et al. | 717/136 |
| 7,086,046 B2 * | 8/2006 | Barsness et al. | 717/152 |
| 7,103,628 B2 | 9/2006 | Neiman et al. | |
| 7,127,709 B2 | 10/2006 | Demsey et al. | |
| 7,134,073 B1 | 11/2006 | Fiedorowicz et al. | |
| 7,174,381 B2 | 2/2007 | Gulko et al. | |
| 7,254,806 B1 | 8/2007 | Yates et al. | |
| 7,305,666 B2 | 12/2007 | Burger et al. | |
| 7,313,788 B2 | 12/2007 | Ben-David et al. | |
| 7,418,698 B2 * | 8/2008 | Lapkowski | 717/149 |
| 7,475,393 B2 | 1/2009 | Essick et al. | |
| 7,493,606 B2 | 2/2009 | Morin | |
| 7,685,582 B2 * | 3/2010 | Haselden | 717/150 |
| 7,694,306 B2 * | 4/2010 | Minor et al. | 718/105 |
| 7,712,090 B2 * | 5/2010 | Stuefe | 717/149 |
| 7,770,161 B2 | 8/2010 | Mitran et al. | |
| 7,840,949 B2 * | 11/2010 | Schumacher et al. | 717/149 |
| 7,844,959 B2 * | 11/2010 | Isard | 717/149 |
| 7,849,451 B2 | 12/2010 | Palacz et al. | |
| 7,853,937 B2 | 12/2010 | Janczewski | |
| 7,975,001 B1 | 7/2011 | Stefansson et al. | |
| 8,108,845 B2 | 1/2012 | Little et al. | |
| 8,214,813 B2 * | 7/2012 | Harris et al. | 717/151 |
| 8,219,981 B2 * | 7/2012 | Aguilar et al. | 717/149 |
| 8,225,300 B1 * | 7/2012 | Webb et al. | 717/149 |
| 8,234,637 B2 * | 7/2012 | Ghosh-Roy et al. | 717/155 |
| 8,375,375 B2 * | 2/2013 | Ren et al. | 717/150 |
| 2002/0078125 A1 | 6/2002 | Ichinose et al. | |
| 2003/0014611 A1 | 1/2003 | Ferris | |
| 2003/0101023 A1 | 5/2003 | Shah et al. | |
| 2004/0098447 A1 | 5/2004 | Verbeke et al. | |
| 2004/0215829 A1 | 10/2004 | Hubbard et al. | |
| 2004/0243709 A1 | 12/2004 | Kalyanavarathan et al. | |
| 2005/0015437 A1 | 1/2005 | Strait | |
| 2005/0021795 A1 | 1/2005 | Kuroshima et al. | |
| 2006/0041859 A1 | 2/2006 | Vrancic et al. | |
| 2006/0059251 A1 | 3/2006 | Cunha et al. | |
| 2006/0212882 A1 | 9/2006 | Foti et al. | |
| 2007/0143248 A1 | 6/2007 | Uppala | |
| 2008/0022264 A1 | 1/2008 | Macklem et al. | |
| 2008/0201721 A1 | 8/2008 | Little et al. | |
| 2009/0006167 A1 | 1/2009 | Toussaint et al. | |
| 2009/0044179 A1 | 2/2009 | Luszczek et al. | |
| 2009/0044180 A1 | 2/2009 | Luszczek et al. | |
| 2009/0044196 A1 | 2/2009 | Stefansson et al. | |
| 2009/0044197 A1 | 2/2009 | Stefansson et al. | |
| 2009/0049435 A1 | 2/2009 | Luszczek et al. | |
| 2009/0119677 A1 | 5/2009 | Stefansson et al. | |
| 2009/0132867 A1 | 5/2009 | Stefansson et al. | |
| 2011/0035736 A1 | 2/2011 | Stefansson et al. | |
| 2011/0035737 A1 | 2/2011 | Stefansson et al. | |

OTHER PUBLICATIONS

Ganguly et al, "A framework for the parallel processing of datalog queries", ACM, pp. 143-152, 1990.*

Dewan et al, "Predictive dynamic load balancing of parallel and distributed rule and query processing", ACM, pp. 277-288, 1994.*

Gounaris et al, "Resources scheduliing for parallel query processing on computational grids", IEEE, pp. 1-6, 2004.*

Ismail et al., "Program based static allocation policies fro highly parallel computers," IEEE, pp. 61-68, 1995.

Kejariwal et al., "On the exploitation of loop level parallelism in embedded applications," ACM Trans. on embedded computing systems, vol. 8, No. 2, article 10, pp. 1-34, 2009.

Massen et al., "Efficient Java RMI for parallel programming," ACM Trans. on Prog. Lang. and Sys., vol. 23, No. 6, pp. 747-775, 2001.

Nieuwpoort et al, "Satin: A high level and efficient grid programming model," ACM Trans. Prog. Lang. and Sys., vol. 32, No. 3, article 9, pp. 1-39, 2010.

Norris et al., "An experimental study of several cooperative register allocation and instruction scheduling strategies", IEEE, pp. 169-179, 1995.

International Search Report and Written Opinion mailed Aug. 25, 2008 issued in corresponding international application No. PCT/US2008/062162, 14 pages.

Behboodian et al., "The Mathworks Distributed and Parallel Computing Tools for Signal Processing Applications," IEEE International Conference on Acoustics, Speech and Signal Processing, vol. IV, Apr. 2007, pp. 1185-1188.

Bartz et al., "Rendering and Visualization in Parallel Environments," IEEE Visualization 2001, tutorial 3, 51 pages.

Chen et al., "MATLAB*G: A Grid-Based Parallel MATLAB," htto://ntu-cg.ntu,edu.sg/Grid_competition/report/grid-9.pdf, print date Apr. 6, 2006, 6 pages.

Choy et al., "Parallel MATLAB: Doing it Right," Proceedings of IEEE, vol. 93, No. 2, Feb. 2005, 11 pages.

Travinin et al., "pMapper: Automatic Mapping of Parallel Matlab Programs," Proceedings of the Users Group Conference 2005, 8 pages.

Xue et al., "Implementation of a Grid Computation Toolkit for Design Optimisation with Matlab and Condor," Lecture Notes in Computer Science: Euro-Par 2003 Parallel Processing, vol. 2790, 2003, 9 pages.

Fernández, "Resource Management for Interactive Jobs in a Grid Environment," 2006 IEEE International Conference on Cluster Computing, pp. 1-10, 2006.

Kupczyk et al., "New Generation Environment for Grid Interactive MPI Applications," CrossGrid technical achievements, Amsterdam, retrieved online a http://desktop.psnc.pl/docs/pdf/md_ras_jss.pdf, 2005.

Reuther et al., "Technology Requirements for Supporting On-Demand Interactive Grid Computing," Proceedings of the HPCMP Users Group Conference, pp. 320-327, 2005.

Talwar et al., "An Environment for Enabling Interactive Grids," IEEE International Symposium on High Performance Distributed Computing (HPDC-12), pp. 1-10, 2003.

International Search Report for Application No. PCT/US2008/001921, dated Sep. 5, 2008.

Condor® Version 6.6.11 Manual, retrieved online at http://www.cs.wisc.edu/condor/manual/v6.6/condor-V6_6_11-Manual.pdf (2006).

Raman et al., "Policy Driven Heterogeneous Resource Co-Allocation with Gangmatching," Proceedings of the 12th IEEE International Symposium on High Performance Distributed Computing, pp. 80-89, 2003.

Roy et al., "Condor and Preemptive Resume Scheduling," Grid Resource Management: State of the Art and Future Trends, Klumer Academic Publishers, Jarek Nabrzyski, Ed., pp. 135-144, 2003.

Thain et al., "Distributed Computing in Practice: The Condor Experience," Concurrency: Pract. Exper., pp. 0-20, 2004.

Condor High Throughput Computing, "What is Condor?," retrieved online at http://www.cs.wisc.edu/condor/description.html, 2007.

Condor High Throughput Computing, "An Overview of the Condor System," retrieved online at http://www.cs.wisc.edu/condor/overview/, 2007.

Condor High Throughput Computing, "Top Five Myths About Condor," retrieved online at http://www.cs.wisc.edu/condor/myths.html, 2007.

Condor High Throughput Computing, "Condor Checkpointing," retrieved online at http://www.cs.wisc.edu/condor/checkpointing.html, 2007.

Condor High Throughput Computing. "Classified Advertisements," retrieved online at http://www.cs.wisc.edu/condor/classad/, 2007.
Condor High Throughput Computing. "Condor Standalone ClassAd Catalog," retrieved online at http://www.cs.wisc.edu/condor/catalog/, 2007.
Condor High Throughput Computing, "Condor-G," retrieved online at http://www.cs.wisc.edu/condor/condorg/, 2007.
Condor High Throughput Computing, "Condor or Condor-G: Which one is right for me?," retrieved online at http://www.cs.wisc.edu/condor/condorg/versusG.html, 2007.
Condor High Throughput Computing, "DiskRouter," retrieved online at http://www.cs.wisc.edu/condor/diskrouter/, 2007.
Condor High Throughput Computing, "Condor Trigger," retrieved online at http://www.cs.wisc.edu/condor/trigger/, 2007.
Condor High Throughput Computing, "MW Overview," retrieved online at http://www.cs.wisc.edu/condor/mw/overview.html, 2007.
Condor, "Birdbath," retrieved online at http://www.cs.wisc.edu/condor/birdbath/, 2006.
Condor, "Bypass," retrieved online at http://www.cs.wisc.edu/condor/bypass/, 2007.
Condor, "Chirp," retrieved online at http://www.cs.wisc.edu/condor/chirp/, 2007.
Condor, "FTP-Lite," retrieved online at http://www.cs.wisc.edu/condor/ftp_lite/, 2007.
Condor, "The Grid Console," retrieved online at http://www.cs.wisc.edu/condor/bypasslexamples/grid-console/, 2007.
Condor, "Hawkeye," retrieved online at http://lwww.cs.wisc.edu/condorlhawkeye/, 2007.
Condor, "NeST: Network Storage, Flexible Commodity Storage Appliances," retrieved online at http://www.cs.wise.edu/condorlnest/, 2007.
Condor, "STORK: A Scheduler for Data Placement Activities in the Grid," retrieved online at http://www.cs.wisc.edu/condor/stork/, 2007.
Condor, "Hunting for Wasted Computing Powder, New Software for Computing Networks Puts Idle PC's to Work," retrieved online at http://www.cs.wisc.edu/condor/doc/Wiscidea.html, 2007.
Frey et al., "Condor-G: A Computation Management Agent for Multi-Institutional Grids," retrieved online at http://www.cs.wisc.edu/condor/doc/condorg-hpdc10.pdf, 2007.
GCB: Generic Connection Brokering. retrieved online at http://www.cs.wisc.edu/-sschang/firewalllgcblindex.htm, 2007.
Geer, "Taking the Graphics Processor beyond Graphics," retrieved online at http://ieeexplore.ieee.org/iel5/2/32339/01510560.pdf?tp=&isnumber=&arnumber=1510560, 2005.
Goux et al., "Metacomputing and the Master-Worker Paradigm," retrieved online at http://citeseer.ist.psu.edu/cache/papers/cs/17913/ftp:zSzzSzinfo.mcs.anl.govzSzpubzSztech__reportszSzreportszSzP792.pdf/goux00metacomputing.pdf, 2000.
Kulkami, "An Intelligent framework for Master-Worker Applications in a dynamic Metacomputing Environment," retrieved online at http://209.85.165.104/search?q=cache:dcoAFCWtFzgJ:www.cs.wisc.edu/condor/mw/masters.doc+An+Intelligent+framework+for+Master-Worker+Applications+in+a+dynamic+Metammputing+ Environment&hl=en&ct=clnk&cd=1&gl=us, 2001.
Parker, Ann, "Built for Speed, Graphics Processors for General-Purpose Computing," retrieved online at http://72.14.209.104/search?q=cache:juEMGJAVMUsJ:www.llnl.gov/str/Novembe5/pdfs/11_05.3.
pdf+Built+for+Speed,+Graphics+Processors+for+General-Purpose+Computing,&hl=en&ct=clnk&cd=3&gl=us, 2005.
Tutorial: Luebke, "General-Purpose Computation on Graphics Hardware, GPGPU," SIGGRAPH 2004 retrieved online at http://www.gpgpu.org/s2005/slides13, 2005.
Tutorial: Thain, "Master-Worker Tutorial, Condor Week 2006," http://www.cs.wisc.edu/condor/CondoNVeek2006/presentations/thain_mw_tutorial.ppt, 2006.
Tutorial: Farrellee, "Developer APIs to Condor + A Tutorial on Condor's Web Service Interface," retrieved online at http://www.cs.wisc.edu/condor/CondoNVeek2006/presentations/farrellee_tannenba_APIs.ppt, 2006.
Wilson et al., "How Graphics Cards Work," retrieved online at http://computer.howstuffworks.com/graphics-card.htm, 2007.
U.S. Appl. No. 12/181,815 entitled "Client Program Executable on Multiple Heterogeneous Server Platforms", by Webb et al., 70 pages.

* cited by examiner

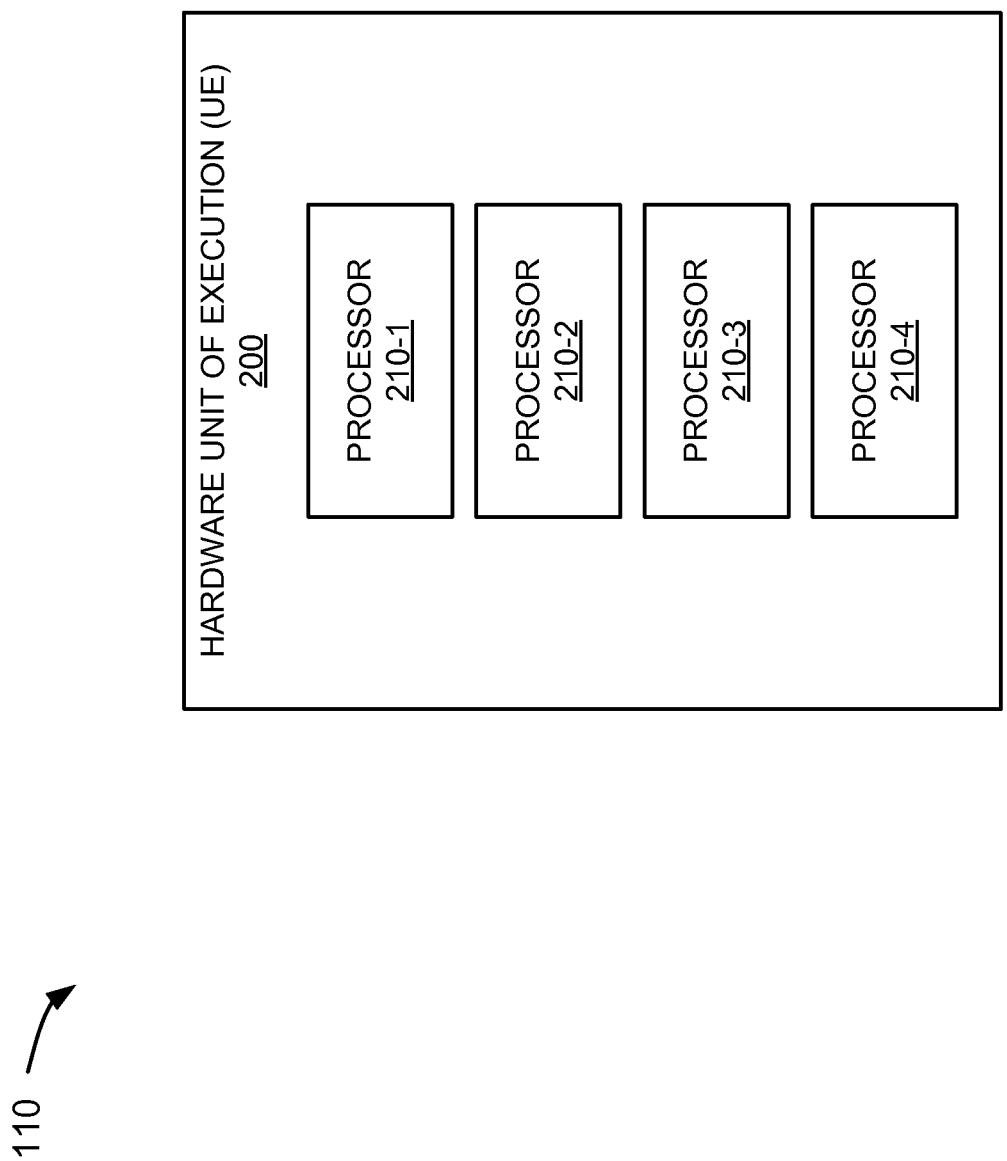

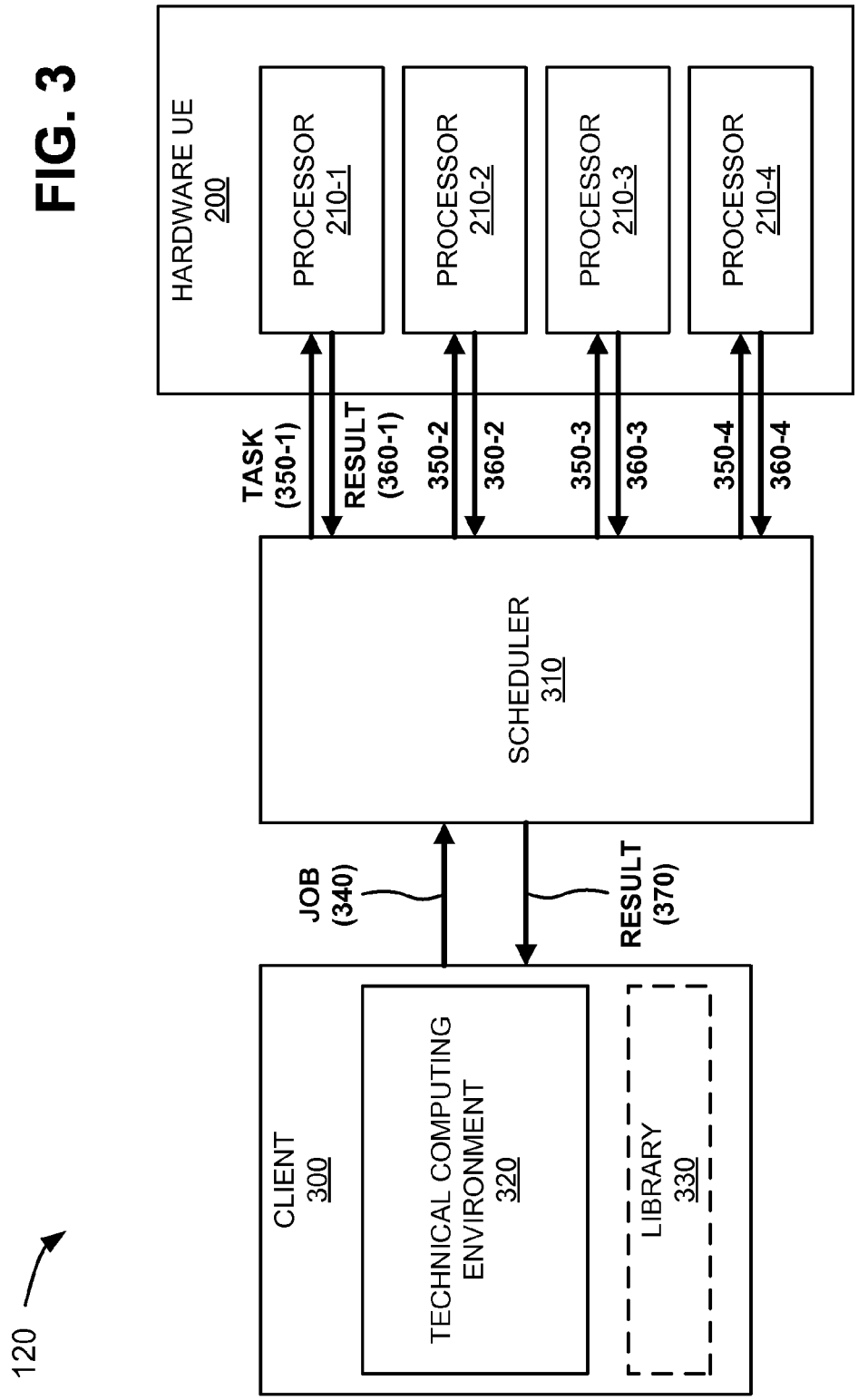

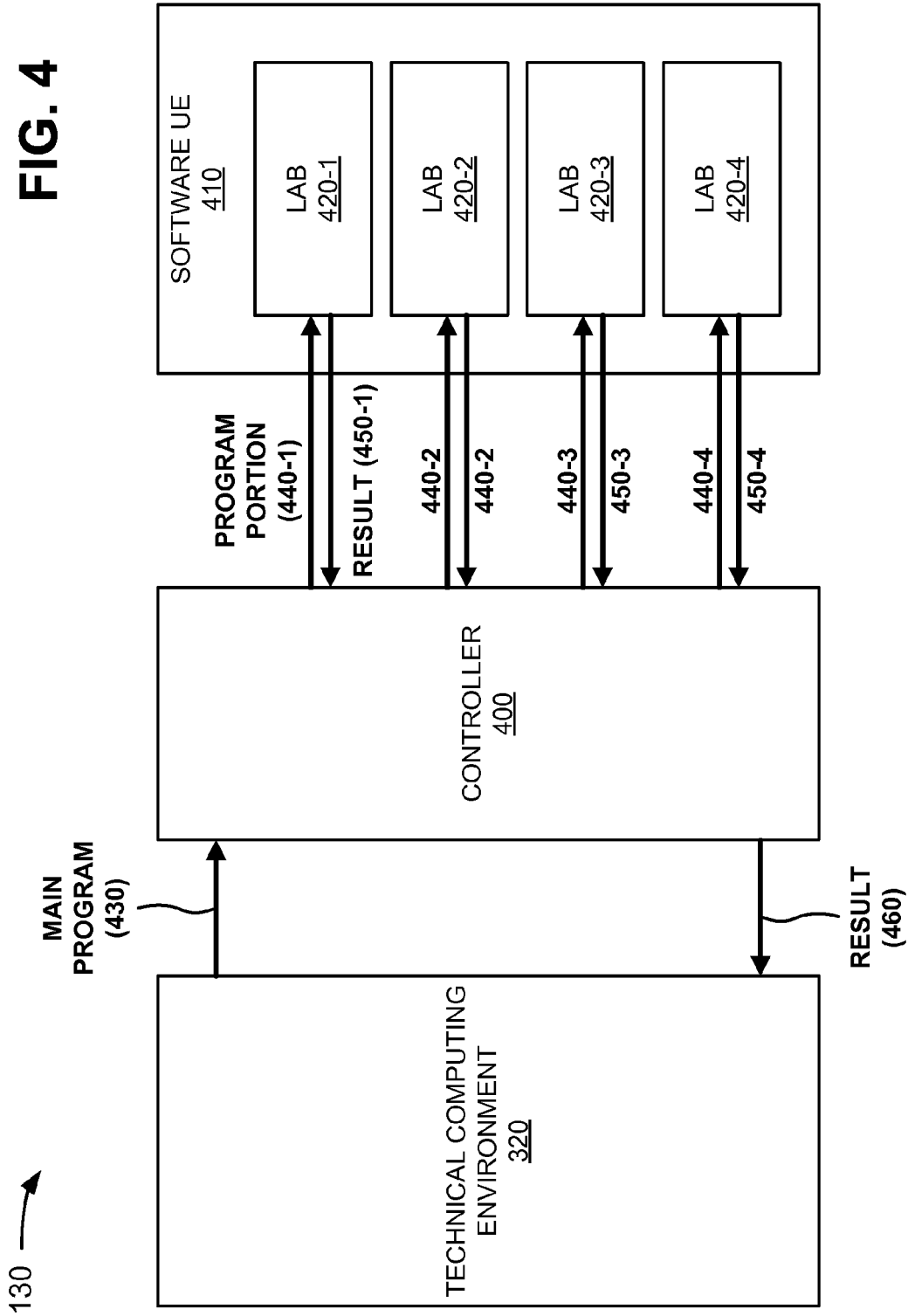

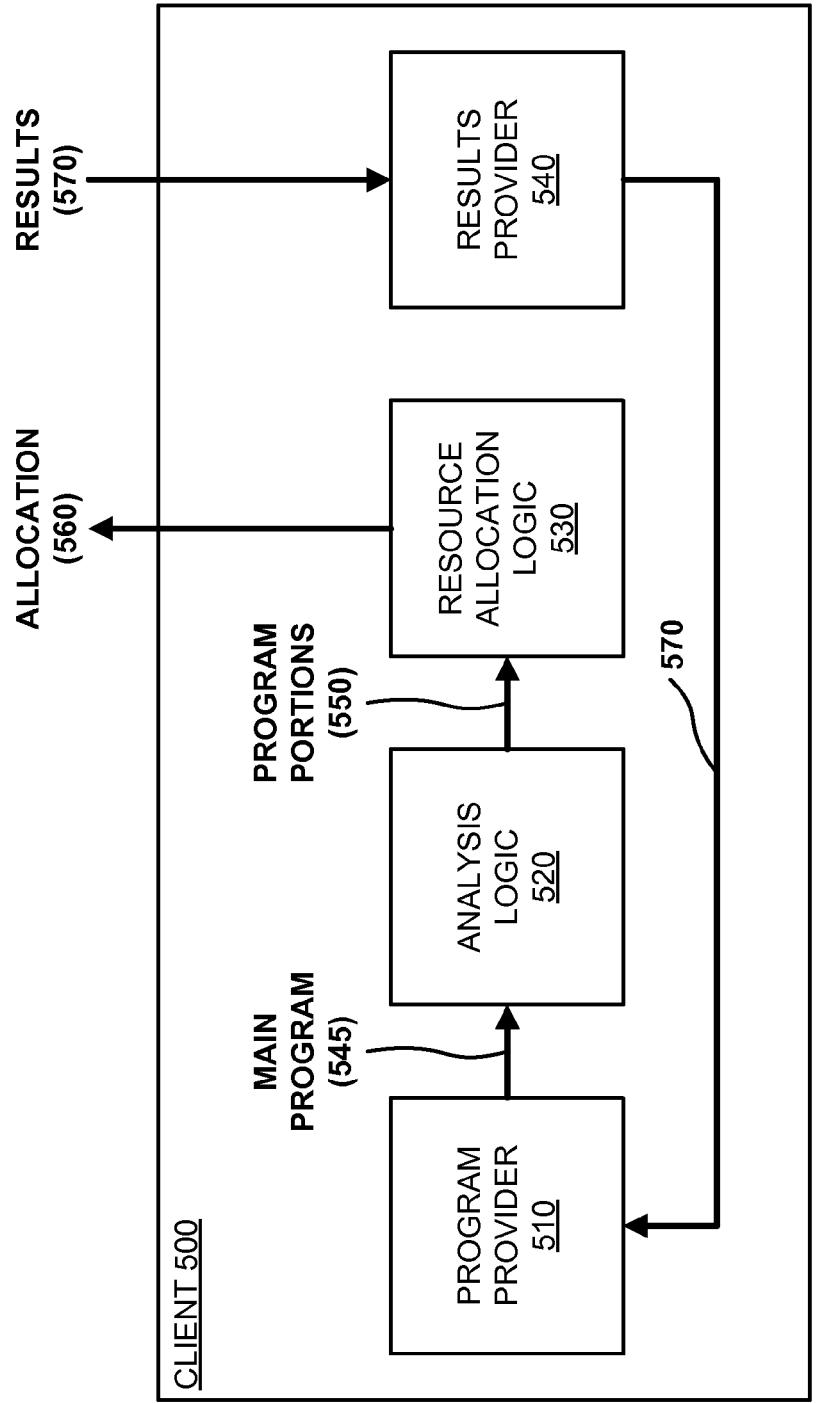

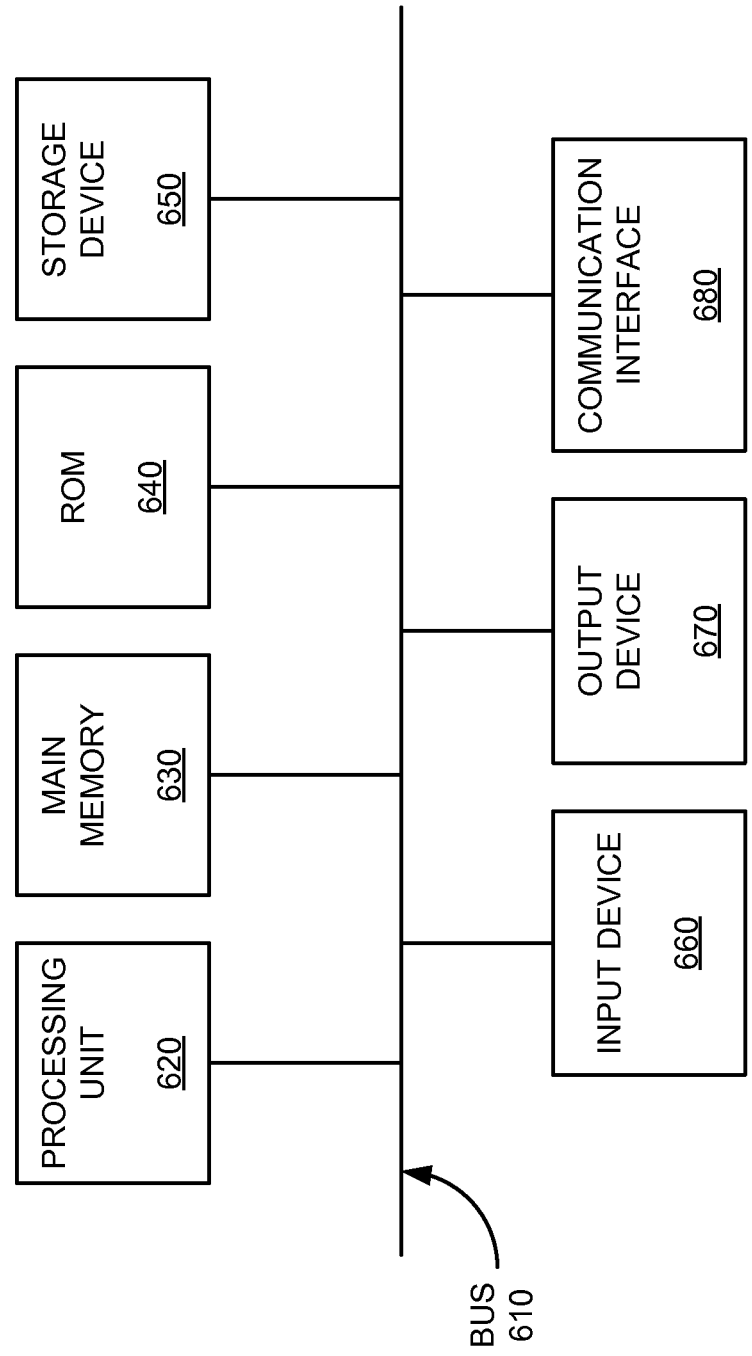

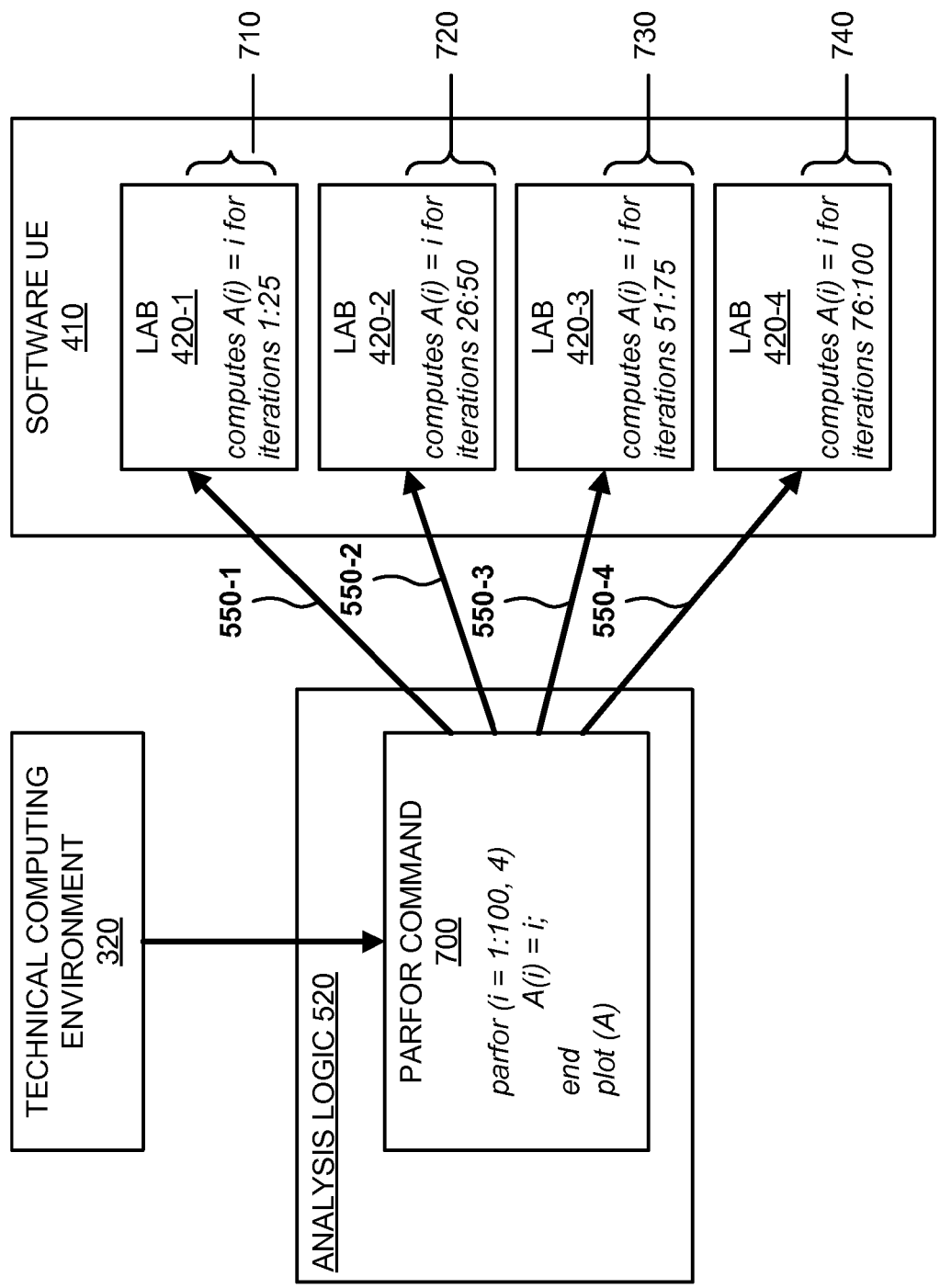

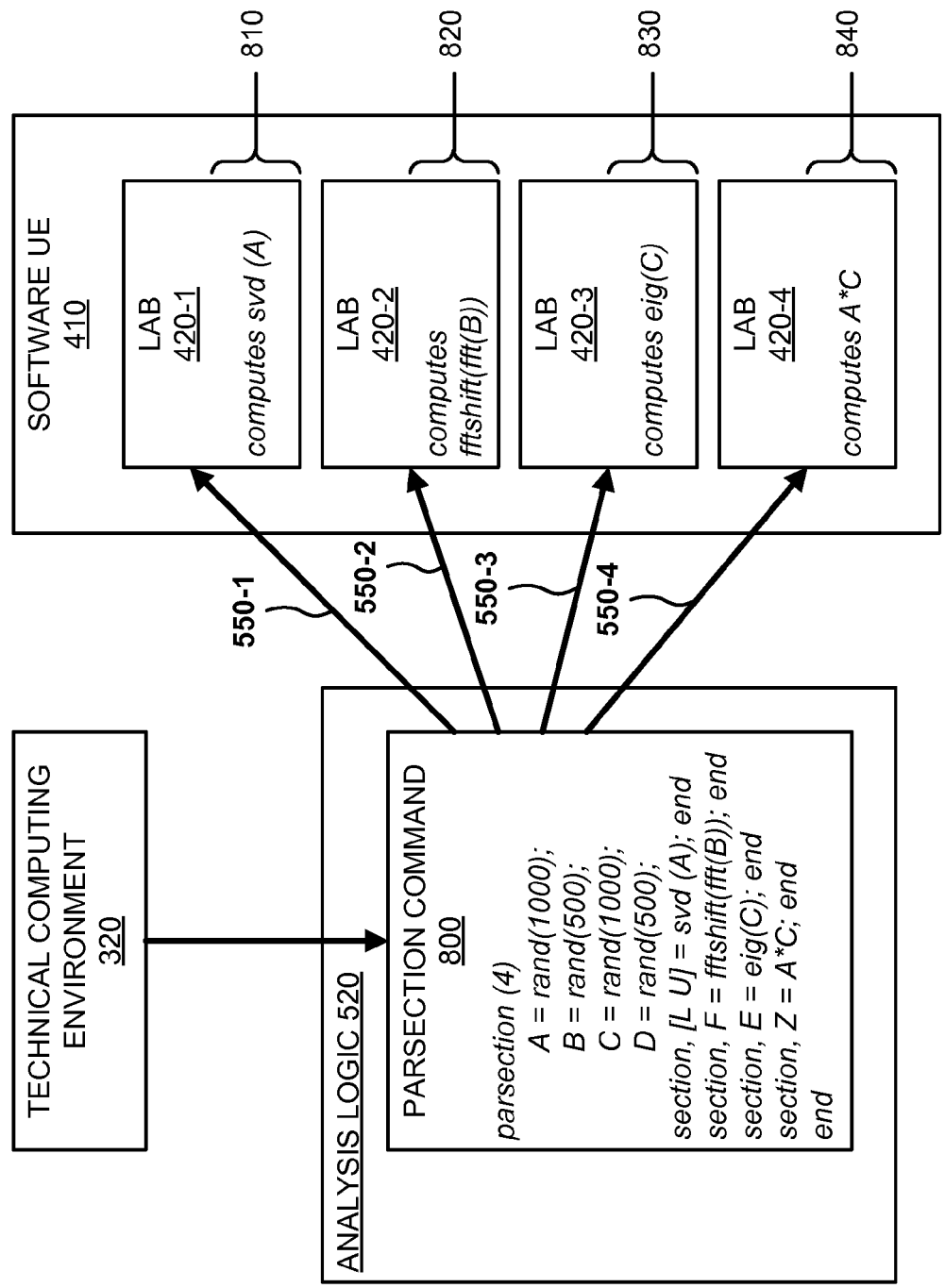

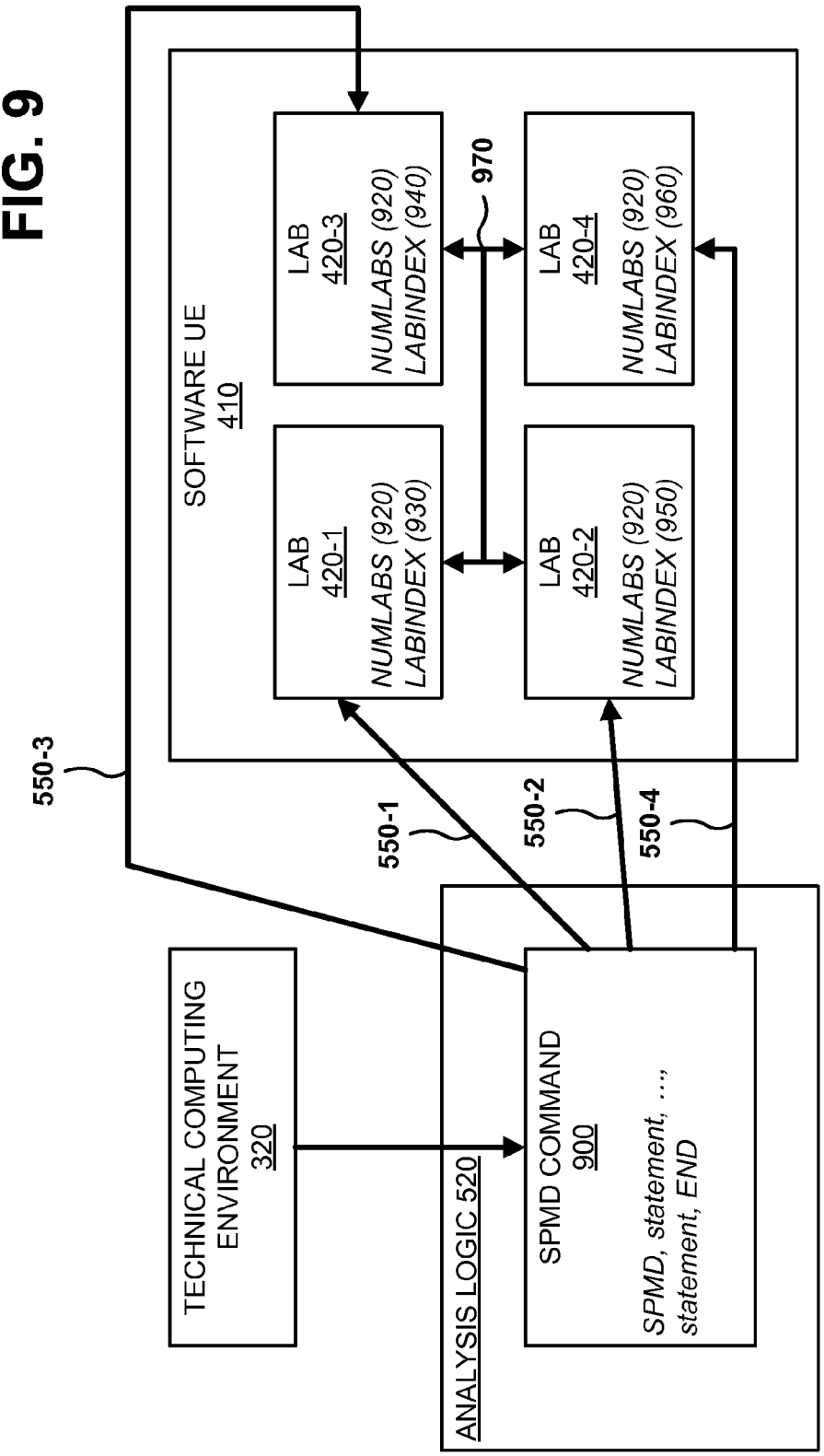

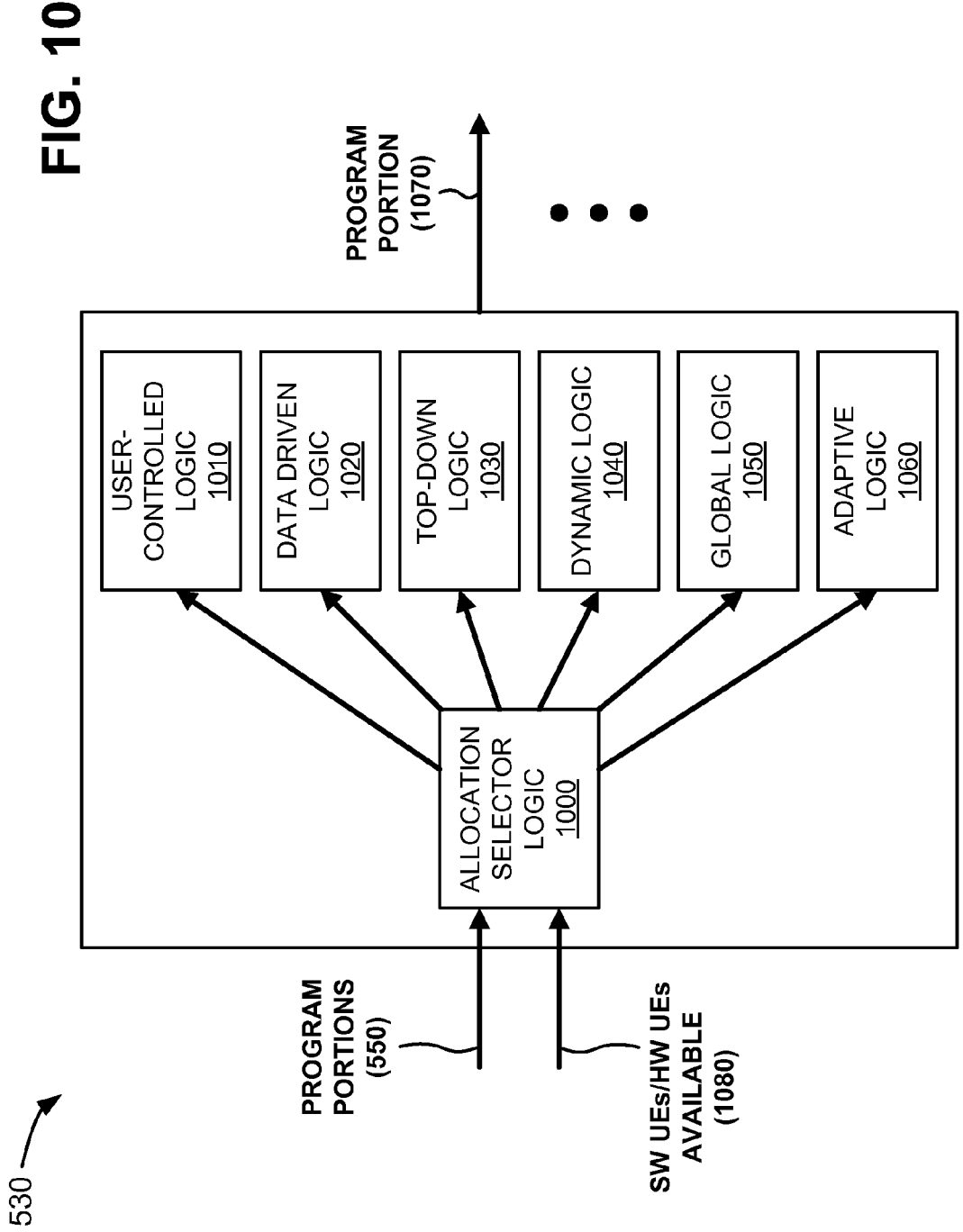

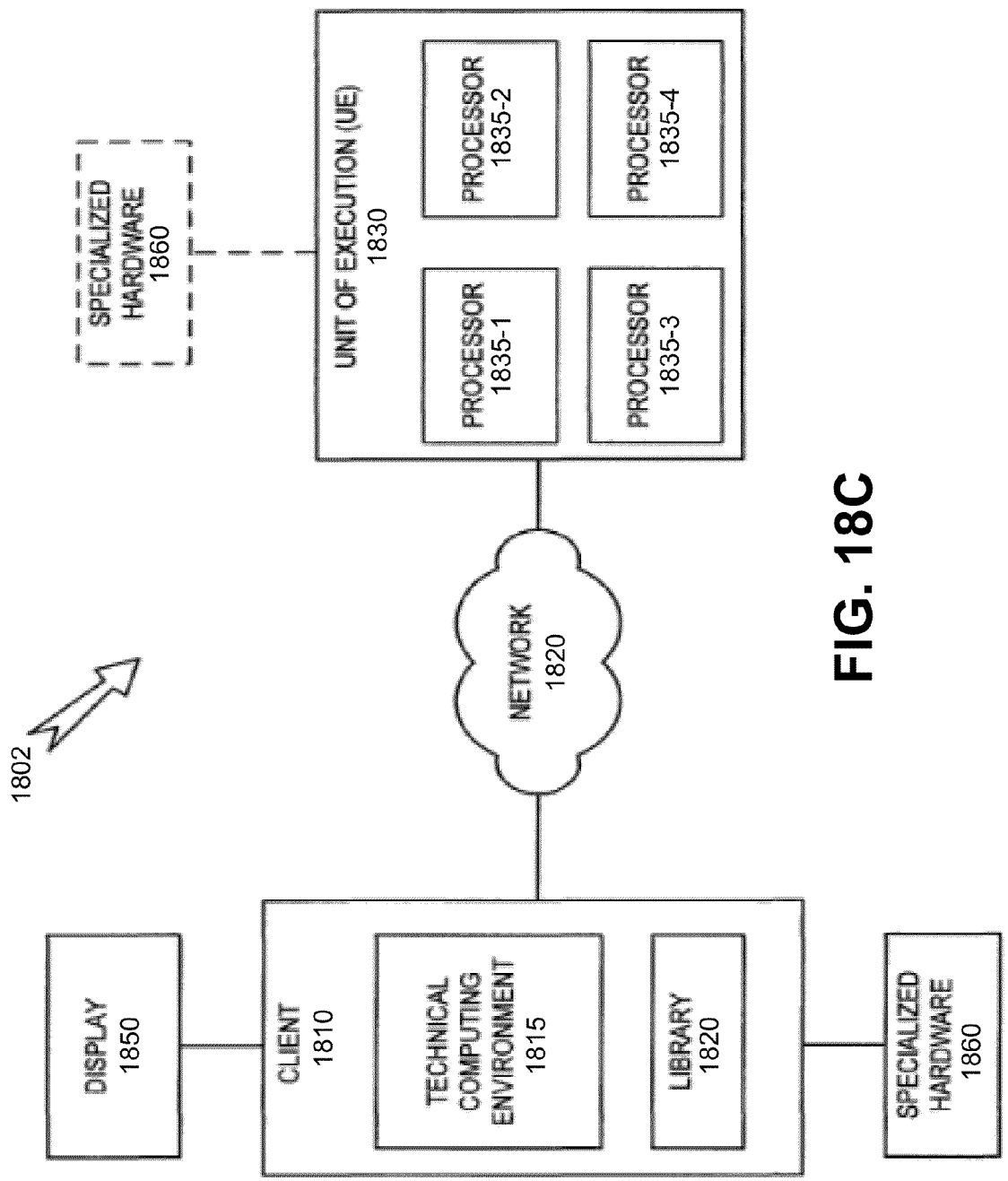

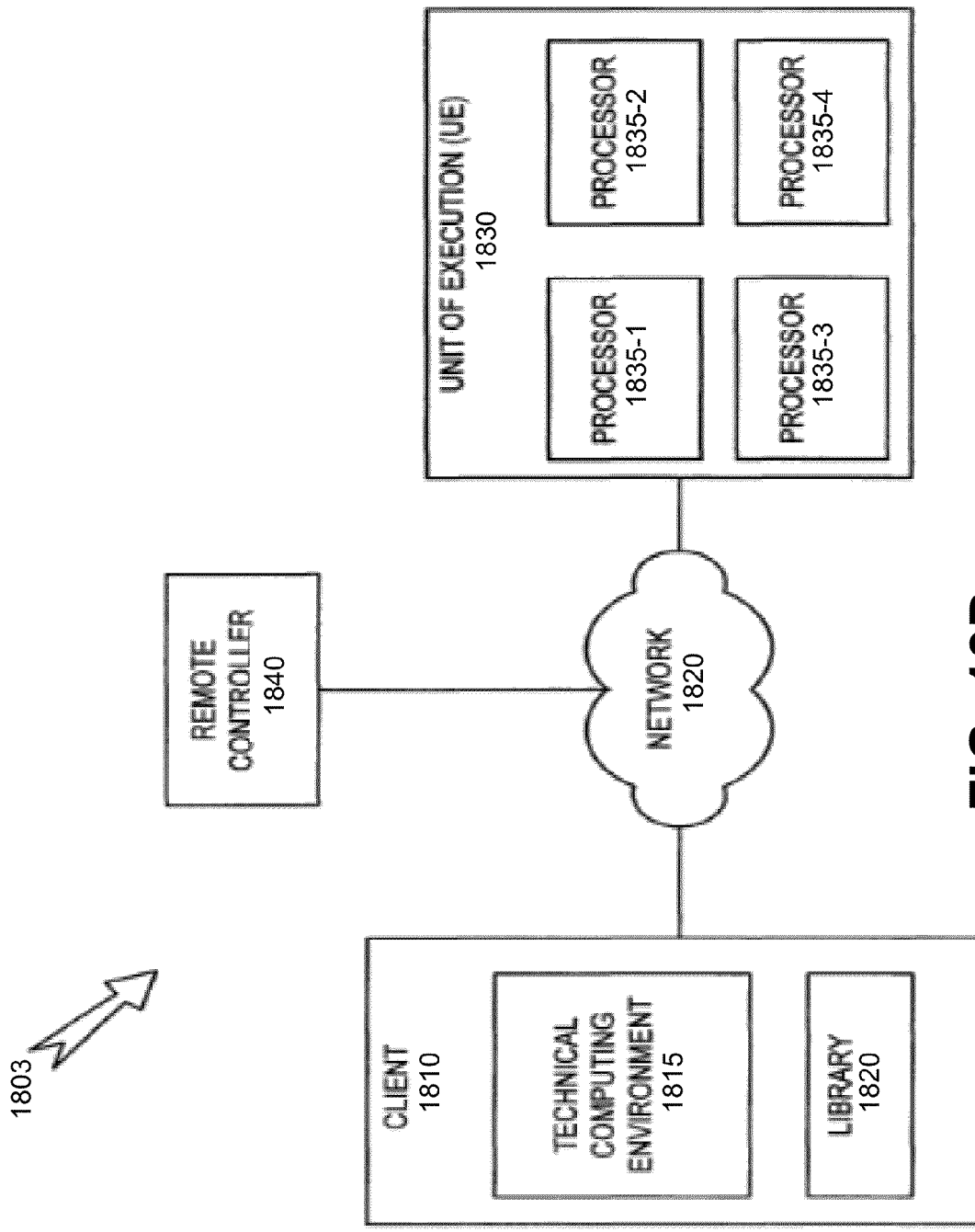

PARALLEL PROGRAMMING INTERFACE TO DYNAMICALY ALLOCATE PROGRAM PORTIONS

RELATED APPLICATIONS

This application is a continuation of U.S. patent application Ser. No. 11/748,938, filed May 15, 2007 now U.S. Pat. No. 8,010,954, which is a continuation-in-part of U.S. patent application Ser. No. 11/706,805, filed Feb. 14, 2007 (now U.S. Pat. No. 7,975,001), the entire contents of which are hereby incorporated by reference.

BACKGROUND

Closely-coupled processors or hardware resources will become widely available within the near future. Examples of such closely-coupled processors (or hardware resources) may include additional processors, threads in a particular processor, additional cores in a central processing unit, additional processors mounted on the same substrate or board, and/or such devices provided within computers connected by a network fabric into a cluster, a grid, or a collection of resources.

Certain computations (e.g., parallel processing or parallel programming) may benefit from the availability of such hardware resources. For example, a complex simulation may run faster if the simulation is divided into portions and the portions are simultaneously run on a number of processing devices in a parallel fashion. Parallel computing arrangements may include a controller that determines how an application should be divided and what application portions go to which parallel processors. For example, a host computer that is running a simulation may act as the controller for a number of parallel processors.

Parallel processors may receive instructions and/or data from the controller and may return a result to the controller. Conventional parallel programming language constructs do not nest or, if they can nest, provide an outermost construct with complete control of the allocation of hardware resources while executing inner constructs serially. Such an "outermost" strategy may degrade the performance of library routines executing such parallel constructs, without yielding corresponding benefits.

Conventional parallel programming environments either provide a very flexible framework or a restricted framework. The flexible framework allows a user to perform a variety of parallel programming actions, but such flexibility increases the probability of committing errors. The restricted framework does not allow the user to perform sufficient parallel programming actions. Examples of conventional attempts at parallel programming may include a distributed operating system (OS), an open MOSIX (a management system for Linux clusters and organizational grids), and/or Java™ threads. However, a distributed OS fails to provide dynamic, cross-platform, and interactive parallel programming. An open MOSIX may enable a user to migrate execution threads across multiple devices, but cannot appropriately deal with mode changes caused by parallel programming. Java™ threads are similar to an open MOSIX, but do not provide a parallel programming environment. Rather, Java™ threads represent just a building block towards a parallel programming environment.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 2 is an exemplary diagram of a hardware environment depicted in FIG. 1;

FIG. 3 is an exemplary diagram of a batch (or distributed computing) environment depicted in FIG. 1;

FIG. 4 is an exemplary diagram of a parallel programming environment of FIG. 1;

FIG. 5A is an exemplary diagram of functional components of a parallel programming interface depicted in FIG. 1;

FIG. 6 illustrates exemplary hardware components of a client and/or a web service depicted in FIGS. 5A and 5B;

FIG. 7 illustrates an exemplary parallel programming construct capable of being analyzed and transformed to parallel program portions by the analysis logic depicted in FIGS. 5A and 5B;

FIG. 8 illustrates another exemplary parallel programming construct capable of being analyzed and transformed to parallel program portions by the analysis logic depicted in FIGS. 5A and 5B;

FIG. 9 illustrates still another exemplary parallel programming construct capable of being analyzed and transformed to parallel program portions by the analysis logic depicted in FIGS. 5A and 5B;

FIG. 10 is an exemplary diagram of resource allocation logic of the parallel program interfaces depicted in FIGS. 5A and 5B;

FIG. 18C illustrates an exemplary system that includes a client coupled to a unit of execution via a network;

FIG. 18D illustrates an exemplary system that includes a remote controller operating with a client and a unit of execution;

DETAILED DESCRIPTION

Figure 1:
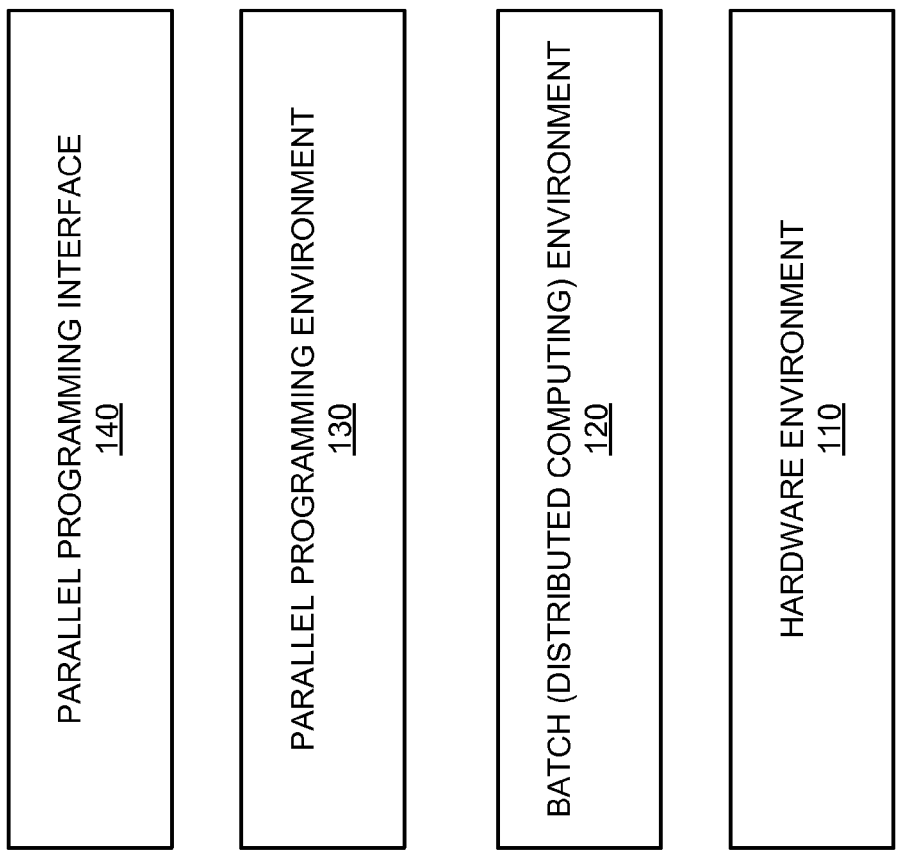
FIG. 1 is an exemplary diagram of an architectural overview in which implementations described herein may be practiced.

The following detailed description refers to the accompanying drawings. The same reference numbers in different drawings may identify the same or similar elements. Also, the following detailed description does not limit the invention.

Overview

Implementations described herein may provide a parallel programming interface for a program for execution. For example, in one implementation, the parallel programming interface may analyze the program, may generate one or more program portions based on the analysis of the program, and/or may specify a behavior of a segment and/or all of the one or more portions. The parallel programming interface may dynamically allocate the one or more portions to one or more software units of execution (UEs), and/or may forward the one or more software UEs to one or more hardware UEs for execution. The parallel programming interface may receive one or more results associated with the one or more portions from the software UEs, and may provide the one or more results to the program.

A "hardware unit of execution," as the term is used herein, is to be broadly interpreted to include a device (e.g., a hardware resource) that performs and/or participates in parallel programming activities. For example, a hardware unit of execution may perform and/or participate in parallel programming activities in response to a request and/or a task received from a client. A hardware unit of execution may perform and/or participate in substantially any type of parallel programming (e.g., task, data, and/or stream processing) using one or more devices. For example, in one implementation, a hardware unit of execution may include a single processing device that includes multiple cores and in another implementation, the hardware unit of execution may include a number of processors. Devices used in a hardware unit of execution may be arranged in substantially any configuration (or topology), such as a grid, ring, star, etc. A hardware unit of execution may support one or more threads (or processes) when performing processing operations.

A "software unit of execution," as the term is used herein, is to be broadly interpreted to include a software resource (e.g., a worker, a lab, etc.) that performs and/or participates in parallel programming activities. For example, a software unit of execution may perform and/or participate in parallel programming activities in response to a receipt of a program and/or one or more portions of the program. A software unit of execution may perform and/or participate in substantially any type of parallel programming using one or more hardware units of execution. A software unit of execution may support one or more threads (or processes) when performing processing operations.

"Parallel programming," as the term is used herein, is to be broadly interpreted to include any type of processing that can be distributed across two or more resources (e.g., software units of execution, hardware units of execution, processors, microprocessors, clusters, labs, etc.) and be performed at substantially the same time. For example, in one implementation, parallel programming may refer to task parallel programming where a number of tasks are processed at substantially the same time on a number of software units of execution. In task parallel programming, each task may be processed independently of other tasks executing at the same time (e.g., a first software unit of execution executing a first task may not communicate with a second software unit of execution executing a second task). In another implementation, parallel programming may refer to data parallel programming, where data (e.g., a data set) is parsed into a number of portions that are executed in parallel using two or more software units of execution. In data parallel programming, the software units of execution and/or the data portions may communicate with each other as processing progresses. In still another implementation, parallel programming may refer to stream parallel programming (also referred to as pipeline parallel programming). Stream parallel programming may use a number of software units of execution arranged in series (e.g., a line) where a first software unit of execution produces a first result that is fed to a second software unit of execution that produces a second result. Stream parallel programming may also include a state where task allocation may be expressed in a directed acyclic graph (DAG) or a cyclic graph with delays). Other implementations may combine two or more of task, data, or stream parallel programming techniques alone or with other types of processing techniques to form hybrid-parallel programming techniques.

A "parallel programming environment," as the term is used herein, is to be broadly interpreted to include any environment capable of performing parallel programming. For example, a parallel programming environment may include a dynamic number of processes provided on one or more hardware and/or software units of execution which may have several different control and data passing layers through which a current behavior of a part or a whole of the environment may be specified. In one implementation, a front-end application (e.g., a parallel programming interface) may interface with the parallel programming environment to provide one or more users with access to the parallel programming environment. In another implementation, the processes involved in the parallel programming environment may include processes associated with a technical computing environment.

A "technical computing environment (TCE)," as the term is used herein, is to be broadly interpreted to include any hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a TCE may include a dynamically-typed programming language (e.g., the M language) that can be used to express problems and/or solutions in mathematical notations. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, parallel programming, etc.). In another implementation, a TCE may provide these functions as block sets. In still another implementation, a TCE may provide these functions in another way, such as via a library, etc.

A TCE may be implemented as a text-based environment (e.g., MATLAB®; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Conventional distributed processing systems, such as parallel processing systems, may include uni-directional communication between a controller and a parallel processor (e.g., a computing grid). The uni-directional communication may allow the controller to send instructions and data to the parallel processor, but may not allow the parallel processor to send instructions, requests, etc., back to the controller. As a result, benefits associated with parallel processing may be limited.

For example, a controller may send a task to a parallel processing device based on an assumption that the parallel processing device is properly configured to execute the task. Assume, for sake of example, that the parallel processing device does not have enough memory to efficiently execute the task. In conventional implementations, the parallel processing device may not be able to request additional memory resources, such as requesting the use of excess memory on the controller, since the parallel processing device cannot participate in bi-directional communication with the controller.

Exemplary embodiments disclosed herein enable a controller and a unit of execution to participate in bi-directional communications. As used herein, unit of execution refers to a device that performs parallel processing activities. For example, a unit of execution may perform parallel processing activities in response to a request received from a client. A unit of execution may perform substantially any type of parallel processing, such as task, data, or stream processing, using one or more devices. For example in one implementation, a unit of execution may include a single processing device that includes multiple cores and in another implementation, the unit of execution may include a number of processors. Devices used in a unit of execution may be arranged in substantially any configuration (or topology), such as a grid, ring, star, etc.

Using the above example, an exemplary embodiment of a unit of execution can inform the controller (e.g., a client that sent a request to the unit of execution) that it does not have enough memory to efficiently perform a parallel processing activity on behalf of the client. In addition, the unit of execution can query the controller as to whether additional memory is available on the controller or elsewhere in a system (e.g., on another device networked to the controller). The unit of execution may further request use of excess memory on the controller or the other device. For example, the unit of execution may task the controller to perform an operation (e.g., information storage and/or retrieval operations) on behalf of the unit of execution. The controller may receive information from the unit of execution and may store the information for later use by the unit of execution. When the unit of execution is finished with parallel processing activities on behalf of the controller, the unit of execution may return a result to the controller.

Exemplary embodiments may use bi-directional communication between a controller and a unit of execution to identify and/or to take advantage of available resources (e.g., unused memory, unused processor cycles, etc.), specialized hardware (e.g., display devices, unique interfaces, etc.), specialized software (e.g., functions that may be needed by one device but that may not be present on that device, unique software applications, etc.), etc. Exemplary embodiments may further perform bi-directional communications within a single device (e.g., components operating within a single enclosure), among two devices connected via a link (e.g., a dedicated link, a bus, etc.), among two or more devices connected to a network (e.g., a wired network, a wireless network, etc.), etc.

Parallel processing, as used herein, refers to substantially any type of processing that can be distributed across two or more processing resources (e.g., microprocessors, clusters, labs, etc.). For example, in one embodiment, parallel processing may refer to task parallel processing where a number of tasks are processed at substantially the same time on a number of processing devices. In task parallel processing each task may be processed independently of other tasks executing at the same time (e.g., a first processor executing a first task may not communicate with a second processor executing a second task). In another embodiment, parallel processing may refer to data parallel processing, where data (e.g., a data set) is parsed into a number of portions that are executed in parallel using two or more processing devices. In data parallel processing, processing devices and/or data portions may communicate with each other as processing progresses. In still another embodiment, parallel processing may refer to stream parallel processing (also referred to as pipeline parallel processing). Stream parallel processing may use a number of processing devices arranged in series (e.g., a line) where a first processor produces a first result that is fed to a second processor that produces a second result. Stream parallel processing may be prevalent in certain fields, such as signal processing, image processing, etc. Other embodiments may combine two or more of task, data, or stream parallel processing techniques alone or with other types of processing techniques to form hybrid-parallel processing techniques without departing from the spirit of the invention.

Exemplary Architectural Overview

FIG. 1 is an exemplary diagram of an architectural overview 100 in which implementations described herein may be practiced. As illustrated, overview 100 may include a hardware environment 110, a batch (or distributed computing) environment 120, a parallel programming environment 130, and/or a parallel programming interface 140.

Hardware environment 110 may include one or more hardware resources that may be used to perform parallel programming. For example, in one implementation, hardware environment 110 may include one or more hardware units of execution. Further details of hardware environment 110 are provided below in connection with FIG. 2.

Batch environment 120 may provided a distributed computing environment for a job. For example, in one implementation, batch (or distributed computing) environment 120 may include a client that provides a job to a scheduler. The scheduler may distribute the job into one or more tasks, and may provide the tasks to one or more hardware units of execution and/or one or more processors. The hardware units of execution and/or processors may execute the tasks, and may provide results to the scheduler. The scheduler may combine the results into a single result, and may provide the single result to the client. Further details of batch environment 120 are provided below in connection with FIG. 3.

Parallel programming environment 130 may provide parallel programming for a main program. For example, in one implementation, parallel programming environment 130 may include a technical computing environment that provides a main program to a controller. The controller may provide portions of the program to one or more software units of execution and/or one more labs. The software units of execution and/or labs may execute the program portions, and may provide results to the controller. The controller may combine the results into a single result, and may provide the single result to the technical computing environment. Further details of parallel programming environment 130 are provided below in connection with FIG. 4.

Parallel programming interface 140 may include a frontend application (e.g., an application program interface (API)) that provides an interface for dynamically accessing, controlling, utilizing, etc. hardware environment 110, batch environment 120, and/or parallel programming environment 130. For example, in one implementation, parallel programming interface 140 may be in the form of a parallel programming constructs that permit users to express specific parallel workflows. In such an implementation, parallel programming interface 140 may include a program provider that provides a main program to analysis logic. The analysis logic may analyze the main program, may parse the main program into program portions, and may provide the program portions to resource allocation logic. Resource allocation logic may allocate the program portions to one or more software units of execution and/or hardware units of execution. The program portions may be executed, and results may be provided to the program provider. In another implementation, parallel programming interface 140 may include an object API where a user may specify how a program may be parallelized. Further details of parallel processing interface 140 are provided below in connection with FIGS. 5A-5C.

Although FIG. 1 shows exemplary components of architectural overview 100, in other implementations, architectural overview 100 may contain fewer, different, or additional components than depicted in FIG. 1.

Exemplary Hardware Environment

FIG. 2 is an exemplary diagram of hardware environment 110. As illustrated, hardware environment 110 may include a hardware unit of execution 200 with one or more processors 210-1, 210-2, 210-3, 210-4 (collectively, "processors 210").

Hardware UE 200 may include a hardware device that performs parallel programming. In one implementation, hardware UE 200 may perform parallel programming activities on behalf of another device. In another implementation, hardware UE 200 may perform parallel programming activities on behalf of itself or on behalf of a host of which hardware UE 200 is a part. Hardware UE 200 may perform parallel programming in a variety of ways. For example, hardware UE 200 may perform parallel programming activities related to task parallel programming, data parallel programming, stream parallel programming, etc. Hardware UE 200 may perform parallel programming using processing devices resident on UE 200 and/or using processing devices that are remote with respect to UE 200.

As further shown in FIG. 2, hardware UE 200 may include processors 210-1, 210-2, 210-3, and 210-4. Processors 210 may include hardware and/or software based logic that performs processing operations. Processors 210 may include substantially any type of processing device, such as a central processing unit (CPU), a microprocessor, a field programmable gate array (FPGA), an application specific integrated circuit (ASIC), a micro electrical mechanical switch (MEMS), a general purpose graphical processing unit (GPGPU), an optical processor, a biologic processor, etc. In one implementation, each processor 210-1 through 210-4 may include a single core processor or a multi-core processor. In another implementation, each processor 210-1 through 210-4 may include a single processing device or a group of processing devices, such as a processor cluster or a computing grid. In still another implementation, each processor 210-1 through 210-4 may include multiple processors that may be local or remote with respect each other, and may use one or more threads while processing. In a further implementation, each processor 210-1 through 210-4 may represent a single hardware UE.

Although FIG. 2 shows exemplary components of hardware environment 110, in other implementations, hardware environment 110 may contain fewer, different, or additional components than depicted in FIG. 2. For example, in one implementation, hardware environment 110 may include one or more of a bus, a processing unit, a main memory, a read-only memory (ROM), a storage device, an input device, an output device, and/or a communication interface. In still other implementations, one or more components of hardware environment 110 may perform the tasks performed by one or more other components of hardware environment 110.

Exemplary Batch Environment

FIG. 3 is an exemplary diagram of batch environment 120. As illustrated, batch environment 120 may include a client 300, a scheduler 310, and hardware UE 200 (including processors 210). Hardware 200 and processors 210 may perform the same or similar tasks as described above in connection with FIG. 2.

Client 300 may include one or more entities. An entity may be defined as a device, such as a personal computer, a personal digital assistant (PDA), a laptop, or another type of computation or communication device, a thread or process running on one of these devices, and/or an object executable by one of these devices. In an exemplary implementation, client 300 may include a device capable of sending information to or receiving information from another device, such as hardware UE 200. As shown in FIG. 3, client 300 may include a technical computing environment (TCE) 320 and a library 330 (optional). Other implementations of client 300 may contain fewer, different, or additional components than depicted in FIG. 3.

Technical computing environment (TCE) 320 may include any of the features described above in the definition of the term "technical computing environment."

Library 330 (optional) may include hardware and/or software based logic that may operate with TCE 320 to perform certain operations. For example, in one implementation, library 330 may include functions to perform certain operations (e.g., signal processing, image processing, parallel programming, data display, etc.) in a text-based environment. In another implementation, library 140 may include graphical representations (e.g., blocks, icons, images, etc.) to perform certain operations in a graphically-based environment (e.g., a gain block, a source block, a filter block, a discrete event generator block, etc.). In still other implementations, library 140 may perform other operations using text, graphics, etc.

Scheduler 310 may include hardware and/or software based logic to perform scheduling operations on behalf of a device. For example, scheduler 310 may perform operations to select and/or control parallel programming activities performed by hardware UE 200 on behalf of client 300. In one implementation, scheduler 310 may receive a job 340, and may distribute or divide job into tasks (e.g., tasks 350-1, 350-2, 350-3, and 350-4). Scheduler 310 may send tasks 350-1, 350-2, 350-3, and 350-4 to hardware UE 200 (e.g., to processor 210-1, 210-2, 210-3, and 210-4, respectively) for execution. Scheduler 310 may receive results from hardware UE 200 (e.g., results 360-1, 360-2, 360-3, and 360-4), may assemble the results into a single result 370, and may provide result 370 to client 300.

Although FIG. 3 shows exemplary components of batch environment 120, in other implementations, batch environment 120 may contain fewer, different, or additional components than depicted in FIG. 3. In still other implementations, one or more components of batch environment 120 may perform the tasks performed by one or more other components of batch environment 120.

Exemplary Parallel Programming Environment

FIG. 4 is an exemplary diagram of parallel programming environment 130. As illustrated, parallel programming environment 130 may include technical computing environment 320, a controller 400, and a software unit of execution 410. Technical computing environment 320 may include any of the features described above in the definition of the term "technical computing environment."

Controller 400 may include hardware and/or software based logic to perform controlling operations on behalf of a software program. For example, in one implementation, controller 400 may select and/or control parallel programming activities performed by software UE 410 on behalf of technical computing environment 320.

Software unit of execution (UE) 410 may include any of the features described above in the definition of the term "software unit of execution." In one implementation, software UE 410 may include one or more labs (e.g., labs 420-1, 420-2, 420-3, and 420-3, collectively referred to as "labs 420"). A "lab," as the term is used herein, is to be broadly interpreted to include a software resource that performs and/or participates in parallel programming activities. For example, a lab may perform and/or participate in parallel programming activities in response to a receipt of one or more portions of the program. In one implementation, a lab may be similar to a software unit of execution, except on a smaller scale. In other implementations, a lab may represent a single software unit of execution.

In an exemplary operation, technical computing environment 320 may provide a main program 430 to controller 400. Controller 400 may provide portions of program 430 (e.g., program portions 440-1, 440-2, 440-3, and 440-4, collectively referred to as "program portions 440") to labs 420-1, 420-2, 420-3, and 420-4, respectively, of software UE 410. Labs 420 may execute program portions 440, and may provide results to controller 400. For example, lab 420-1 may provide a result 450-1 to controller 400, lab 420-2 may provide a result 450-2 to controller 400, lab 420-3 may provide a result 450-3 to controller 400, and lab 420-4 may provide a result 450-4 to controller 400. Controller 400 may combine the results into a single result 460, and may provide single result 460 to technical computing environment 320.

Although FIG. 4 shows exemplary components of parallel programming environment 130, in other implementations, parallel programming environment 130 may contain fewer, different, or additional components than depicted in FIG. 4. In still other implementations, one or more components of parallel programming environment 130 may perform the tasks performed by one or more other components of parallel programming environment 130.

Exemplary Parallel Programming Interfaces

FIG. 5A is an exemplary diagram of functional components of parallel programming interface 140. As illustrated, parallel programming interface may include a client 500 that includes a variety of functional components, such as a program provider 510, analysis logic 520, resource allocation logic 530, and/or a results provider 540.

Client 500 may include one or more entities. An entity may be defined as a device, such as a personal computer, a personal digital assistant (PDA), a laptop, or another type of computation or communication device, a thread or process running on one of these devices, and/or an object executable by one of these devices. In an exemplary implementation, client 500 may include a device capable of providing a parallel programming interface, as described herein. Although not shown in FIG. 5A, client 500 may include a technical computing environment (e.g., TCE 320) and a library (e.g., library 330). Other implementations of client 500 may contain fewer, different, or additional components than depicted in FIG. 5.

Program provider 510 may include hardware and/or software based logic that provides one or more programs for execution. For example, in one implementation, program provider 510 may generate programs created using a technical computing environment, as defined above. As shown in FIG. 5, program provider 540 may provide a main program 545 to analysis logic 520.

Analysis logic 520 may receive main program 545, and may include hardware and/or software based logic that analyzes main program 545 and parses main program 545 into one or more program portions 550. In one implementation, analysis logic 520 may include language constructs (as described below in connection with FIGS. 7-9) that parse main program 545 into one or more program portions 550. As shown in FIG. 5, analysis logic 520 may provide program portions 550 to resource allocation logic 530. Further details of analysis logic 520 are provided below in connection with FIGS. 7-9.

Resource allocation logic 530 may receive program portions 550, and may include hardware and/or software based logic that dynamically allocates (as indicated by reference number 560) program portions 550 to one or more software UEs (e.g., software UE 410) for parallel execution. Although not shown in FIG. 5A, allocation 560 may be provided to one or more software UEs, and the software UEs may be executed by one or more hardware UEs (e.g., hardware UE 200) in a parallel programming manner. Alternatively and/or additionally, if no external resources (e.g., external software UEs or external hardware UEs) are available, allocation 560 may be executed via software UEs and/or hardware UEs of client 500. The software UEs may return results 570 of the execution of program portions 550 to results provider 540. Further details of resource allocation logic 530 are provided below in connection with FIGS. 10 and 11.

Results provider 540 may include hardware and/or software based logic that receives results 570 from the software UEs, and provides results 570 to program provider 510. In one implementation, results provider 540 may combine results 570 into a single result, and may provide the single result to program provider 510.

Client 500 (e.g., via analysis logic 520) may use different control and data passing layers through which it may specify the current behavior of a part or a whole of the parallel programming interface 140. For example, in one implementation, client 500 may use a message passing interface (MPI), a Transmission Control Protocol/Internet Protocol (TCP/IP), an Ethernet, and/or other interconnects and protocols for the control and data passing layers. In another implementation, client 500 may implement an MPI layer (and/or other data and control layers) on any standard non-guaranteed stream protocol. In still another implementation, client 500 may use two different layers, a cooperative communication layer (e.g., where processes may need to agree that a particular type of message is being sent) and an imperative communication layer or control layer (e.g., that may send unexpected messages to a recipient and may request the recipient to undertake an instruction contained in the message).

Client 500 (e.g., via analysis logic 520) may define a sub-group behavior for each of program portions 550. A "sub-group," as the term is used herein, may be broadly defined to include any part of the overall set of processes (e.g., main program 545 and/or program portions 550). For example, the sub-group behavior may relate to the parallel programming styles that may be employed on the group of program portions 550. However, client 500 may dynamically change the behavior of one or more of program portions 550 as code is executed for other program portions 550. In one implementation, client 500 may use the control layer to change the current state of a sub-group at any time, which may dynamically change the behavior of that portion of the group. For example, an application (e.g., main program 545) may include different phases (e.g., an input phase, an analysis phase, an output phase, etc.), and parallel programming needs may be different for each phase.

In one implementation, the sub-group behavior may include an unused state (e.g., the initial state of a process when it is not being used), a user-controlled UE state (e.g., if a user has acquired a process as a UE object), a task parallel state (e.g., an execution state used by parallel programming constructs), a single program, multiple data (SPMD) state (e.g., one or more processes may have a MPI ring between them with appropriate values for rank and size), a stream state (e.g., a state where task allocation may be expressed in a directed acyclic graph (DAG) or a cyclic graph with delays), etc. Each of program portions 550 may be in one of the above-mentioned states, and may request other tasks to be placed in a new state.

The sub-group behavior may include a variety of other states. For example, the sub-group behavior may include a delayed debugging state where a task may be executed and delayed in time with respect to another task (or delayed in lines of code). A delayed debugging state may permit system 900 to create a breakpoint for one task if another task experiences an error, and may enable a user to see why an error occurred. In another example, the sub-group behavior may include a release differences state that may execute one or more tasks associated with different releases of a product (e.g., different releases of TCE 320). This may permit behavior differences to be found between different releases of a product, and may permit users to undertake release compatibility studies.

In one implementation, some state information may be consistent across client 500. For example, a source of code may come from one device (e.g., client 500), and a file system associated with the source device may be used across client 500. In another implementation, some state information may be consistent across a sub-group of client 500 (e.g., labindex, numlabs, etc.).

In another implementation, the state information may be automatically transferred from client 500 to software unit of execution 410 and/or labs 420. For example, if a path is added to a technical computing environment (e.g., TCE 320) of client 500, then the path may be automatically added to all TCEs in the parallel environment (e.g., TCEs provided in labs 420). If the TCE of client 500 is instructed to reanalyze a piece of code (e.g., because a program changed), then all of the TCEs in the parallel environment may be instructed to reanalyze the piece of code For a sub-group, this may be similar to changing a parallel random number seed, or possibly clearing a particular workspace (e.g., one of labs 420) to ensure clean evaluation of some program.

In still another implementation, client 500 may be interactive in that resource allocation logic 530 may permit a user to dynamically control a current setup (e.g., via scripts, functions, command lines, etc.). Thus, client 500 and its configuration may change based on an actual analysis that the user may be currently undertaking. In another implementation, resource allocation logic 530 may be connected to one or more clusters of software UEs 410 and may use processes derived from each of the clusters, as well as client 500, to form the functional components of client 500. In still another implementation, client 500 may include devices having different architectures and/or operating systems (Oss) (i.e., client 500 may execute across multiple platforms). For example, client 500 may include a different architecture and/or OS than software UE 410.

In one exemplary implementation, main program 545 may be submitted in batch manner to a cluster (e.g., a cluster of software UEs 410 and/or a cluster of labs 420). For example, a user may interactively develop main program 545, and may save main program 545 in a file (e.g., an M file). A command may exist in main program 545 (e.g., in the M file) that may cause one lab (e.g., one of labs 420) in the cluster to act as a client where the execution of main program 545 initiates. Main program 545, for example, may use four labs 420 and a client (e.g., one of labs 420 acting as a client), may initiate on the client, and may utilize as many labs 420 as necessary to carry out execution. In another example, a special type of job may be created that creates a pool (or cluster) of labs, where one of the initiated processes of the job may act as the client, and rest of processes may be in the pool.

Figure 5B:
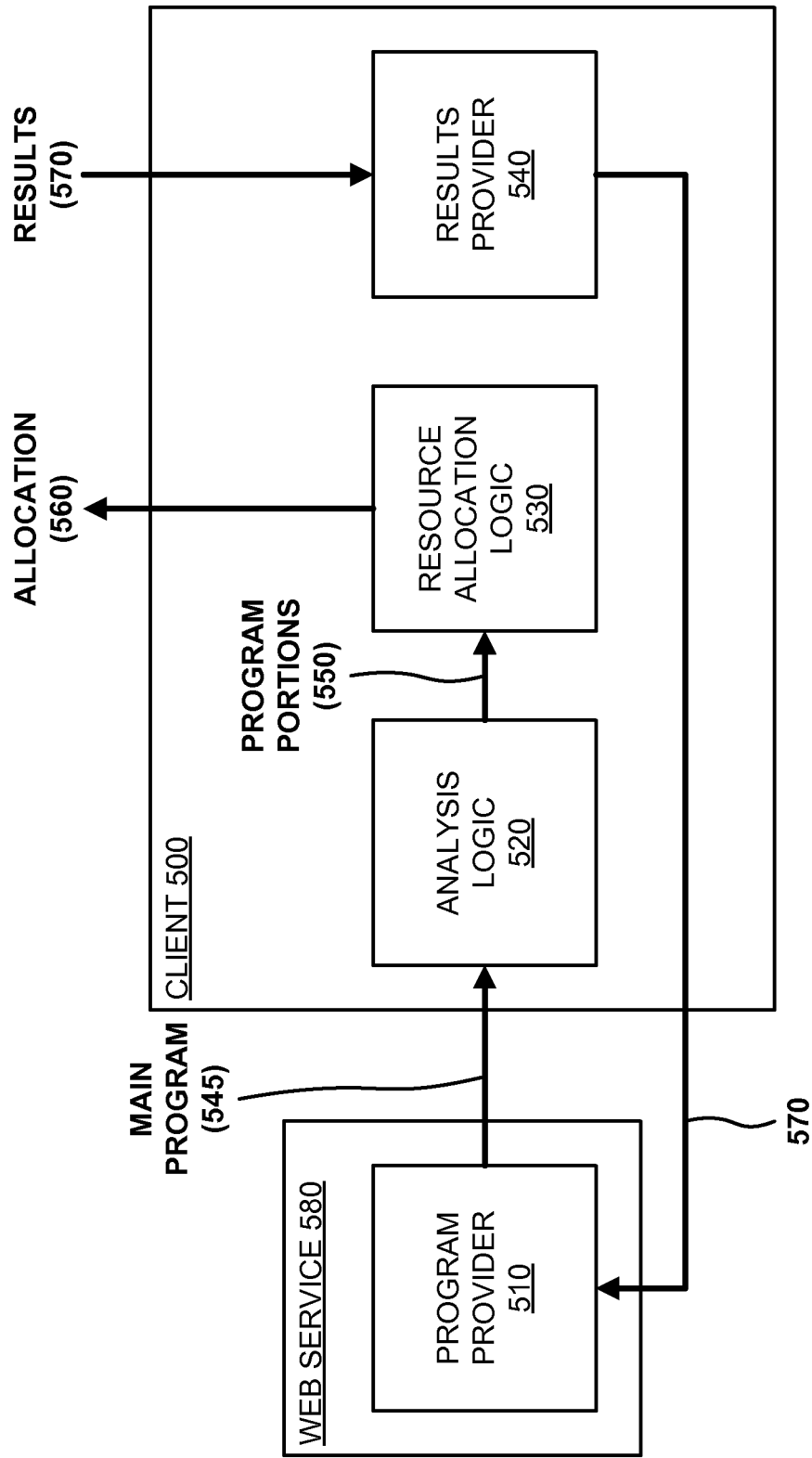
FIG. 5B is an exemplary diagram of functional components of the parallel programming interface in an alternative arrangement.

FIG. 5B is an exemplary diagram of functional components of parallel programming interface 140 in an alternative arrangement. The alternative arrangement depicted in FIG. 5B is the same as the arrangement of FIG. 5A, except that program provider 510 may be included in a web service 580, while analysis logic 520, resource allocation logic 530, and results provider 540 may be include in client 500. Program provider 510, analysis logic 520, resource allocation logic, and/or results provider 540 may operate in the manner as described above in connection with FIG. 5A.

Web service 580 may provide access to one or more programs (e.g., main program 545) provided by program provider 510, applications accessed by main program 545, etc.). A "web service," as the term is used herein, is to be broadly interpreted to include any software application that allows machine-to-machine communications over a network (e.g., a local area network (LAN), a metropolitan area network (MAN), a wide area network (WAN), such as the Internet, etc.). For example, a web service may communicate with a client (e.g., client 500) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

In one exemplary implementation, web service 580 may allow a destination (e.g., a computer operated by a customer) to perform parallel programming using hardware and/or software UEs that may be operated by a service provider (e.g., client 500). For example, the customer may be permitted access to client 500 to perform parallel programming if the customer subscribes to one of the offered web services. The service provider may maintain a database that includes parameters, such as parameters that indicate the status of hardware UEs, software UEs, etc. The service provider may perform a look-up operation in the database if a request for parallel programming is received from the customer. The service provider may connect the customer to parallel programming resources that are available based on parameters in the database.

In another exemplary implementation, the customer may receive web service 580 on a subscription basis. A subscription may include substantially any type of arrangement, such as monthly subscription, a per-use fee, a fee based on an amount of information exchanged between the service provider and the customer, a fee based on a number of processor cycles used by the customer, a fee based on a number of hardware UEs, software UEs, etc., used by the customer, etc.

Figure 5C:
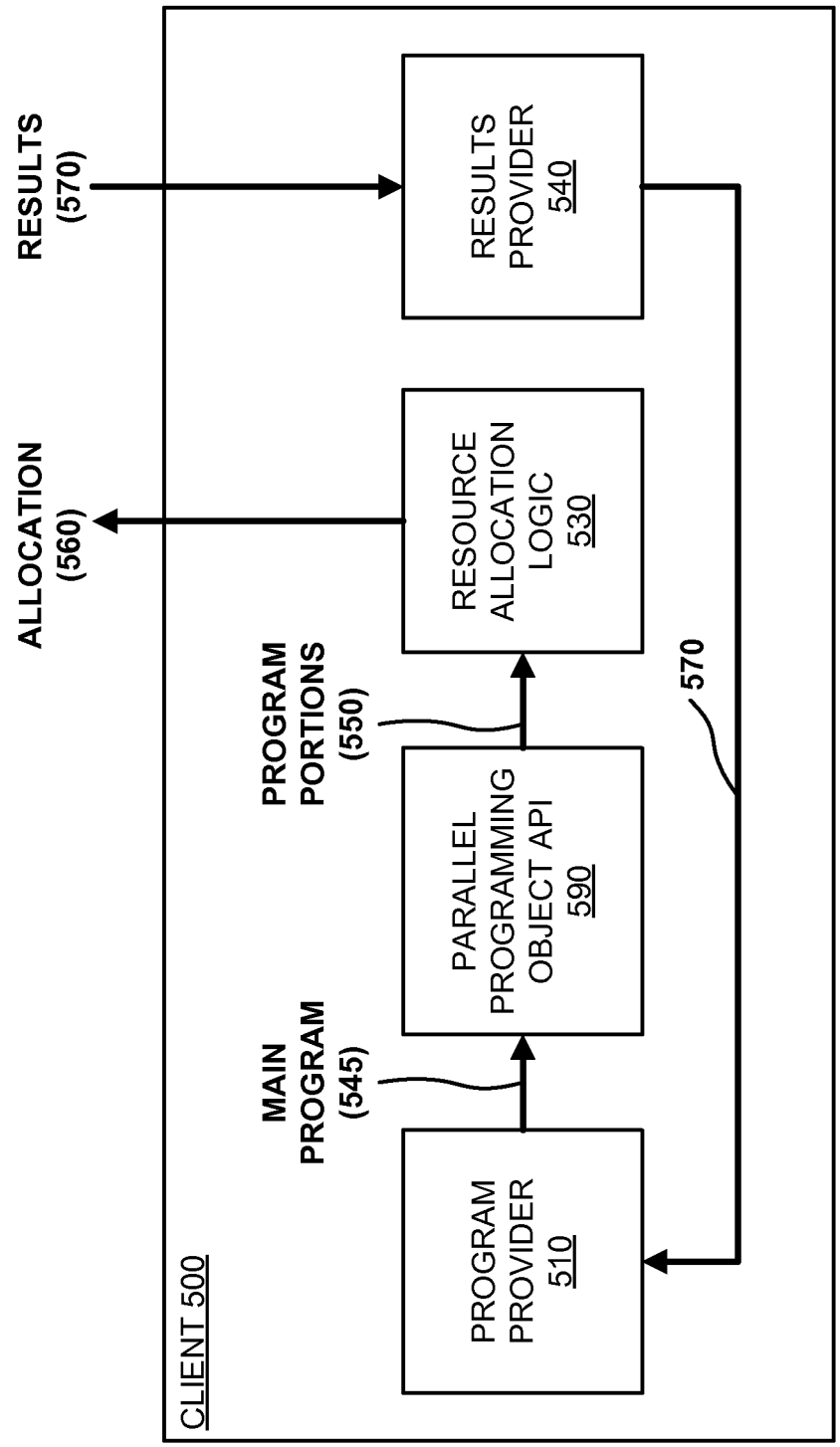
FIG. 5C is an exemplary diagram of functional components of the parallel programming interface in another alternative arrangement.

FIG. 5C is an exemplary diagram of functional components of parallel programming interface 140 in another alternative arrangement. The alternative arrangement depicted in FIG. 5C is the same as the arrangement of FIG. 5A, except that analysis logic 520 may be replaced with a parallel programming object API 590. Program provider 510, resource allocation logic, and/or results provider 540 may operate in the manner as described above in connection with FIG. 5A.

Parallel programming object API 590 may permit a user to specify how main program 545 may be parallelized. Parallel programming object API 590 may cooperate with resource allocation logic 530 and/or execution mechanism (e.g., software UEs 420) in a similar manner that analysis logic 520 cooperates with these components. However, parallel programming API 590 may offer much more flexibility and/or customization.

Although FIGS. 5A-5C show exemplary components of parallel programming interface 140, in other implementations, parallel programming interface 140 may contain fewer, different, or additional components than depicted in FIGS. 5A-5C. In still other implementations, one or more components of parallel programming interface 140 may perform the tasks performed by one or more other components of parallel programming interface 140.

Exemplary Client/Web Service Architecture

FIG. 6 is an exemplary diagram of an entity corresponding to client 500 and/or web service 580. As illustrated, the entity may include a bus 610, a processing unit 620, a main memory 630, a read-only memory (ROM) 640, a storage device 650, an input device 660, an output device 670, and/or a communication interface 680. Bus 610 may include a path that permits communication among the components of the entity.

Processing unit 620 may include a processor, microprocessor, or other types of processing logic that may interpret and execute instructions. In one implementation, processing unit 620 may include a single core processor or a multi-core processor. In another implementation, processing unit 620 may include a single processing device or a group of processing devices, such as a processor cluster or computing grid. In still another implementation, processing unit 620 may include multiple processors that may be local or remote with respect each other, and may use one or more threads while processing. In a further implementation, processing unit 620 may include multiple processors implemented as hardware UEs capable of running copies of a technical computing environment.

Main memory 630 may include a random access memory (RAM) or another type of dynamic storage device that may store information and instructions for execution by processing unit 620. ROM 640 may include a ROM device or another type of static storage device that may store static information and/or instructions for use by processing unit 620. Storage device 650 may include a magnetic and/or optical recording medium and its corresponding drive, or another type of static storage device (e.g., a disk drive) that may store static information and/or instructions for use by processing unit 620.

Input device 660 may include a mechanism that permits an operator to input information to the entity, such as a keyboard, a mouse, a pen, a microphone, voice recognition and/or biometric mechanisms, etc. Output device 670 may include a mechanism that outputs information to the operator, including a display, a printer, a speaker, etc. Communication interface 680 may include any transceiver-like mechanism that enables the entity to communicate with other devices and/or systems. For example, communication interface 680 may include mechanisms for communicating with another device or system via a network.

As will be described in detail below, the entity depicted in FIG. 6 may perform certain operations in response to processing unit 620 executing software instructions contained in a computer-readable medium, such as main memory 630. A computer-readable medium may be defined as a physical or logical memory device and/or carrier wave. The software instructions may be read into main memory 630 from another computer-readable medium, such as storage device 650, or from another device via communication interface 680. The software instructions contained in main memory 630 may cause processing unit 620 to perform processes that will be described later. Alternatively, hardwired circuitry may be used in place of or in combination with software instructions to implement processes described herein. Thus, implementations described herein are not limited to any specific combination of hardware circuitry and software.

Although FIG. 6 shows exemplary components of the entity, in other implementations, the entity may contain fewer, different, or additional components than depicted in FIG. 6. In still other implementations, one or more components of the entity may perform the tasks performed by one or more other components of the entity.

Exemplary Parallel Programming API—Parallel Programming Object Interface

Parallel programming interface 140 may provide a parallel programming application program interface (API) (e.g., a code-based interface) that may define and implement an object in a technical computing environment (e.g., TCE 320) that corresponds to another one or more (or set of) executing technical computing environments. The parallel programming API may permit customizable parallelism of a program (e.g., main program 545), and may be nested in other calls or function (e.g., in the parallel programming constructs described below in connection with FIGS. 7-9). The parallel programming API may be used by other calls as inputs to a calling function so that which labs (e.g., labs 420) to use may be known. For example, in one implementation, the parallel programming API may be called a MATLAB® unit of execution (or MUE) API. The MUE API may define and implement an object in MATLAB® that corresponds to another one or more of executing MATLABs®. The MUE API may be used to permit one technical computing environment to communicate with and control another technical computing environment. The MUE API may be used to create groups of processes with certain behaviors (e.g., using the language constructs described below in connection with FIGS. 7-9).

The MUE API may include the following constructors, which may create one or more MUEs:
   m=mue (which may create a new MATLAB); and
   m=mue(n) (which may create an array of "n" new MATLABs).

The MUE API may include the following methods and associated actions:
   PUT—may copy data to a MUE;
   GET—may copy data from a MUE;
   EVAL—may evaluate a string asynchronously;
   EVALNOW—may evaluate a string synchronously;
   FEVAL—may evaluate a function asynchronously;
   FEVALNOW—may evaluate a function synchronously;
   ISBUSY—may ask if a MUE if it is busy;
   SELECT—may block until a MUE is not busy;
   WAIT—may block until the MUE is not busy; and
   INTERRUPT—may interrupt a MUE.

The MUE API may perform the following exemplary processes. In a first exemplary process, an array of MUEs may be created, and some data may be moved each created MUE. Each MUE may be told to perform different functions, and the process may wait until the MUEs have performed the different functions. The results may be gathered from the MUEs (or alternatively, the results may be kept separate), and the MUEs may be shut down. Such a process may be performed using the following syntax:

```
% create an array of mues
m=mue(4);
a=rand(1,50);
b=rand(1,50);
% move some data to all of them
put(m,'A',a);
put(m,'B',b);
% tell each to do a different thing
eval(m(1),'test1');
eval(m(2),'test2');
eval(m(3),'test3');
eval(m(4),'test4');
% wait until they have all finished
wait(m);
% gather the results
r1=get(m,'R')
% Alternatively, keep the results separate
r2=get(m,'R', 'cell')
% shut down the mues
clear m
```

In a second exemplary process, a function may be evaluated for several values of two parameters (e.g., two parameter vectors), and arguments may be created. MUEs may be used, and the MUEs may be given different random number seeds. The work may be performed, the results may be displayed, and the MUEs may be shut down. Such a process may be performed using the following syntax:

```
% Evaluate a function for many values of two parameters.
    Parameter vectors we will sweep over
temperatures=0:1:13;
pressures=0.5:0.1:1.7;
% create arguments
[arg1,arg2]=meshgrid(temperatures,pressures);
% here are the mues we will use
mues=mue(ceil(10 * rand));
% give them different random number seeds
for i=1:length(mues)
    mues(i).feval('rand',i);
end
% do the work
result=apply(mues,'MyComputationallyIntensive-
    Function',arg1,arg2);
% display the results and shutdown
surf(arg1,arg2,result)
xlabel('temperature')
ylabel('pressure')
zlabel('Computationally intensive function of temperature
    and pressure');
clear mues
```

Exemplary Parallel Programming API—Parallel Programming Constructs

FIG. 7 illustrates an exemplary parallel programming construct (e.g., PARFOR command 700) capable of being analyzed and transformed to parallel program portions by analysis logic 520 of parallel programming interface 140. As shown, PARFOR command 700 may be created with TCE 320 and provided to analysis logic 520 of client 500. In other implementations, PARFOR command 700 may be created by another device and/or may be provided to analysis logic 520 of client 500. In one example, analysis logic 520 may implement PARFOR command 700 to generate program portions 550. PARFOR command 700 may include the following exemplary syntax:

```
parfor (i = 1:100, 4)
    A(i) = i;
end
plot (A)
```

Significant performance gains may be realized by providing parallel programming constructs (e.g., PARFOR command 700) that use available computational resources. By identifying concurrencies in their programs, where a set of computations may be executed independent of each other, users may be able to solve problems faster. One such parallel programming construct may include a parallel FOR loop (e.g., PARFOR command 700). PARFOR command 700 may include the following general form:

PARFOR (variable=expr), statement, . . . , statement, END. PARFOR command 700 may be a work sharing construct that executes the loop body for a set of iterations simultaneously by using available resources. To accomplish this, the body of PARFOR command 700 may be written such that each iteration may be independent of the other iterations (i.e., the loop iterations may be order-independent). PARFOR command 700 may terminate if all the resources finish executing the loop body for their assigned set of iterations (e.g., program portions 550). Analysis logic 520 may implement PARFOR command 700 based on the definition that its body is iteration-independent.

If execution of PARFOR command 700 produces unexpected results for a user, an appropriate diagnostic message may be displayed indicating a reason for the unexpected results. In one implementation, debugging information (e.g., the iteration number, resources that failed, the statement being executed, etc.) may be provided to the user device (e.g., client 500) that initiated PARFOR command 700. If an error occurs during execution of PARFOR command 700, all iterations in progress may be terminated, and new iterations may not be initiated.

Semantics for PARFOR command 700 may not be influenced by what happens (e.g., in terms of usage of variables) before or after the PARFOR section. Temporary variables may persist after execution of PARFOR command 700. In one implementation, PARFOR command 700 may be optimized to selectively determine which temporary variables may be permitted to persist after execution of PARFOR command 700.

Since PARFOR command 700 may be executed on different resources (e.g., software UEs 410, hardware UEs 200, etc.), variables (e.g., loop index, right-hand side variables within the loop body, etc.) that execute the body of PARFOR command 700 may be transferred to and/or created on such resources. The number of resources to be used with PARFOR command 700 may be controlled by specifying an optional input to PARFOR command 700 of the form:

PARFOR (variable=expr, N), statement, . . . , statement, END, where N may be an integer representing a maximum number of resources to try to use. If N is not specified, the number of resources to use may be specified via a resource configuration and management utility. If there are not enough resources available to satisfy the specified N, the available resources may be initiated as part of the execution of PARFOR command 700.

Analysis logic 520 may determine variables and/or data of program portions 550 to be transferred to software UE 410. Analysis logic 520 may transform program portions 550 and may transfer variables and/or data based on the determination of the variables and/or data. Analysis logic 520 may provide execution or run time control of how the iterations get allocated to software UE 410 (e.g., labs 420 of software UE 410). For example, in one implementation, client 500 (via allocation logic 530) may use any of the allocation strategies described above in connection with FIG. 10 to provide run time control of iteration allocation. In other implementations, users may be provided with dynamic options for iteration distribution schemes.

Returning to FIG. 7, program portions 550 of PARFOR command 700 may be allocated to and/or executed by one or more labs 420 of software UE 410. As shown in the exemplary arrangement of FIG. 7, a first portion 710 of PARFOR command 700 may be allocated to lab 420-1, a second portion 720 of PARFOR command 700 may be allocated to lab 420-2, a third portion 730 of PARFOR command 700 may be allocated to lab 420-3, and/or a fourth portion 740 of PARFOR command 700 may be allocated to lab 420-4. First portion 710 may compute A(i) for iterations 1:25, second portion 720 may compute A(i) for iterations 26:50, third portion 730 may compute A(i) for iterations 51:75, and fourth portion 730 may compute A(i) for iterations 76:100, via labs 420-1, 420-2, 420-3, and 420-4, respectively.

Although FIG. 7 shows an exemplary parallel programming construct, in other implementations, client 500 may contain fewer, different, or additional parallel programming constructs than depicted in FIG. 7. In still other implementations, the exemplary parallel programming construct may be allocated in other ways than depicted in FIG. 7.

FIG. 8 illustrates an exemplary parallel programming construct (e.g., PARSECTION command 800) capable of being analyzed and transformed to parallel program portions by analysis logic 520 of parallel programming interface 140. As shown, PARSECTION command 800 may be created with TCE 320 and provided to analysis logic 520 of client 500. In other implementations, PARSECTION command 800 may be created by another device and/or may be provided to analysis logic 520 of client 500. In one example, analysis logic 520 may implement PARSECTION command 800 to generate program portions 550. PARSECTION command 800 may include the following exemplary syntax:

```
parsection (4)
    A = rand(1000);
    B = rand(500);
    C = rand(1000);
    D = rand(500);
section, [L U] = svd (A); end
section, F = fftshift(fft(B)); end
section, E = eig(C); end
section , Z = A*C; end
end
```

Significant performance gains may be realized by providing parallel programming constructs (e.g., PARSECTION command 800) that use available computational resources. By identifying concurrencies in their programs, where a set of computations may be executed independent of each other, users may be able to solve problems faster. One such parallel programming construct may include a parallel SECTION command (e.g., PARSECTION command 800). PARSECTION command 800 may include the following general form:

PARSECTION, section ... END, section ... END, END.

PARSECTION command 800 may enable independent sections of code to be executed simultaneously on different resources. Execution of PARSECTION command 800 may wait for all code sections to be complete. The number of code sections and/or the number of available resources may be unrelated, and PARSECTION command 800 may be associated with any idle resources available to execute the code sections. In order to control the number of resources to associated with PARSECTION command 800, an optional parameter (N, which may indicate the number of resources to use) may be included in the general form as follows:

PARSECTION (N), SECTION ... END, SECTION, ... END, END.

Analysis logic 520 may determine independent segments or sections of code associated with program portions 550. For example, in one implementation, analysis logic 520 may perform a dependency analysis on the sections of the code to determine independent sections. Analysis logic 520 may analyze PARSECTION command 800 and may determine sections of the code to be executed together and sections of the code that may undergo staggered execution. Analysis logic 520 may determine sections of the code to allocate to software UE 410 (e.g., labs 420 of software UE 410), and/or results to be returned at the end of PARSECTION command 800. For example, in one implementation, client 500 (via allocation logic 530) may use any of the allocation strategies described above in connection with FIG. 10 to provide run time control of code section allocation.

Returning to FIG. 8, PARSECTION command 800 may be allocated to and/or executed by one or more labs 420 of software UE 410. As shown in the exemplary arrangement of FIG. 7, a first portion 810 of PARSECTION command 800 may be allocated to lab 420-1, a second portion 820 of PARSECTION command 800 may be allocated to lab 420-2, a third portion 830 of PARSECTION command 800 may be allocated to lab 420-3, and/or a fourth portion 840 of PARSECTION command 800 may be allocated to lab 420-4. First portion 810 may compute svd(A), second portion 820 may compute fftshift(fft(B)), third portion 830 may compute eig (C), and fourth portion 840 may compute A*C, via labs 420-1, 420-2, 420-3, and 420-4, respectively.

Although FIG. 8 shows an exemplary parallel programming construct, in other implementations, client 500 may contain fewer, different, or additional parallel programming constructs than depicted in FIG. 8. In still other implementations, the exemplary parallel programming construct may be allocated in other ways than depicted in FIG. 8.

FIG. 9 illustrates an exemplary parallel programming construct (e.g., SPMD command 900) capable of being analyzed and transformed to parallel program portions by analysis logic 520 of parallel programming interface 140. As shown, SPMD command 900 may be created with TCE 320 and provided to analysis logic 520 of client 500. In other implementations, SPMD command 900 may be created by another device and/or may be provided to analysis logic 520 of client 500. In one example, analysis logic 520 may implement SPMD command 900 to generate program portions 550.

SPMD command 900 may permit users to enter into a SPMD mode. In one implementation, SPMD command 900 may support data parallelism whereby large data may be distributed across multiple software UEs (e.g., software UEs 410 and/or labs 420) via a distributed arrays API. Operations on the distributed arrays may be coordinated through communication between labs 420 that own pieces of the array. The general form of SPMD command 900 may include:

SPMD, statement, ..., statement, END.

The "statements" in the body of SPMD command 900 may be executed on resources (e.g., software UEs 410 and/or labs 420) that may be defined by a default configuration. SPMD command 900 may configure these resources as a communicating ring of labs (e.g., ring of labs 420), which may mean that labs 420 may have a same number of labs (e.g., NUMLABS) 920 defined, each lab 420 may have a unique value (e.g., LABINDEX 930, 940, 950, and 960 for labs 420-1, 420-2, 420-3, 420-4, respectively) between one and NUMLABS 920, labs 420 may send data to and from one another, and/or each lab 420 may include a unique random number generator that creates random number streams independent of one another.

Upon completion of SPMD command 900, labs 420 may be "cleaned up," which may mean that labs 420 may be restored to ordinary resources (e.g., after the results are received), NUMLABS 920 and LABINDEX 930-940 may set back to one, the random number generators may be set back to a default start value, and/or workspaces may be cleared. There may be no implicit data transfer to and from the workspace where SPMD command 900 is called and the workspaces of labs 420 executing the body of SPMD command 900. An error on any of labs 420 executing the body of SPMD command 900 may cause an error in SPMD command 900. A warning on any of labs 900 executing the body of SPMD command 900 may be displayed on a device (e.g., client 500).

SPMD command 900 of the form SPMD NUMWORKERS, statement, ..., statement, END may execute SPMD command 900 on an anonymous group of a number (e.g., NUMWORKERS) of resources provided within a default resource pool. SPMD command 900 of the form SPMD MYWORKERS, statement, ..., statement, END may execute SPMD command 900 on a specified group of resources (e.g., MYWORKERS).

The syntax [OUT1,OUT2, ... ]=SPMD(IN1,IN2, ... ), statement, ..., statement, END may transfer variables (e.g., IN1, IN2, ...) from client 500 to workspaces of labs 420 at the beginning of SPMD command 900, and may transfer variables (e.g., OUT1, OUT2, ...) from one of the workspaces back to client 500 at the end of SPMD command 900. If the variable being transferred from client 500 to labs 420 is a distributed array (e.g., a "darray"), then the variable may be automatically re-distributed to all labs 420. If the variable being transferred from client 500 is a non-distributed array, then the variable may be replicated on all labs 420. If the variable being transferred from labs 420 to client 500 is a replicated array, then a replicated value may be received from any of labs 420. If the variable being transferred from labs 420 to client 500 is a variant array, then a value may be received from one of labs 420. If the variable being transferred from labs 420 to client 500 is a distributed array, then the variable may be automatically re-distributed to be a distributed array over a single lab 420.

To avoid this redistribution back to client 500, a remote handle (e.g., "rhD1") to a distributed array (e.g., "D1") may be created on labs 420, and a replicated array may be provided to client 500 using the following syntax:

```
[rhD1] = spmd(n)
    D1 = rand(n,darray( ));
    rhD1 = remoteHandle(D1);
end.
```

The remote handle (rhD1) to the distributed array (D1) may be used to pass the distributed array (D1) to subsequent SPMD commands or blocks. However, the user may first dereference the remote handle to access and operate on the distributed array using the following syntax:

```
spmd(rhD1)
    D1 = getDistributedArrayBackFromHandle(rhD1);
    % use the distributed array D1
end.
```

In one implementation, SPMD command 900 (and its associated syntax) may be implemented via client 500 (e.g. via analysis logic 520 of client 500), software UEs 410 (including labs 420), and/or TCE 320. In other implementations, SPMD command 900 (and its associated syntax) may be implemented via other software and hardware logic. SPMD command 900 may increase processing performance by dividing large data sets into pieces, and by providing each piece to different resources. Each resource may execute the same program on its piece of data, and the results may be collected.

Although FIG. 9 shows an exemplary parallel programming construct, in other implementations, client 500 may contain fewer, different, or additional parallel programming constructs than depicted in FIG. 9. In still other implementations, the exemplary parallel programming construct may be allocated in other ways than depicted in FIG. 9.

In one implementation, the parallel programming constructs depicted in FIGS. 7-9 may each perform four things consistently. First, the parallel programming constructs may or may not allow for persistence. Second, the parallel programming constructs may permit any data to be manually and/or automatically sent and returned from the parallel programming constructs' workspace (e.g., labs 420). Third, any state (e.g., a path, workspace variables, random number seed, current directory, etc.) may be set or reset when initially calling and/or when exiting any of the parallel programming constructs. Finally, the behavior of distributed arrays into and out of the parallel program constructs may be one of three things (e.g., the behavior of distributed arrays may be redistributed based on the number of labs inside and outside the parallel programming constructs, a reference to the distributed array may be passed around, and/or distributed arrays going into and/or out of the parallel programming constructs may be passed around).

In another implementation, the parallel programming constructs depicted in FIGS. 7-9 may provide explicit variable transfer as defined by a program. For example, the syntax [B]=spmd(A), end may indicate that "A" is to be sent before running the code and "B" is to be returned afterwards. The parallel programming constructs depicted in FIGS. 7-9 may also provide implicit variable transfer. For example, for PARFOR command 700, all of the needed variables may be transferred as a result of an analysis of the code.

Exemplary Functional Diagram of Resource Allocation Logic

FIG. 10 is an exemplary diagram of exemplary functional components of resource allocation logic 530 of client 500. In one implementation, resource allocation logic 530 may decrease processing time by allocating and initializing resources (e.g., one or more software UEs 410, one or more labs 420 of software UE 410, and/or other devices) for one or more program portions 550. In another implementation, resource allocation logic 530 may select program portions 550 that minimize the amount of data to be sent, and may allocate program portions to software UE 410 (e.g., to one or more labs 420), multiple software UEs 410, and/or other resources that possess a program (e.g., TCE 320) and/or some or all of the data. The exact strategy for allocating program portions 550 to software UE 410, multiple software UEs 410, and/or other resources may depend upon engineering considerations related to specific hardware restrictions and/or communication fabric.

As shown in FIG. 10, resource allocation logic 530 may include a variety of functional components that may be implemented in hardware-based logic, software-based logic, a combination of hardware and software based logic, etc. As illustrated, resource allocation logic 530 may include allocation selector logic 1000, user-controlled logic 1010, data driven logic 1020, top-down logic 1030, dynamic logic 1040, global logic 1050, and/or adaptive logic 1060. Resource allocation logic 530 may nest parallel program portions (e.g., program portions 550), and, depending on the allocation strategy, may provide parallel program portions 550 to software UE 410, multiple software UEs 410, and/or other resources to optimize performance. Such nesting may occur explicitly, although in other implementations, nesting of parallel program portions may occur implicitly by usage of various applications by a user (e.g., the user may call functionality that could include nesting constructs).

Allocation selector logic 1000 may receive program portions 550 from analysis logic 520 and/or may determine available software UEs 410 and/or available hardware UEs 200 based on information 1080 indicating the availability of software UEs 410 and/or hardware UEs 200. Allocation selector logic 1000 may return a maximum number of resources (e.g., software UEs 410) available to simultaneously execute program portions 550. If allocation selector logic 1000 returns zero as the number, program portions 550 may be executed on the requesting device (e.g., client 500). Allocation selector logic 1000 may use available software UEs 410 and/or labs 420 to support many different parallel programming models. For example, the number of software UEs 410 and/or labs 420 may dynamically grow or shrink, a fixed number of software UEs 410 and/or labs 420 may be allocated (e.g., by allocation selector logic 1000) to program portions 550, and/or a number of software UEs 410 and/or labs 420 may be determined by allocation selector logic 1000 based on other criteria (e.g., cost, desired minimum time to solve, etc.). In one implementation, allocation selector logic 1000 may select an allocation strategy based on the determined software UEs 410 and/or labs 420 and/or based on program portions 550 (e.g., processing requirements of program portions 550). Allocation selector logic 1000 may select any of logic 1010-1060 for implementation of the allocation strategy.

In one implementation, allocation selector logic 1000 may determine whether to change a selected allocation strategy. If the allocation selector logic 1000 determines that the allocation strategy is to be changed, allocation selector logic 1000 may determine a different allocation strategy based on the determined software UEs 410 and/or labs 420 and/or based on program portions 550. If the allocation strategy is selected and/or determined, allocation selector logic 1000 may allocate one or more program portions 550 to one or more software UEs 410, and/or one or more labs 420. If one or more program portions 550 are completed by one or more resources, allocation selector logic 1000 may release the resources and may signal completion of the program portions 550 to a requesting device (e.g. client 500).

Allocation selector logic 1000 may examine a current allocation strategy and may select one or more of logic 1010-1060 based on the current allocation strategy. If allocation selector logic 1000 selects a user-controlled allocation strategy, user-controlled logic 1010 may, for example, be implemented. User-controlled logic 1010 may permit a user to specify how many resources (e.g., software UEs 410 and/or labs 420) are to be allocated to each program portion 550. The allocation may be performed in a first come, first served manner. If a program portion (e.g., program portion 1070) is completed, user-controlled logic 1010 may release the resources and may make them available to other program portions. If no resources are available, user-controlled logic 1010 may execute program portions 550 with resources of client 500. Alternatively, user-controlled logic 1010 may permit the user to identify specific resources (e.g., labs 420) to be used for a program portion, or to provide criteria for selecting resources to be allocated for a program portion. In one implementation, user-controlled logic 1010 may permit program portions 550 to use the minimum of a requested number of resources (e.g., software UEs 410 and/or labs 420) and an available number of resources.

If allocation selector logic 1000 selects a data driven allocation strategy, data driven logic 1020 may be implemented. Data driven logic 1020 may provide (or receive from the user) a program that may review parameters supplied to a program portion and may compute an optimal number of resources (e.g., software UEs 410 and/or labs 420) to be used for the program portion. For example, the program portions may specify that a parallel FOR loop (e.g., PARFOR command 700) may be performed locally (e.g., by client 500) if the loop contains less than "250" iterations; may be performed by a single resource (e.g., a single software UE 410 and/or a single lab 420-1 through 420-4) if the loop contains "251" through "1000" iterations; may be performed by two resources (e.g., two software UEs 410 and/or two labs 420) if the loop contains "1001" through "3500" iterations; and/or may be performed by three resources (e.g., three software UEs 410 and/or three labs 420) if the loop contains more than "3500" iterations. Alternatively, the program portions may specify resources to be allocated and/or criteria to guide the allocation. In one implementation, data driven logic 1020 may permit program portions 550 to use the minimum of either a requested number of resources (e.g., software UEs 410 and/or labs 420) or an available number of resources.

If allocation selector logic 1000 selects a top-down allocation strategy, top-down logic 1030 may be implemented. At a first parallel construct, top-down logic 1030 may divide available resources (e.g., software UEs 410 and/or labs 420) among a number of program portions 550 specified by a user (e.g., via client 500). If any sections of the parallel construct contain further parallel constructs, program portions 550 related to those section(s) may be further divided among the available resources. In one implementation, top-down logic 1030 may divide the number of available resources by the requested number of program portions 550. If there are fewer resources than the requested number of program portions 550, top-down logic 1030 may return the number of available resources. If there are more resources than the requested number of program portions 550, top-down logic 1030 may evenly allocate the program portions 550 among the available resources. For example, top-down logic 1030 may allocate one resource (e.g., one software UE 410 or one lab 420-1 through 420-4) to a particular program portion (e.g., program portion 1070) and/or may reserve other resources associated with the particular program portion for further programs initiated by the particular program portion.

If allocation selector logic 1000 selects a dynamic allocation strategy, dynamic logic 1040 may be implemented. Dynamic logic 1040 may take the number of program portions 550 (or workers) to be an upper limit. If a program portion is complete (e.g., the resource associated with the program portion is available), dynamic logic 1040 may determine what program portions 550 need help, and may assign such program portions to the available resources. Dynamic logic 1040 may allocate program portions 550 according to a priority queue, a round-robin algorithm, and/or any other strategy that precludes a program portion from waiting indefinitely for a resource. In one implementation, dynamic logic 1040 may return a value equal to the number of requested program portions 550. If a resource becomes available, dynamic logic 1040 may "check-in" the resource and may assign an unexecuted program portion to the available resource. If the program portion is executed, the resource may report its availability to dynamic logic 1040.

If allocation selector logic 1000 selects a global allocation strategy, global logic 1050 may be implemented. Global logic 1050 may inspect an application associated with program portions 550, and may allocate resources to each parallel section of the application based on additional information (e.g., supplied by the user and/or models), heuristics determining where additional resources would be the most beneficial, etc. For example, if a library routine may benefit from having four resources (e.g., four labs 420), global logic 1050 may reserve such resources for library routine calls. In one implementation, global logic 1050 may pre-compute and return the number of program portions.

If allocation selector logic 1000 selects an adaptive allocation strategy, adaptive logic 1060 may be implemented. Adaptive logic 1060 may allocate resources (e.g., software UEs 410 and/or labs 420) to program portions 550 based on an amount of time each program portion may take for execution. Adaptive logic 1060 may dynamically determine (e.g., as parallel programming is executing) the amount of time, and/or may derive the amount of time from data from previous executions of the allocation. In one implementation, adaptive logic 1060 may request that a segment of a program portions be completed, may calculate the time to execute the segment, and may determine whether to allocate additional resources to the program portion based on the calculated time.

Allocation selector logic 1000 may determine which resource should be assigned a program portion based on the selected allocation strategy. If the global allocation strategy is selected, the assigned resource may be predetermined. If the dynamic allocation strategy is selected, the assignment of the resource may dynamically depend upon which program portions require assistance and which resources are available. In other implementations, allocation selector logic 1000 may assign a resource that may complete a program portion with minimal processing time. For example, allocation selector logic 1000 may assign a program portion to a resource that includes a program to execute the program portion, some or all of the data to execute the program portion, fast communication protocols with the requesting device (e.g., client 500), etc.

Although FIG. 10 describes exemplary allocation strategies, in other implementations, resource allocation logic 530 may include other allocation strategies (e.g., hybrids of the exemplary allocation strategies, multiple allocation strategies, different allocation strategies for different phases of a job, etc.). In one implementation, resource allocation logic 530 (e.g., allocation logic selector 1000) may recommend allocation strategies based on an analysis of a currently-selected allocation strategy. In another implementation, resource allocation logic 530 may select an allocation strategy, may change an allocation strategy, and/or may implement the selected or changed allocation strategy.

Although FIG. 10 shows exemplary functional components of resource allocation logic 530, in other implementations, resource allocation logic 530 may contain fewer, different, or additional functional components than depicted in FIG. 10. In still other implementations, one or more functional components of resource allocation logic 530 may perform the tasks performed by one or more other functional components of resource allocation logic 530.

Figure 11:
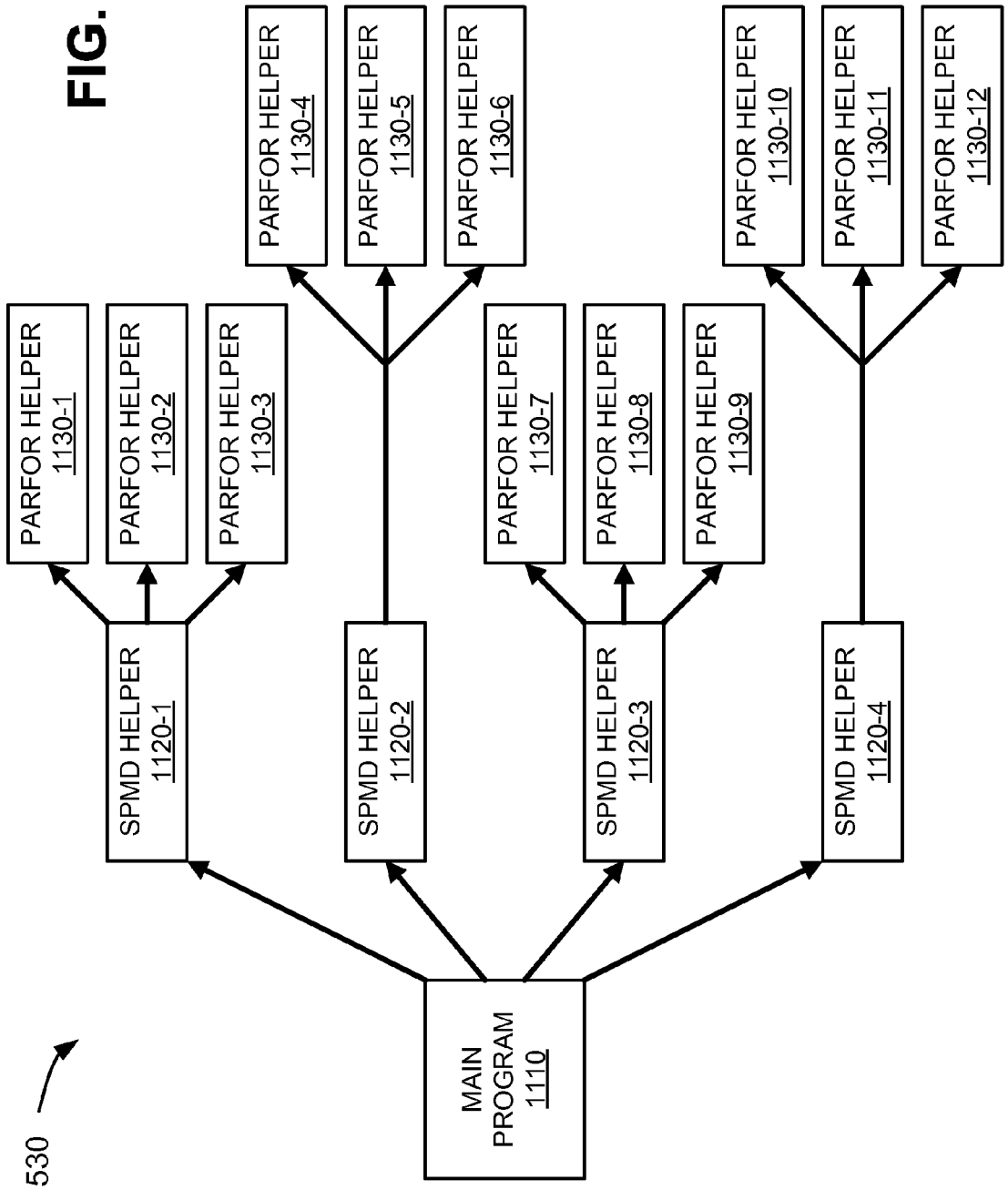
FIG. 11 depicts an exemplary operation of the resource allocation logic of the parallel program interfaces depicted in FIGS. 5A and 5B during nesting of parallel program constructs.

FIG. 11 depicts an exemplary operation of resource allocation logic 530 during nesting of parallel programming constructs (e.g., SPMD and PARFOR). A main program 1000 may be generated by client 500 (e.g., from program provider 510) and may be provided to resource allocation logic 530 according to the following syntax:

```
<compute an array A>
[B] = SPMD( A ) 4
    % in this block, A is divided by columns
    % up to 4 helpers can be used
    PARFOR (i=1:NROWS, 3)
        % compute on each row of the piece of A
        <computation>
    END
END
```

If sixteen or more resources (or helpers) are available, resource allocation logic 530 may use four helpers to handle each piece of the array A (e.g., broken by columns), and each helper may use three more helpers to execute the rows of the array A. Resource allocation logic 530 may allocate main program 1000 as depicted in FIG. 11, where each helper may be associated with a resource (e.g., software UEs 410 and/or labs 420, not shown).

As shown, resource allocation logic 530 may use four SPMD (single program, multiple data) helpers 1120-1, 1120-2, 1120-3, and 1120-4 (collectively SPMD helpers 1120) to handle each piece of the array A. Resource allocation logic 530 may cause each SPMD helper 1120 to use three helpers to execute the rows of the array A. For example, SPMD helper 1120-1 may use PARFOR helpers 1130-1, 1130-2, and 1130-3, SPMD helper 1120-2 may use PARFOR helpers 1130-4, 1130-5, and 1130-6, SPMD helper 1120-3 may use PARFOR helpers 1130-7, 1130-8, and 1130-9, and/or SPMD helper 1120-4 may use PARFOR helpers 1130-10, 1130-11, and 1130-12, respectively. Such an allocation may be produced by resource allocation logic 530 if there are more than sixteen resources available to resource allocation logic 530.

However, if there are fewer than eight resources available, resource allocation logic 530 may implement a variety of allocation strategies. For example, resource allocation logic 530 (e.g., using the user-controlled allocation strategy) may honor the first eight requests for resources or helpers. Such an arrangement may allocate the four SPMD helpers 1120, and may allocate from zero to three PARFOR helpers 1130 for each SPMD helper 1120, depending on the timing of the requests for resources. Resource allocation logic 530 (e.g., using the top-down allocation strategy) may allocate four resources as SPMD helpers 1120, and may guarantee that each SPMD helper 1120 may use one additional resource that it could allocate as a PARFOR helper 1130. Resource allocation logic 530 (e.g., using the dynamic allocation strategy) may operate like the user-controlled allocation strategy, but if the allocated PARFOR helpers 1130 become free, they would be available to satisfy any other unexecuted PARFOR helper requests. Resource allocation logic 530 (e.g., using the global allocation strategy) may provide the same results as the top-down allocation strategy. If processing of the four SPMD regions is radically different in time, resource allocation logic 530 (e.g., using the adaptive allocation strategy) may allocate more helpers to slower executing regions.

Although FIG. 11 shows exemplary operations of resource allocation logic 530, in other implementations, resource allocation logic 530 may include fewer, different, or additional operations than depicted in FIG. 11. In still other implementations, one or more operations of resource allocation logic 530 may perform the tasks performed by one or more other operations of resource allocation logic 530.

Exemplary Process

FIGS. 12-17 depict a flow chart of an exemplary process 1200 according to implementations described herein. In one implementation, process 1200 may be performed by client 500. In other implementations, process 1200 may be performed by other devices (e.g., client 500 in conjunction with web service 580).

Figure 12:
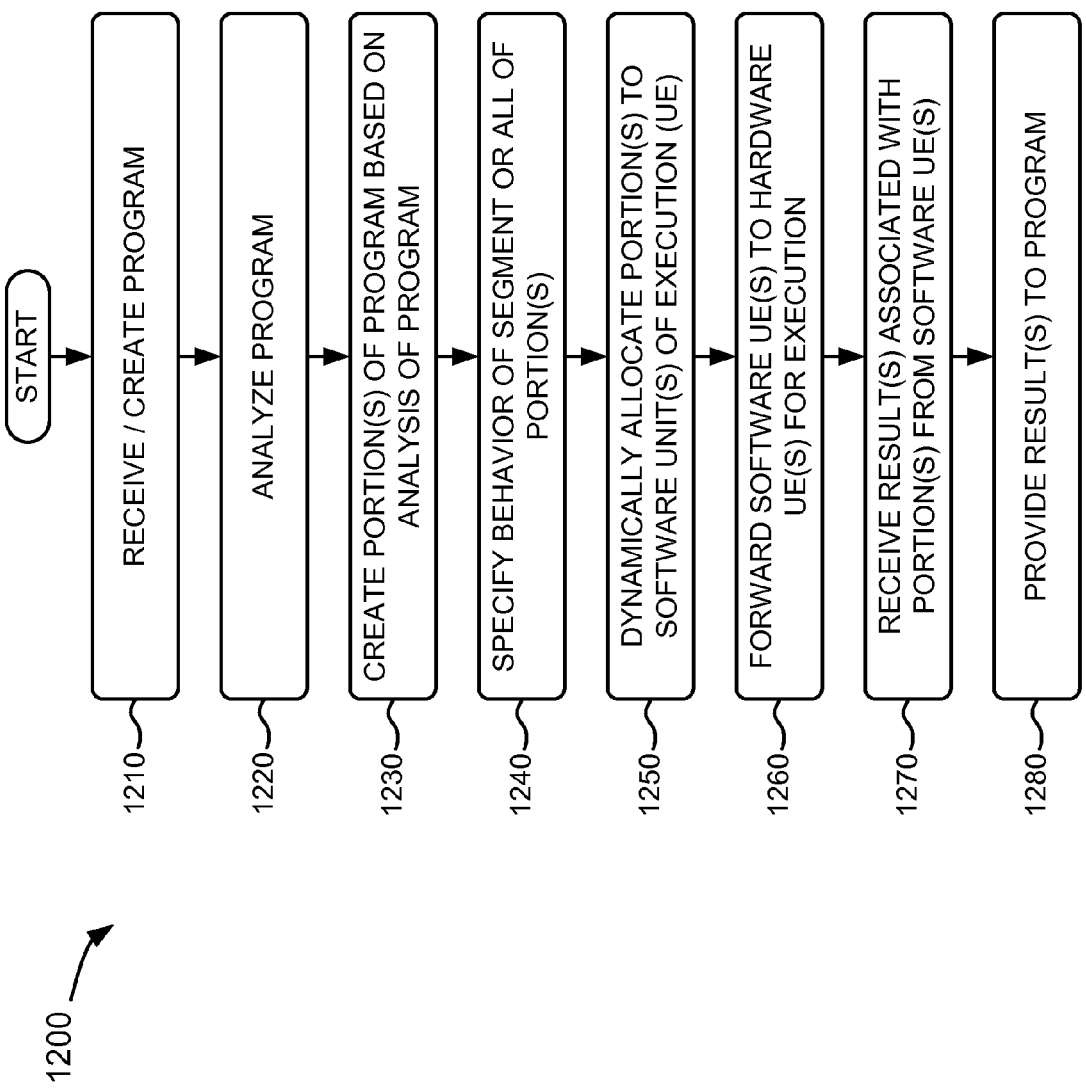
FIGS. 12-17 depict a flow chart of an exemplary process according to implementations described herein.

As shown in FIG. 12, process 1200 may begin with receipt or creation of a program (or main program) (block 1210). For example, in one implementation described above in connection with FIG. 5A, program provider 510 may include hardware and/or software based logic that provides one or more programs (e.g., main program 545) for execution. In one example, program provider 510 may generate or receive programs created using a technical computing environment.

The program may be analyzed (block 1220), and one or more program portions may be created or generated based on the analysis of the program (block 1230). For example, in one implementation described above in connection with FIG. 5A, analysis logic 520 of client 500 may include hardware and/or software based logic that analyzes main program 545 and parses main program 545 into one or more program portions 550. In one example, analysis logic 520 may include language constructs (as described above in connection with FIGS. 7-9) that parse main program 545 into one or more program portions 550.

As further shown in FIG. 12, a behavior of a portion or all of the one or more program portions may be specified (block 1240). For example, in one implementation described above in connection with FIG. 5A, analysis logic 520 may define a sub-group behavior for each of program portions 550. In one example, the sub-group behavior may relate to the parallel programming styles that may be employed on the group of program portions 550. In another example, analysis logic 520 may dynamically change the behavior of one or more of program portions 550 as code is executed for other program portions 550. In still another example, the sub-group behavior may include an unused state, a user-controlled UE state, a task parallel state, a SPMD state, a stream state, etc. Each program portion may be in one of the above-mentioned states, and may request other program portions to be placed in a new state. In a further example, some state information may be consistent across client 500 or some state information may be consistent across a sub-group of client 500.

Returning to FIG. 12, the one or more program portions may be dynamically allocated to one or more software units of execution (block 1250). For example, in one implementation described above in connection with FIG. 5A, resource allocation logic 530 of client 500 may receive program portions 550, and may include hardware and/or software based logic that dynamically allocates (as indicated by reference number 560) program portions 550 to one or more software UEs (e.g., software UE 410).

As shown in FIG. 12, the one or more software units of execution may be forwarded to one or more hardware units of execution for execution of the one or more program portions (block 1260). For example, in one implementation described above in connection with FIG. 5A, resource allocation logic 530 may forward the software UEs to one or more hardware UEs (e.g., hardware UE 200) for execution by hardware UEs in a parallel programming manner.

As further shown in FIG. 12, one or more results associated with the one or more program portions may be received from the one or more software units of execution (block 1270), and the one or more results may be provided to the program (block 1280). For example, in one implementation described above in connection with FIG. 5A, results provider 540 of client 500 may include hardware and/or software based logic that receives results 570 from the software UEs, and provides results 570 to program provider 510. In one example, results provider 540 may combine results 570 into a single result, and may provide the single result to program provider 510.

Figure 13:
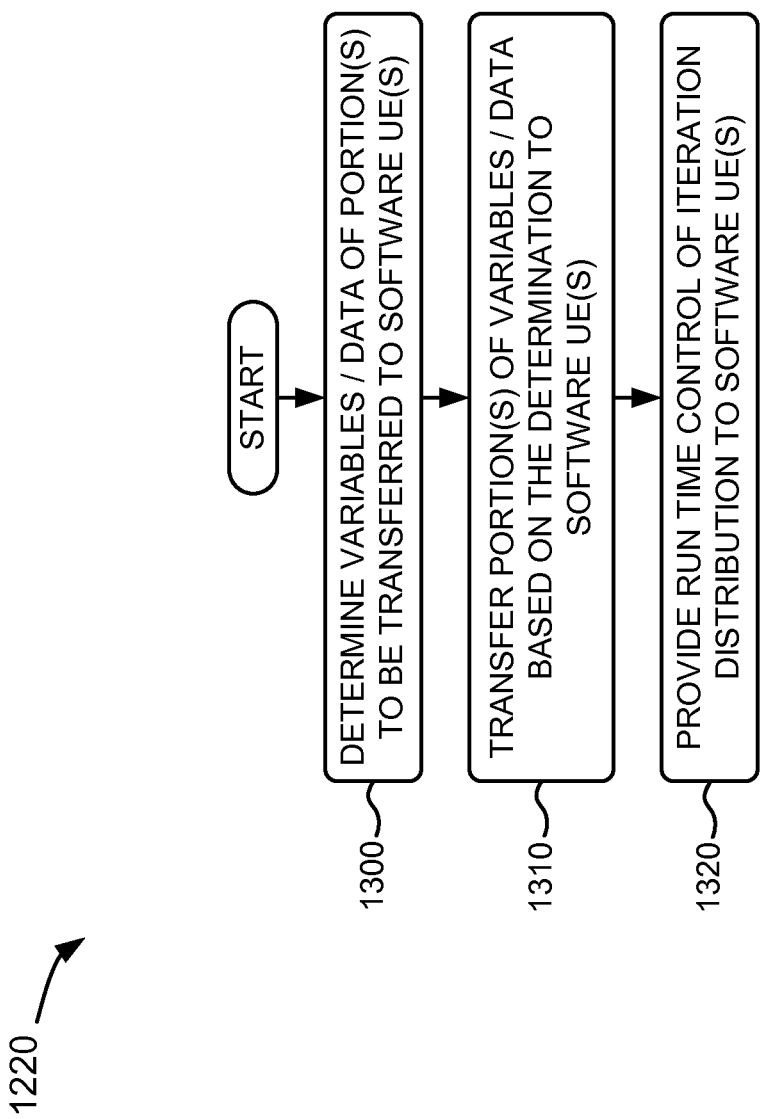

Process block 1220 may include the process blocks illustrated in FIG. 13. As shown in FIG. 13, process block 1220 may include determining variables and/or data associated with the one or more program portions to be transferred to the one or more software units of execution (block 1300), and transferring appropriate portions of variables and/or data based on the determination to the one or more software units of execution (block 1310). For example, in one implementation described above in connection with FIG. 5A, analysis logic 520 of client 500 may determine variables and/or data of program portions 550 to be transferred to software UE 410. Analysis logic 520 may transform program portions 550 and may transfer variables and/or data based on the determination of the variables and/or data.

As further shown in FIG. 13, process block 1220 may include providing run time control of iteration distribution to the one or more software units of execution (block 1320). For example, in one implementation described above in connection with FIG. 5A, analysis logic 520 may provide execution or run time control of how the iterations get allocated to software UE 410 (e.g., labs 420 of software UE 410). In one example, client 500 (via allocation logic 530) may use any of the allocation strategies described above in connection with FIG. 10 to provide run time control of iteration allocation.

Figure 14:
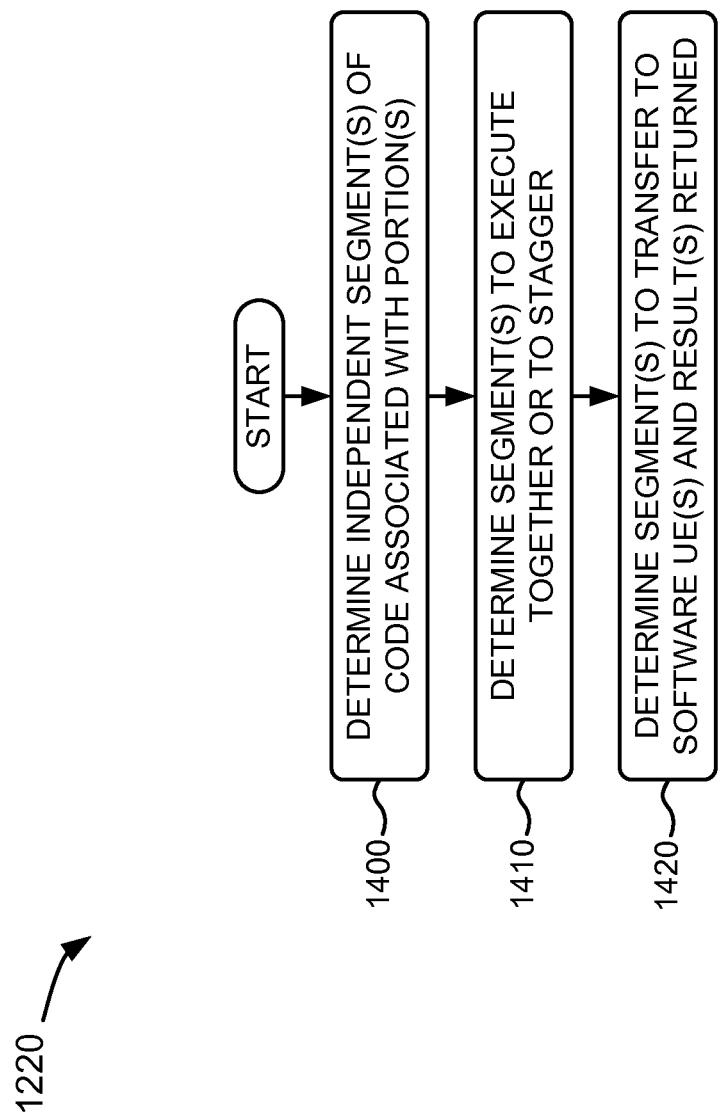

Alternatively and/or additionally, process block 1220 may include the process blocks illustrated in FIG. 14. As shown in FIG. 14, process block 1220 may include determining one or more independent segments of code associated with the one or more program portions (block 1400), and determining whether to execute the one or more segments together or in a staggered fashion (block 1410). For example, in one implementation described above in connection with FIG. 8, analysis logic 520 of client may determine independent segments or sections of code associated with program portions 550. In one example, analysis logic 520 may perform a dependency analysis on the sections of the code to determine independent sections. Analysis logic 520 may analyze PARSECTION command 800 and may determine sections of the code to be executed together and sections of the code that may undergo staggered execution.

As further shown in FIG. 14, process block 1220 may include determining which of the one or more segments to transfer to the software one or more units of execution and what results to be returned by the software one or more units of execution (block 1420). For example, in one implementation described above in connection with FIG. 8, analysis logic 520 may determine sections of the code to allocate to software UE 410 (e.g., labs 420 of software UE 410), and/or results to be returned at the end of PARSECTION command 800. For example, in one implementation, client 500 (via allocation logic 530) may use any of the allocation strategies described above in connection with FIG. 10 to provide run time control of code section allocation.

Figure 15:
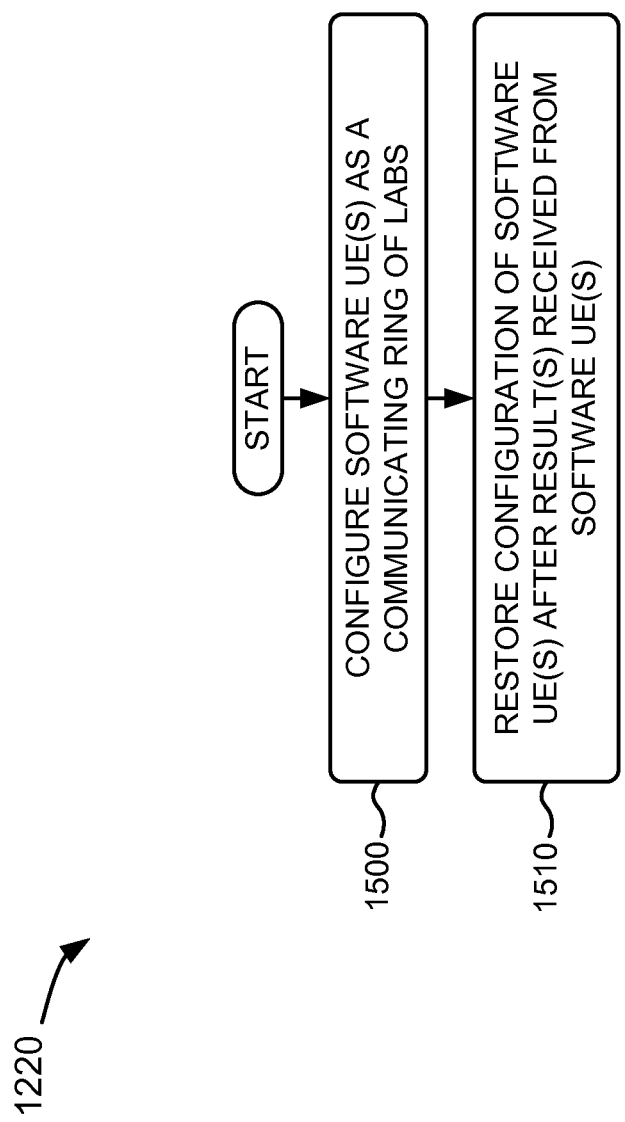

Alternatively and/or additionally, process block 1220 may include the process blocks illustrated in FIG. 15. As shown in FIG. 15, process block 1220 may include configuring the one or more software units of execution as a communication ring of one or more labs (block 1500). For example, in one implementation described above in connection with FIG. 9, SPMD command 900 may configure resources as a communicating ring of labs (e.g., ring of labs 420), which may mean that labs 420 may have a same number of labs (e.g., NUMLABS) 920 defined, each lab 420 may have a unique value (e.g., LABINDEX 930, 940, 950, and 960 for labs 420-1, 420-2, 420-3, 420-4, respectively) between one and NUMLABS 920, labs 420 may send data to and from one another, and/or each lab 420 may include a unique random number generator that creates random number streams independent of one another.

As further shown in FIG. 15, process block 1220 may include restoring configurations of the one or more software units of execution after the one or more results have been received from the software units of execution (block 1510). For example, in one implementation described above in connection with FIG. 9, upon completion of SPMD command 900, labs 420 may be "cleaned up," which may mean that labs 420 may be restored to ordinary resources (e.g., after the results are received), NUMLABS 920 and LABINDEX 930-940 may set back to one, the random number generators may be set back to a default start value, and/or workspaces may be cleared.

Figure 16:
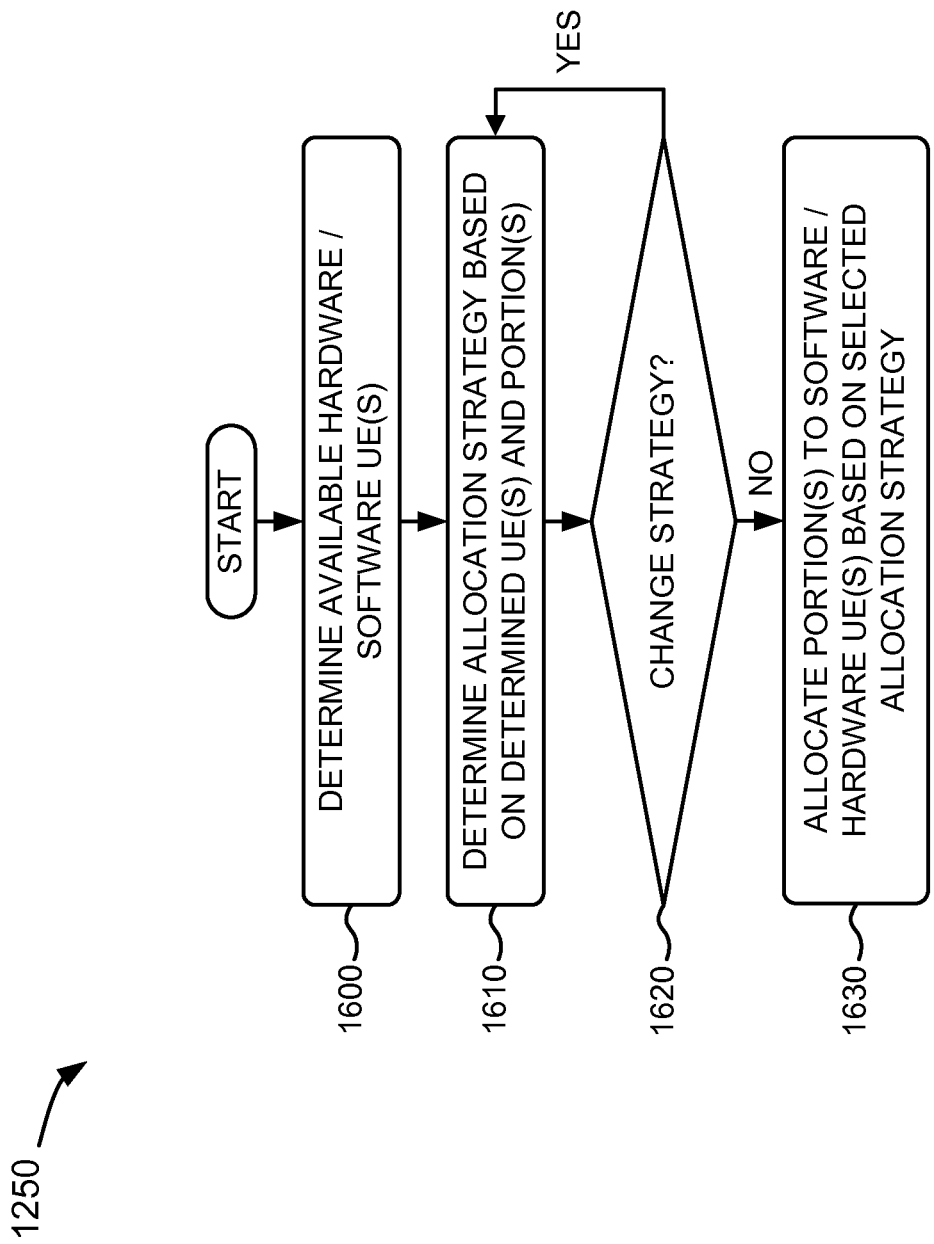

Process block 1250 may include the process blocks illustrated in FIG. 16. As shown in FIG. 16, process block 1250 may include determining available hardware and/or software units of execution (block 1600), and determining an allocation strategy based on the available hardware and/or software units of execution and the program portions (block 1610). For example, in one implementation described above in connection with FIG. 10, allocation selector logic 1000 may receive program portions 550 from analysis logic 520 and/or may determine available software UEs 410 and/or available hardware UEs 200 based on information 1080 indicating the availability of software UEs 410 and/or hardware UEs 200. Allocation selector logic 1000 may return a maximum number of resources (e.g., software UEs 410) available to simultaneously execute program portions 550. If allocation selector logic 1000 returns zero as the number, program portions 550 may be executed on the requesting device (e.g., client 500). Allocation selector logic 1000 may use available software UEs 410 and/or labs 420 to support many different parallel programming models. In one example, allocation selector logic 1000 may select an allocation strategy based on the determined software UEs 410 and/or labs 420 and/or based on program portions 550 (e.g., processing requirements of program portions 550). Allocation selector logic 1000 may select any of logic 1010-1060 for implementation of the allocation strategy.

As further shown in FIG. 16, process block 1250 may determine whether to change a selected allocation strategy (block 1620). If the allocation strategy is to be changed (block 1620—YES), then process block 1250 may return to process block 1610. If the allocation strategy is not to be changed (block 1620—NO), then process block 1250 may include allocating the one or more program portions to the one or more hardware and/or software units of execution based on the selected allocation strategy (block 1630). For example, in one implementation described above in connection with FIG. 10, allocation selector logic 1000 may determine whether to change a selected allocation strategy. If the allocation selector logic 1000 determines that the allocation strategy is to be changed, allocation selector logic 1000 may determine a different allocation strategy based on the determined software UEs 410 and/or labs 420 and/or based on program portions 550. If the allocation strategy is selected and/or determined, allocation selector logic 1000 may allocate one or more program portions 550 to one or more software UEs 410, and/or one or more labs 420.

Figure 17:
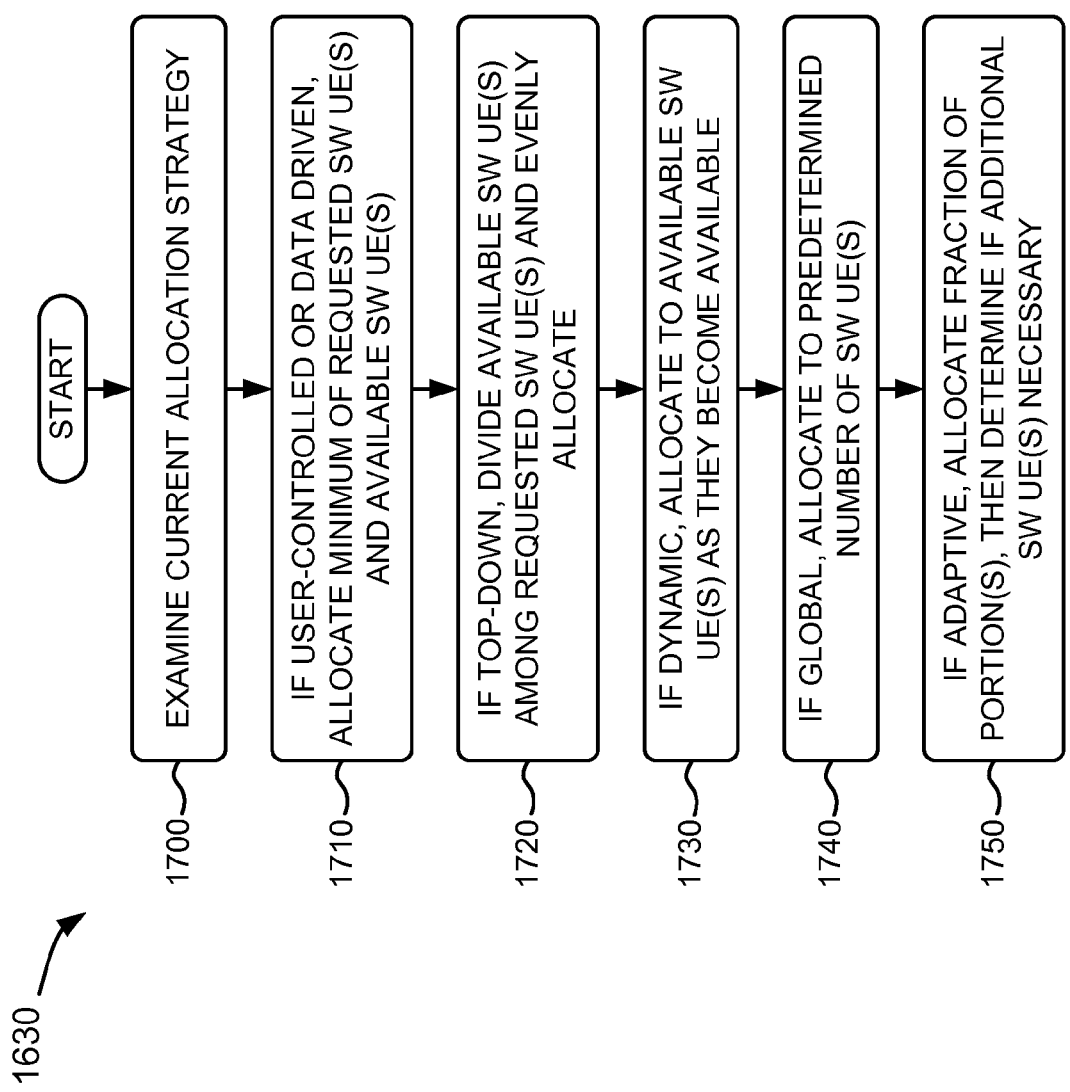

Process block 1630 may include the process blocks illustrated in FIG. 17. As shown in FIG. 17, process block 1630 may include examining a current allocation strategy (block 1700). For example, in one implementation described above in connection with FIG. 10, allocation selector logic 1000 may examine a current allocation strategy and may select one or more of logic 1010-1060 based on the current allocation strategy.

As further shown in FIG. 17, if a user-controlled or a data driven allocation strategy is the current strategy, then process block 1630 may include allocating a minimum number of requested software units of execution and/or available software units of execution for the one or more program portions (block 1710). For example, in one implementation described above in connection with FIG. 10, if allocation selector logic 1000 selects a user-controlled allocation strategy, user-controlled logic 1010 may be implemented and may permit a user to specify how many resources (e.g., software UEs 410 and/or labs 420) are to be allocated to each program portion 550. The allocation may be performed in a first come, first served manner. If allocation selector logic 1000 selects a data driven allocation strategy, data driven logic 1020 may be implemented and may provide (or receive from the user) a program that may review parameters supplied to a program portion and may compute an optimal number of resources (e.g., software UEs 410 and/or labs 420) to be used for the program portion. Alternatively, the program may specify resources to be allocated and/or criteria to guide the allocation. In one example, data user-controlled logic 1010 and/or driven logic 1020 may permit program portions 550 to use the minimum of a requested number of resources (e.g., software UEs 410 and/or labs 420) and an available number of resources.

Returning to FIG. 17, if a top-down allocation strategy is the current strategy, then process block 1630 may include dividing available software units of execution among requested software units of execution and/or evenly allocating the one or more program portions (block 1720). For example, in one implementation described above in connection with FIG. 10, if allocation selector logic 1000 selects a top-down allocation strategy, top-down logic 1030 may be implemented and may divide available resources (e.g., software UEs 410 and/or labs 420) among a number program portions 550 specified by a user (e.g., via client 500). In one example, top-down logic 1030 may divide the number of available resources by the requested number of program portions. If there are fewer resources than the requested number of program portions, top-down logic 1030 may return the number of available resources, and may allocate the program portions among the available resources. If there are more resources than the requested number of program portions, top-down logic 1030 may evenly allocate the program portions among the resources.

As further shown in FIG. 17, if a dynamic allocation strategy is the current strategy, then process block 1630 may include allocating the one or more program portions to available software units of execution as they become available (block 1730). For example, in one implementation described above in connection with FIG. 10, if allocation selector logic 1000 selects a dynamic allocation strategy, dynamic logic 1040 may be implemented and may take the number of program portions 550 to be an upper limit. If a program portion is complete, dynamic logic 1040 may determine what program portions need help, and may assign the program portions to the available resources. Dynamic logic 1040 may allocate program portions according to a priority queue, a round-robin algorithm, and/or any other strategy that precludes a program portion from waiting indefinitely for a resource.

Returning to FIG. 17, if a global allocation strategy is the current strategy, then process block 1630 may include allocating the one or more program portions to a predetermined number of software units of execution (block 1740). For example, in one implementation described above in connection with FIG. 10, if allocation selector logic 1000 selects a global allocation strategy, global logic 1050 may be implemented and may inspect an application associated with program portions 550, and may allocate resources to each parallel section of the application based on additional information (e.g., supplied by the user and/or models), heuristics determining where additional resources would be the most beneficial, etc.

As further shown in FIG. 17, if an adaptive allocation strategy is the current strategy, then process block 1630 may include allocating a fraction of the one or more program portions and then determining if additional software units of execution are needed (block 1750). For example, in one implementation described above in connection with FIG. 10, if allocation selector logic 1000 selects an adaptive allocation strategy, adaptive logic 1060 may be implemented and may allocate resources (e.g., software UEs 410 and/or labs 420) to program portions based on an amount of time each program portion may take for execution. Adaptive logic 1060 may dynamically determine the amount of time, and/or may derive the amount of time from data from previous executions of the software UE. In one example, adaptive logic 1060 may request that a portion of the program portions be completed, may calculate the time to execute the portion, and may determine whether to allocate additional resources to the program portions based on the calculated time.

Exemplary System

Figure 18A:
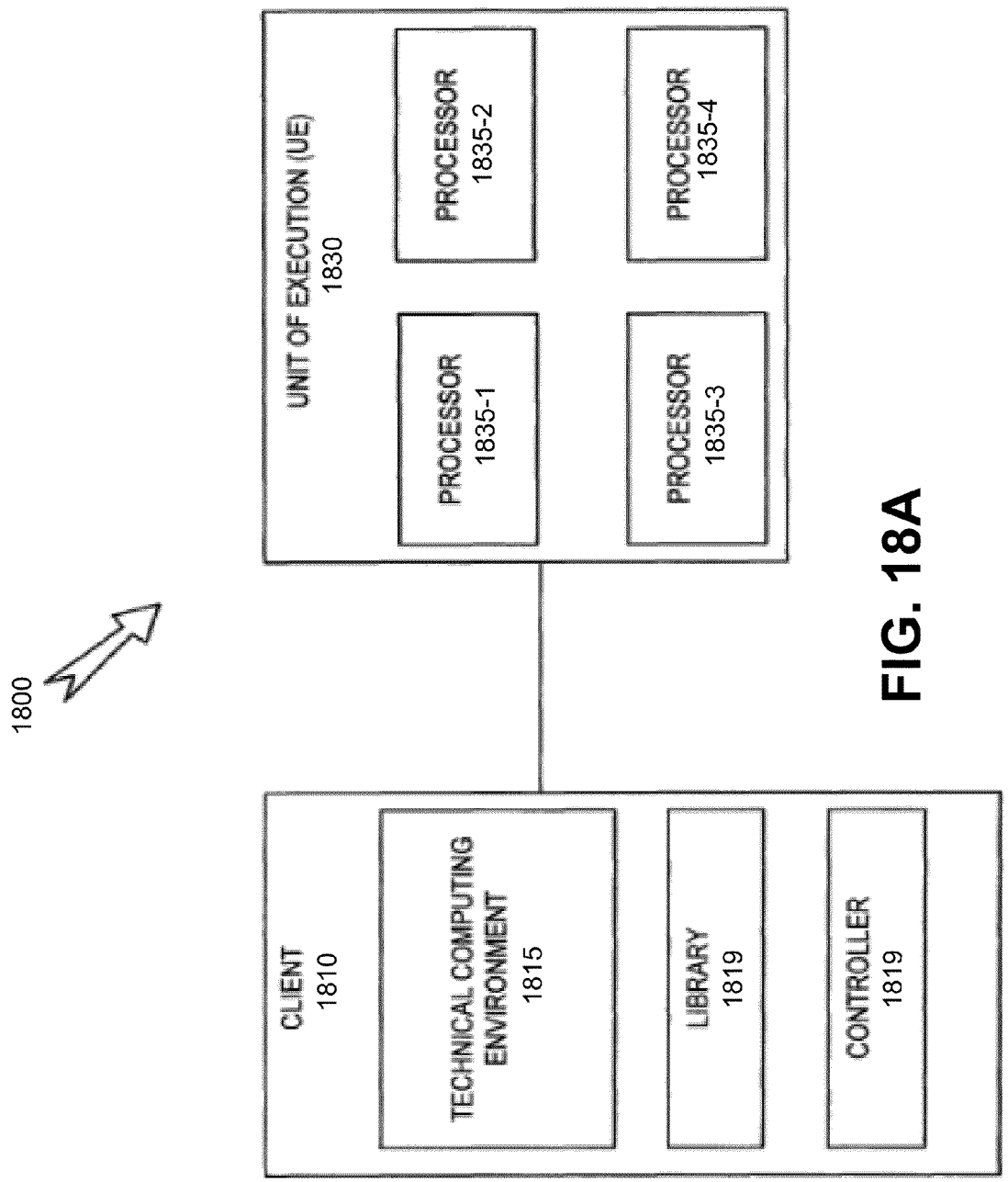
FIG. 18A illustrates an exemplary system that can be configured to practice an exemplary embodiment.

FIG. 18A illustrates an exemplary system 1800 that can be configured to practice an exemplary embodiment. System 1800 may include client 1810 and unit of execution 1830 (hereinafter UE 1830). The embodiment of FIG. 18A is exemplary and other embodiments may include more devices, fewer devices, and/or devices in arrangements other than the arrangement of FIG. 18A.

Client 1810 may include a device capable of sending data to or receiving data from another device, such as UE 1830. "Data," as used herein, may refer to any type of machine-readable information having substantially any format that may be adapted for use in one or more networks and/or with one or more devices. Data may include digital information or analog information. Data may further be packetized and/or non-packetized.

Client 1810 may be a computer, such as a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or generate one or more results.

In one embodiment, client 1810 may include a technical computing environment 1815, a library 1817 and a controller 1819. Other embodiments of client 1810 may include more components, fewer components, or the illustrated components in alternate configurations.

Technical computing environment (TCE) 1815 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, TCE 1815 may include a dynamically typed language that can be used to express problems and/or solutions in mathematical notations familiar to those of skill in the relevant arts. For example, TCE 1815 may use an array as a basic element, where the array may not require dimensioning. In addition, TCE 1815 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 1815 may further provide mathematical functions and/or graphical tools (e.g., for creating plots, surfaces, images, volumetric representations, etc.). In one implementation, TCE 1815 may provide these functions and/or tools using toolboxes (e.g., toolboxes for signal processing, image processing, data plotting, parallel processing, etc.). In another implementation, TCE 1815 may provide these functions as block sets. In still another implementation, TCE 1815 may provide these functions in another way, such as via a library, etc. TCE 1815 may be implemented as a text based environment, a graphically based environment, or another type of environment, such as a hybrid environment that is both text and graphically based.

Library 1817 may include hardware and/or software based logic that operates with TCE 1815 to perform certain operations. For example, an embodiment of library 1817 may include functions to perform certain operations (e.g., signal processing, image processing, parallel processing, data display, etc.) in a text based environment. In another embodiment, library 1817 may include graphical representations (e.g., blocks, icons, images, etc.) to perform certain operations in a graphically based environment (e.g., a gain block, a source block, a filter block, a discrete event generator block, etc.). In still other embodiments, library 1817 may be configured to perform other operations using text, graphics, etc.

Controller 1819 may include hardware and/or software based logic to perform control operations on behalf of a device or component in system 1800. For example, controller 1819 may perform operations to select and/or control parallel processing activities performed by UE 1830 on behalf of client 1810. In one implementation, controller 1819 may operate alone, or with other logic on client 1810, to parse an application, problem, etc., into portions that can be processed in a parallel fashion. Controller 1819 may send the portions to UE 1830 for parallel processing. Controller 1819 may operate on results received from UE 1830 (e.g., results from processors 1835-1, 1835-2, 1835-3, or 1835-4), may assemble the results into a single result for use on client 1810 (e.g., to a display device on client 1810), and/or may make the results available to other applications, objects, devices, etc.

UE 1830 may include a device that performs parallel processing. In one implementation, UE 1830 may perform parallel processing activities on behalf of another device, such as client 1810. In another implementation, UE 1830 may perform parallel processing activities on behalf of itself or on behalf of a host of which UE 1830 is a part. Implementations of UE 1830 may perform parallel processing in a number of ways, such as by performing parallel processing activities related to task parallel processing, data parallel processing, stream parallel processing, etc.

UE 1830 may perform parallel processing using processing devices resident on UE 1830 and/or using processing devices that are remote with respect to UE 1830. For example, UE 1830 may determine that five processors are needed to operate on a problem. UE 1830 may use processors 1835-1, 1835-2, 1835-3, and 1835-4 resident on UE 1830 (shown in FIG. 18A) and may use a fifth processor located on another device (not shown in FIG. 18A) that may be connected to UE 1830 via a link (e.g., hardware based link, such as a wired or wireless link, or a software based link, such as a pointer).

In one implementation, UE 1830 may include processors 1835-1, 1835-2, 1835-3, and 1835-4 (collectively processors 1835). Processors 1835 may include hardware and/or software based logic that performs processing operations. Processors 1835 may include substantially any type of processing device, such as a central processing unit (CPU), a microprocessor, a field programmable gate array (FPGA), an application specific integrated circuit (ASIC), a micro electrical mechanical switch (MEMS), a general purpose graphical processing unit (GPGPU), an optical processor, a biologic processor, etc.

Implementations of UE 1830 and client 1810 may operate in homogenous configurations where both client 1810 and UE 1830 are configured in substantially similar ways (e.g., both devices are running the same operating system, technical computing environment, etc.), or UE 1830 and client 1810 may operate in heterogeneous configurations where client 1810 may be configured differently with respect to UE 1830. Homogeneous and/or heterogeneous configurations of system 1800 may operate in static configurations and/or dynamic configurations.

A static configuration is a configuration where a relationship between a requested operation from client 1810 and an activity performed by UE 1830 is predetermined prior to UE 1830 performing processing activities on behalf of client 1810. For example, a static configuration may dictate that fast Fourier transforms (FFTs) are always sent to processor 1835-1 while interpolation operations are always performed by processor 1835-2. A dynamic configuration may include a configuration where determinations about processing resources on UE 1830 are made when UE 1830 operates on a task and/or when client 1810 sends a request to UE 1830. For example, a dynamic configuration may make determinations with respect to processors 1835 on the fly based on availability of resources for a given processor when a particular activity needs to be performed on behalf of client 1810.

Processors 1835 may be made up of a single device/component or may include more than one device/component. For example, processor 1835-1 may include a pre-processor that operates with another processor, a GPGPU, etc. Alternatively, processor 1835-1 may include a group of processors that operate together and are considered a single processor by UE 1830, control logic operating with UE 1830, or control logic operating with processor 1835-1. Processors 1835 may be clocked at the same rate (e.g., using a single master clock) or may be clocked at different rates (e.g., where processor 1835-1 uses a first clock rate and another processor uses another clock rate).

Implementations of client 1810 and UE 1830 can take many forms and/or configurations. For example, FIG. 18B shows one form of client 1810 and UE 1830.

Figure 18B:
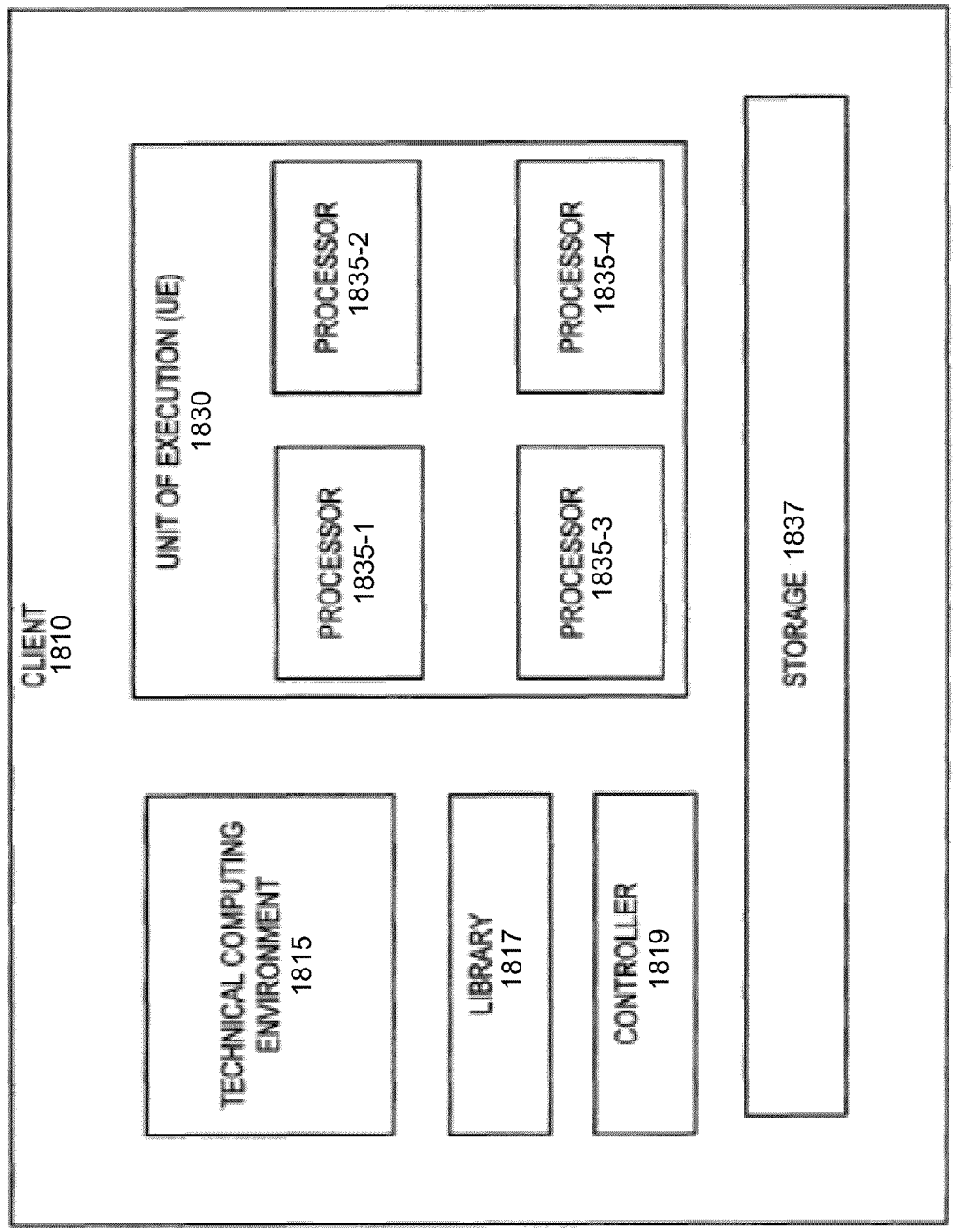
FIG. 18B illustrates an exemplary system that includes a unit of execution operating on a client.

FIG. 18B illustrates an exemplary system that includes UE 1830 operating on client 1810. Client 1810 may include TCE 1815, library 1817, controller 1819, UE 1830 that includes processors 1835, and storage 1837. TCE 1815, library 1817 controller 1819, UE 1830 and processors 1835 may operate as described in connection with FIG. 18A. In FIG. 18B, UE 1830 may be implemented on a board that can be removeably coupled to client 1810 to provide client 1810 with parallel processing capabilities. Implementations of client 1810 may be configured to accommodate substantially any number of boards that can include one or more UE's 1830 per board to provide scalable processing capabilities to client 1810.

Storage 1837 may include hardware and/or software based logic to store information used by client 1810 and/or UE 1830. For example, storage 1837 may store instructions that are used to parse a problem into portions that can be processed in parallel, data associated with the problem, equations associated with the problem, aggregation instructions that allow processors 1835 and/or UE 1830 to assemble results into an aggregate result for use by client 1810, etc. Storage 1837 may reside locally on client 1810 or may be remote with respect to client 1810 and connected thereto via a link. In one embodiment, storage 1837 may be implemented via one or more virtual hard drives. For example, client 1810 may not include hard disk storage and may use a link (e.g., a pointer) to a hard disk located on a machine that is remote with respect to client 1810 (e.g., a remote device operating on a network).

FIG. 18C illustrates an exemplary system 1802 that includes client 1810 coupled to UE 1830 via network 1820. In FIG. 18C, client 1810 and UE 1830 are in a networked configuration where information sent from client 1810 may pass through network 1820 en route to UE 1830. System 1802 may include client 1810, network 1820, UE 1830, display 1850, and specialized hardware 1860. Client 1810 and UE 1830 may operate as previously described.

Network 1820 may include any network capable of transferring data (e.g., packet data or non-packet data). Implementations of network 1820 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.11, etc.

Network 1820 may include network devices, such as routers, switches, firewalls, and/or servers (not shown). Network 1820 may be a hardwired network using wired conductors and/or optical fibers and/or may be a wireless network using free-space optical, radio frequency (RF), and/or acoustic transmission paths. In one implementation, network 1820 may be a substantially open public network, such as the Internet. In another implementation, network 1820 may be a more restricted network, such as a corporate virtual network. Implementations of networks and/or devices operating on networks described herein are not limited to any particular data type, protocol, architecture/configuration, etc.

Display 1850 may include a device that can render information to a user, such as a user of client 1810. Display 1850 may include a cathode ray tube (CRT) device, a liquid crystal display (LCD) device, a plasma display device, a projection based display device (digital light projection (DLP)), etc. Display 1850 may display text and/or graphics to a user based on instructions associated with client 1810, UE 1830, or another device, such as another device on network 1820 (not shown in FIG. 18C).

Specialized hardware 1860 may include a device that performs operations on behalf of another device, such as client 1810 and/or UE 1830. For example, specialized hardware 1860 may include a device that generates code for a target device, that interfaces to another device or network (e.g., a transceiver), that performs operations that are not performed by another device in system 1802 (e.g., a graphics processor for use with display 1850), that stores information (e.g., a redundant array of independent disks (RAID)), etc. Specialized hardware 1860 may be associated with client 1810 or, optionally, with UE 1830 (shown via a broken line). Specialized hardware 1860 may include hardware that is scarce with respect to other types of hardware in system 1802. Hardware may be scarce because of cost, unique features associated with the hardware, scarcity of components used on the hardware, etc.

Implementations, such as the one shown in FIG. 18C, may use resources that are associated with one device in system 1802 but that are not associated with another device in system 1802. For example, client 1810 may send a problem to UE 1830 for parallel processing. The problem may include instructions for displaying a result via a display device. UE 1830 may begin to operate on the problem and may determine that it does not have display device with which to display the result. UE 1830 may send a display request to client 1810, where the request causes information to be displayed on a display device attached to client 1810. In another embodiment, UE 1830 may inform client 1810 that UE 1830 does not have a display (e.g., by sending a bi-directional message to client 1810), and UE 1830 may request the use of display 1850 on client 1810.

Implementations, such at the one in FIG. 18C, may allow UE 1830 to interact directly with devices on client 1810, such as display 1850 and/or specialized hardware 1860, or implementations may allow UE 1830 to make requests to client 1810, where client 1810 interacts with display 1850 and/or specialized hardware 1860 on behalf of UE 1830.

FIG. 18D illustrates an exemplary system 1803 that includes a remote controller 1840 operating with client 1810 and UE 1830. Client 1810, network 1820, and UE 1830 may operate as previously described herein. Remote controller 1840 may include a device running hardware or software based logic to control operations of a device on network 1820. For example, remote controller 1840 may be a device that manages parallel processing activities on behalf of another device, such as client 1810.

In one implementation, client 1810 may send a request to remote controller 1840, where the request is for parallel processing. Remote controller 1840 may maintain a database that identifies parallel processing resources, such as one or more UE's 1830 on network 1820, and/or that identifies which parallel processing resources are available at a particular time. Remote controller 1840 may forward the request from client 1810 to UE 1830, and UE 1830 may perform parallel processing for client 1810. UE 1830 may send a result to remote controller 1840 and remote controller 1840 may forward the result to client 1810, or UE 1830 may send the result directly to client 1810.

Figure 18E:
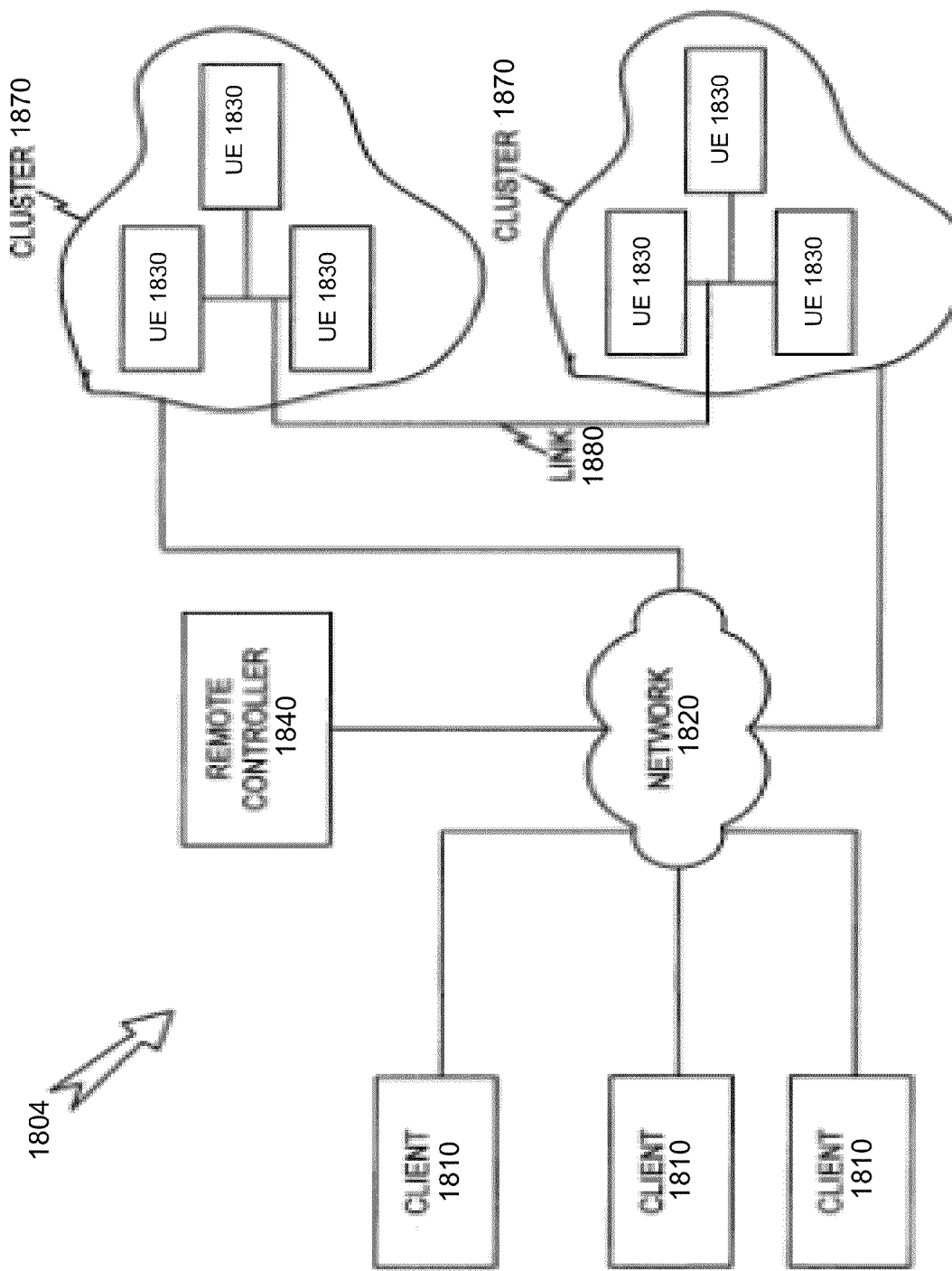
FIG. 18E illustrates an exemplary system that includes clusters and multiple clients.

FIG. 18E illustrates an exemplary system 1804 that includes multiple clients 1810 and UE's 1830 that are arranged in clusters 1870. UE's 1830 may be arranged in a number of configurations, one of which is a cluster 1870. A cluster 1870 is a group of devices that may cooperatively operate to perform an operation. For example, a cluster 1870 may include a number of UE's 1830 that can operate in parallel to solve a problem. Therefore, a cluster 1870 may provide significant parallel processing power, as compared to processing power available in a single UE 1830 or on a single processor 1835. System 1804 may further include a number of clients 1810. Clients 1810 can be arranged in a cluster or other arrangement depending requirements associated with a particular application. One or more clients 1810 can access one or more clusters 1870 using remote controller 1840 or directly without using remote controller 1840.

Clusters 1870 may be used for dedicated types of processing (e.g., task specific processing) and/or may be used for general processing activities. For example, an implementation that uses task specific clusters 1870 may include a first cluster that is used to perform signal processing computations and a second cluster that is used to perform image processing computations. In contrast an implementation that uses general purpose clusters 1870 may send a first portion of a problem to a first cluster and may send the remaining portion of the problem to a second cluster regardless of the types of processing required for the first portion or the second portion of the problem. Other implementations may use a combination of task specific clusters 1870 and general purpose clusters that can be pre-configured (e.g., a static configuration) or dynamically configured.

Figure 18F:
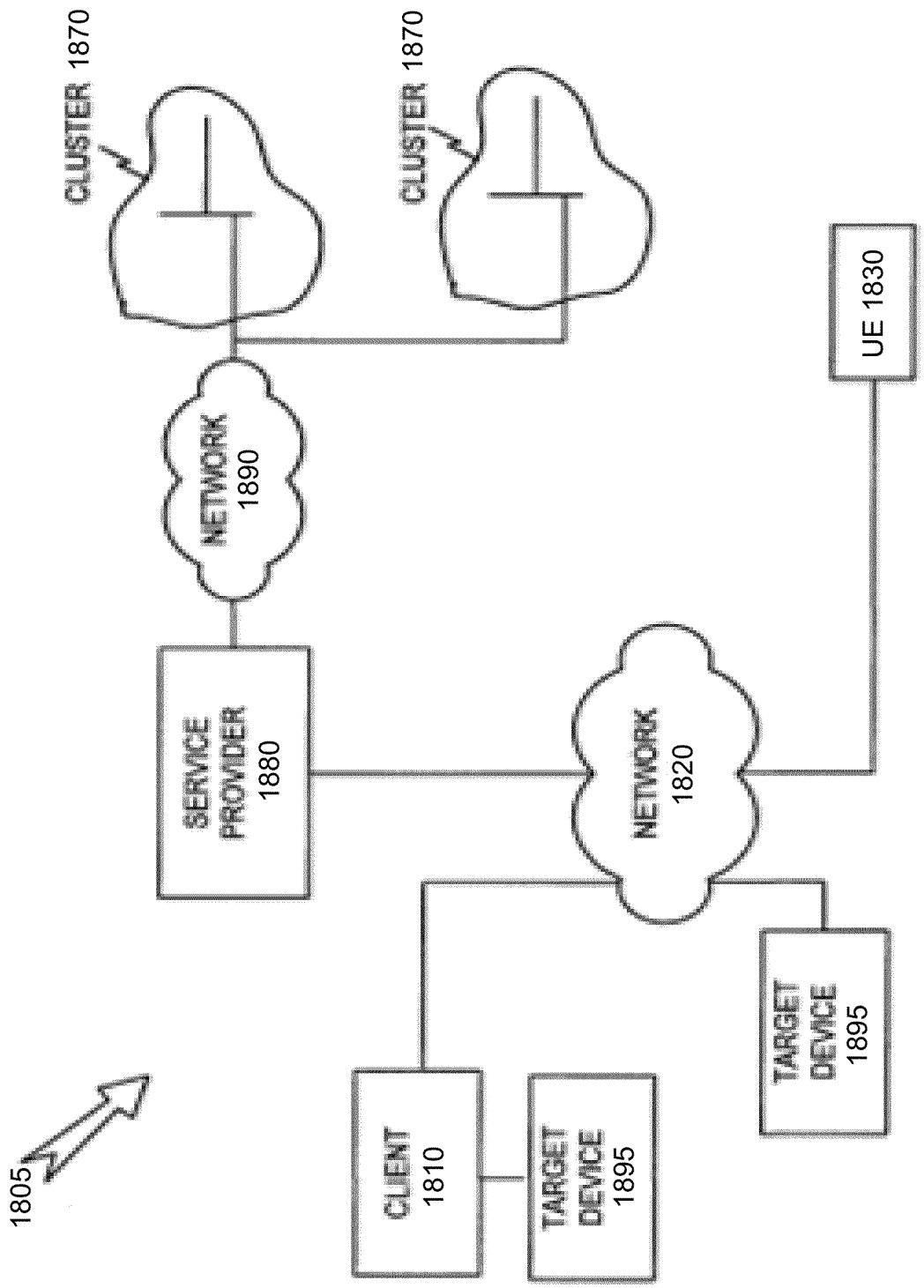
FIG. 18F illustrates an exemplary system that includes a service provider, a client, and a number of units of execution.

FIG. 18F illustrates an exemplary system 1805 that includes a service provider 1880, a client 1810, a UE 1830, and a number of clusters 1870. In one embodiment, system 1805 may include client 1810, network 1820, UE 1830, clusters 1870, service provider 1880, network 1890, and target device 1895. Client 1810, network 1820, UE 1830 and cluster 1870 may operate as described hereinabove.

Service provider 1880 may include logic that makes a service available to another device. For example, service provider 1880 may include a server operated by an entity (e.g., an individual, a corporation, an educational institution, a government agency, etc.) that provides one or more services to a destination. Services may include instructions that are executed by a destination or on behalf of a destination to allow the destination to perform an operation or to perform an operation on behalf of the destination.

Assume, for sake of example, that a telecommunications provider operates a web server that provides one or more web-based services to a destination. The web-based services may allow a destination (e.g., a computer operated by a customer) to perform parallel processing using UE's 1830 that are operated by the telecommunications provider. For example, the customer may be allowed to use clusters 1870 to perform parallel processing when the customer subscribes to the offered web service. Service provider 1880 may maintain a database that includes parameters, such as parameters that indicate the status of UE's 1830, clusters 1870, etc. Service provider 1880 may perform a look-up operation in the database when a request for parallel processing is received from the customer. Service provider 1880 may connect the customer to parallel processing resources that are available based on parameters in the database.

In one implementation, the customer may receive services on a subscription basis. A subscription may include substantially any type of arrangement, such as monthly subscription, a per-use fee, a fee based on an amount of information exchanged between the provider and the customer, a fee based on a number of processor cycles used by the customer, a fee based on a number of processors 1835, UE's 1830, clusters 1870, etc., used by the customer, etc.

Network 1890 may include a network that transfers data. In one embodiment, network 1890 may be similar to network 1820. Network 1890 may be operated by service provider 1880 and may allow service provider 1880 to interact with one or more clusters 1870. For example, service provider 1880 may operate a farm of clusters 1870 to perform subscription based parallel processing for customers, such as customers associated with client 1810. Customers may maintain accounts with service provider 1880 and may access clusters 1870 via network 1890 according to terms, conditions, permissions, etc., associated with the accounts. Network 1890 may be a secure or unsecure private network operated by service provider 1880. Customers may access clusters 1870 via network 1890 using passwords, secure channels (e.g., tunnels), and/or via other techniques.

Target device 1895 may include a device connected to a network or to another device. In one embodiment, target device 1895 may include a device that receives code (e.g., software, instructions, results, etc.) from a device, such as client 1810, UE's 1830, clusters 1870, service provider 1880, etc. Target device 1895 may be an end user device that receives a result produced by parallel processing activities. Target device 1895 may operate on the result and may perform an operation on behalf of itself or on behalf of another device using the result. Target devices 1895 may include controllers, processing devices, systems, applications, etc.

Exemplary Functional Diagram

Figure 19:
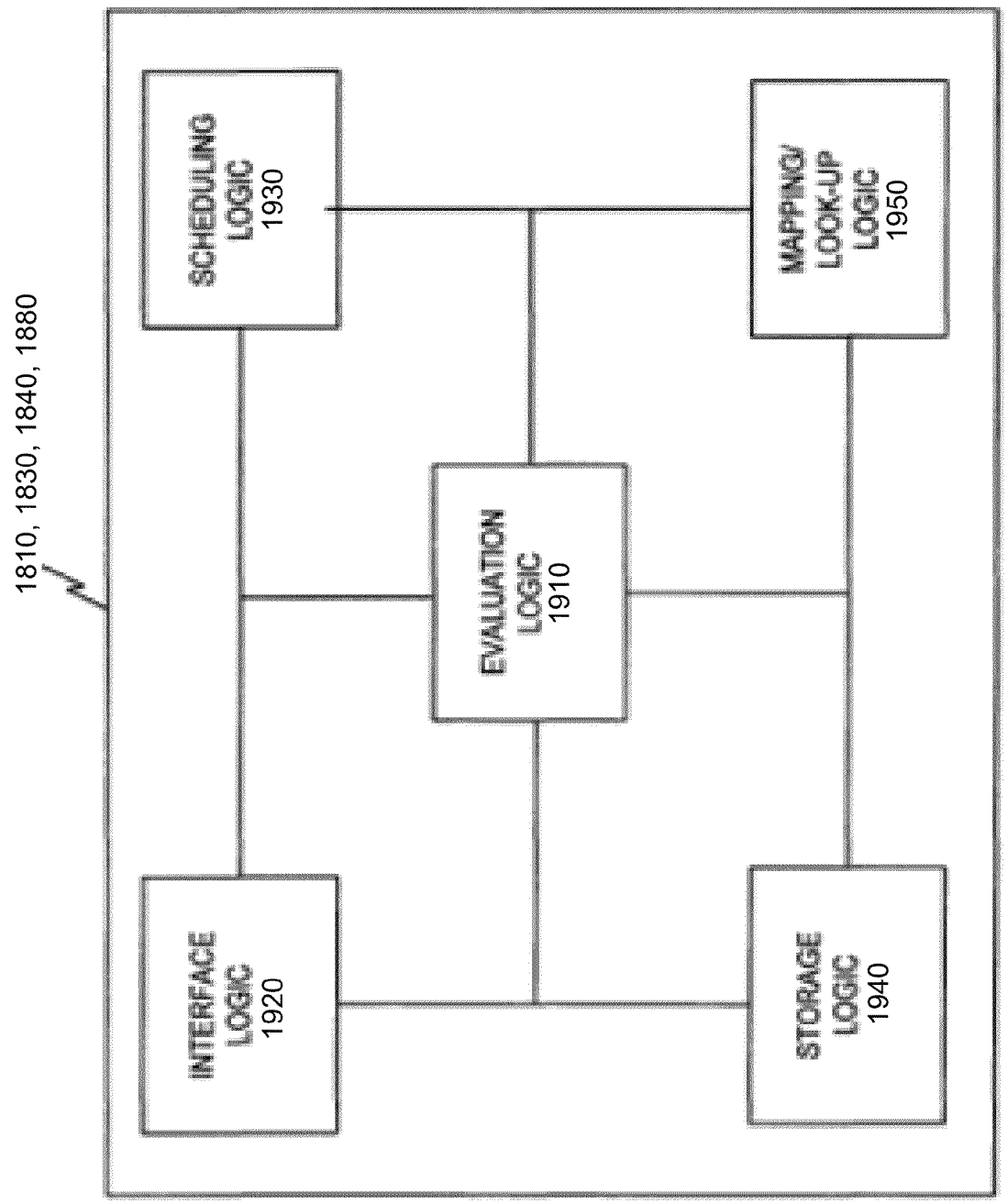
FIG. 19 illustrates an exemplary functional diagram showing logic that can be used to implement parallel processing in an exemplary embodiment.

FIG. 19 illustrates an exemplary functional diagram showing logic that can be used to support parallel processing in an exemplary embodiment. Components in FIG. 19 can reside on a single device, such as client 1810, UE 1830, remote controller 1840, or service provider 1880, or the components of FIG. 19 can be parallel across multiple devices. Moreover, the components of FIG. 19 can be implemented in hardware based logic, software based logic, a combination of hardware and software based logic (e.g., hybrid logic, wetware, etc.). The implementation of FIG. 19 is exemplary, and client 1810, UE 1830, remote controller 1840, service provider 1880, and/or other devices may include more or fewer functional components without departing from the spirit of the invention.

Evaluation logic 1910 may include logic to process instructions or data related to activities. For example, evaluation logic 1910 may parse a problem into a number of portions that can be used to facilitate parallel processing of the problem, combine results into a single result, perform arithmetic operations, etc. Evaluation logic 1910 may further process instructions, reports, data, etc., on behalf of a device hosting evaluation logic 1910 or on behalf of another device (e.g., a remote device).

Interface logic 1920 may send information to or may receive information from another device, component, object (e.g., a software object), etc. In one implementation, interface logic 1920 may include a code-based interface (e.g., an application program interface (API)), and in another implementation, may include a hardware interface, such as a network interface card (NIC).

Scheduling logic 1930 may coordinate activities of devices, components, objects, etc., on client 1810, UE 1830, remote controller 1840, or service provider 1880, etc. For example, scheduling logic 1930 may maintain a list of available resources that can be used for parallel processing (e.g., processors 1835). Scheduling logic 1930 may send information to a determined number of available resources so that the resources can perform parallel processing activities using the information. For example, scheduling logic 1930 may determine that four processors are required to perform a simulation on behalf of client 1810. Scheduling logic 1930 may then determine that processors 1835-1, 1835-2, 1835-3 and 1835-4 are available (e.g., these processors may be idle). Scheduling logic 1930 may send the simulation to processors 1835-1, 1835-2, 1835-3 and 1835-4, or scheduling logic 1930 may schedule another device, such as interface logic 1920, to send the simulation to processors 1835-1, 1835-2, 1835-3 and 1835-4.

Scheduling logic 1930 may receive results from processors 1835 and may forward the results to a destination, such as a requesting device. Alternatively, scheduling logic 1930 may instruct processors 1835 to send the results directly to the requesting device. Scheduling logic 1930 may determine when processors 1835-1, 1835-2, 1835-3 and 1835-4 are finished processing and may send other information, such as another simulation, a mathematical problem, etc., to processors 1835-1, 1835-2, 1835-3 and 1835-4 when they become available.

Storage logic 1940 may store information related to client 1810, UE 1830 or remote controller 1840. In one exemplary embodiment, storage logic 1940 may store instructions, equations, functions, data, communication protocols, availability information for devices (e.g., processors 1835), etc.

Mapping/lookup-logic 1950 may perform mapping/lookup activities on behalf of a device, component, object, etc. For example, processors 1835 may be operating on a problem that will cause each processor to generate a message during the processing. For example, each processor may be configured to generate a status message when it is half-way through its portion of the problem. Since each processor may generate substantially the same message, it may be advantageous to avoid sending four similar (or identical) messages to a destination, such as client 1810. Mapping/look-up logic 1950 may fold the four messages into a single message which is sent to a destination, thereby decreasing the number of messages sent to the destination. Mapping/look-up logic 1950 may also receive a single request, instruction, value, etc., and may map the request, instruction, value, etc., to a number of messages for use by a number of devices, such as processors 1835.

Mapping/look-up logic 1950 may also perform other activities. For example, in one implementation, UE 1830 may send a value to client 1810 instead of an instruction. Client 1810 may receive the value via interface logic 1920 and may pass the value to mapping/look-up logic 1950 where the value is matched to an instruction using a database, such as a database stored in storage logic 1940. When mapping/look-up logic 1950 has looked up the instruction that is associated with the value, client 1810 may process the instruction.

Implementations of client 1810, UE 1830, remote scheduler 1840, service provider 1880, and/or other devices may include other types of logic. For example, implementations may use display logic to display information to a user, security logic to implement and/or administer security features, accounting logic to track charges associated with parallel processing activities, etc.

Exemplary Device Architecture

Figure 20:
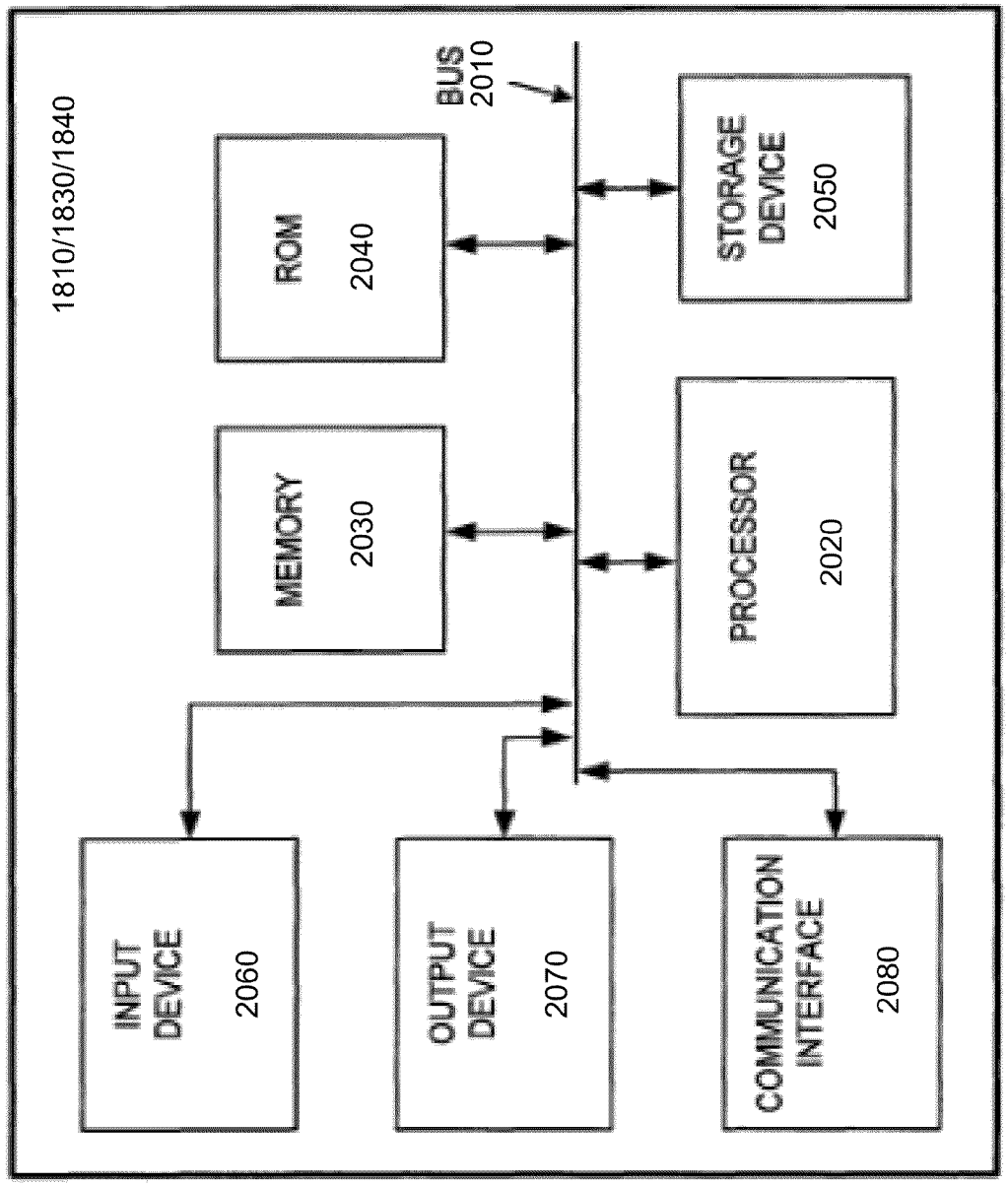
FIG. 20 illustrates an exemplary architecture for implementing the client or the unit of execution of FIGS. 18A-F.

FIG. 20 illustrates an exemplary architecture for implementing client 1810. It will be appreciated that UE 1830, remote scheduler 1840, service provider 1880, and/or other devices that can be used with system 1800, 1819, or 1803, 1804, 1805 may be similarly configured. As illustrated in FIG. 20, client 1810 may include a bus 2010, a processor 2020, a memory 2030, a read only memory (ROM) 2040, a storage device 2050, an input device 2060, an output device 2070, and a communication interface 2080.

Bus 2010 may include one or more interconnects that permit communication among the components of client 1810. Processor 2020 may include any type of processor, microprocessor, or processing logic that may interpret and execute instructions (e.g., an FPGA). Processor 2020 may include a single device (e.g., a single core) and/or a group of devices (e.g., multi-core). Memory 2030 may include a random access memory (RAM) or another type of dynamic storage device that may store information and instructions for execution by processor 2020. Memory 2030 may also be used to store temporary variables or other intermediate information during execution of instructions by processor 2020.

ROM 2040 may include a ROM device and/or another type of static storage device that may store static information and instructions for processor 2020. Storage device 2050 may include a magnetic disk and/or optical disk and its corresponding drive for storing information and/or instructions.

Input device 2060 may include any mechanism or combination of mechanisms that permit an operator to input information to client 1810, such as a keyboard, a mouse, a touch sensitive display device, a microphone, a pen-based pointing device, and/or a biometric input device, such as a voice recognition device and/or a finger print scanning device. Output device 2070 may include any mechanism or combination of mechanisms that outputs information to the operator, including a display, a printer, a speaker, etc.

Communication interface 2080 may include any transceiver-like mechanism that enables client 1810 to communicate with other devices and/or systems, such as client 1810, UE 1830, remote controller 1840, service provider 1880, etc. For example, communication interface 2080 may include one or more interfaces, such as a first interface coupled to network 1820 and/or a second interface coupled to another device, such as remote controller 1840. Alternatively, communication interface 2080 may include other mechanisms (e.g., a wireless interface) for communicating via a network, such as a wireless network. In one implementation, communication interface 2080 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Client 1810 may perform certain functions in response to processor 2020 executing software instructions contained in a computer-readable medium, such as memory 2030. A computer-readable medium may be defined as one or more memory devices and/or carrier waves. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary Messaging

Figure 21A:
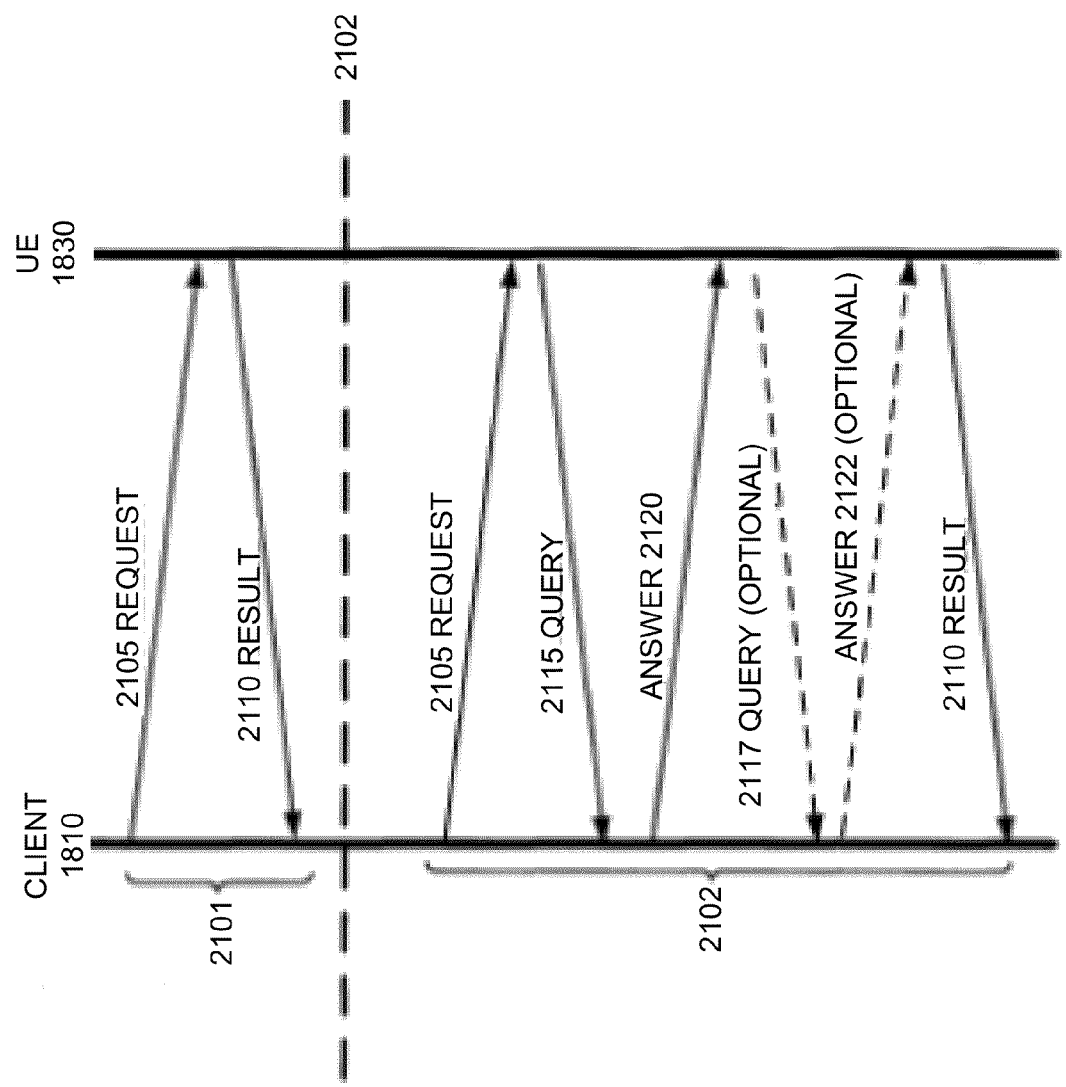
FIG. 21A illustrates an exemplary timing diagram showing an exchange of messages between a client and a unit of execution according to an exemplary embodiment.

FIG. 21A illustrates an exemplary timing diagram showing an exchange of messages between client 1810 and UE 1830 according to an exemplary embodiment. FIG. 21A illustrates two exemplary communication exchanges, 2101 and 2102, between client 1810 and UE 1830. These communication exchanges are exemplary and other types of communication exchanges can be used. For example, alternative communication exchanges can include more messages, different messages, and/or messages in orders that differ from those of FIG. 21A.

In exemplary communication exchange 2101, client 1810 may send a request 2105 to UE 1830. For example, request 2105 may include data (e.g., a variable), code for an algorithm, simulation code, etc., and request 2105 may operate to request parallel processing resources from UE 1830. UE 1830 may operate on request 2105 and may return a message, such as result 2110. Result 2110 may include a solution to a problem, data to be displayed on display 1850, code to be run on specialized hardware 1860 or target device 1895, etc.

In exemplary communication exchange 2102, client 1810 may send request 2105 to UE 1830. UE 1830 may operate on request 2105 and may send a query 2115 to client 1810 based on the processing. Query 2115 may be a message that operates as a request. For example, UE 1830 may generate query 2115 to request a missing resource or to request access to a resource on client 1810 (e.g., such as access to available memory on client 1810, a request for one or more variables stored in a workspace on client 1810, etc). Resources that may be needed by UE 1830 but that may not be present on UE 1830 may include, but are not limited to, variables, functions, algorithms, data, memory, operating system components (e.g., files, extensions, etc.), etc. Other implementations of query 2115 may include other types of information, (e.g., a request for a password or other type of permission that may be required before UE 1830 can perform a task on behalf of client 1810, etc.). Query 2115 may allow UE 1830 to make requests on demand during processing activities performed on behalf of client 1810. For example, UE 1830 may send query 2115 anytime a variable is needed during processing.

Client 1810 may process query 2115 and may generate answer 2120. Answer 2120 may include information that addresses query 2115. For example, answer 2120 may be a message that includes a password, an authorization to allow UE 1830 to perform a task, a file, a variable, a function, a script, data, an address, etc. UE 1830 may process answer 2120 and may perform parallel processing on behalf of client 1810 based on information in answer 2120 and/or request 2105. UE 1830 may generate result 2110 based on the processing and may send result 2110 to client 1810.

Implementations, such as the one illustrated in FIG. 21A, may allow UE 1830 to send additional queries 2117 to client 1810 and may allow client 1810 to send additional answers 2122 (shown by dashed lines). Exemplary implementations may use substantially any number of queries 2115/2117 and or answers 2120/2122.

Figure 21B:
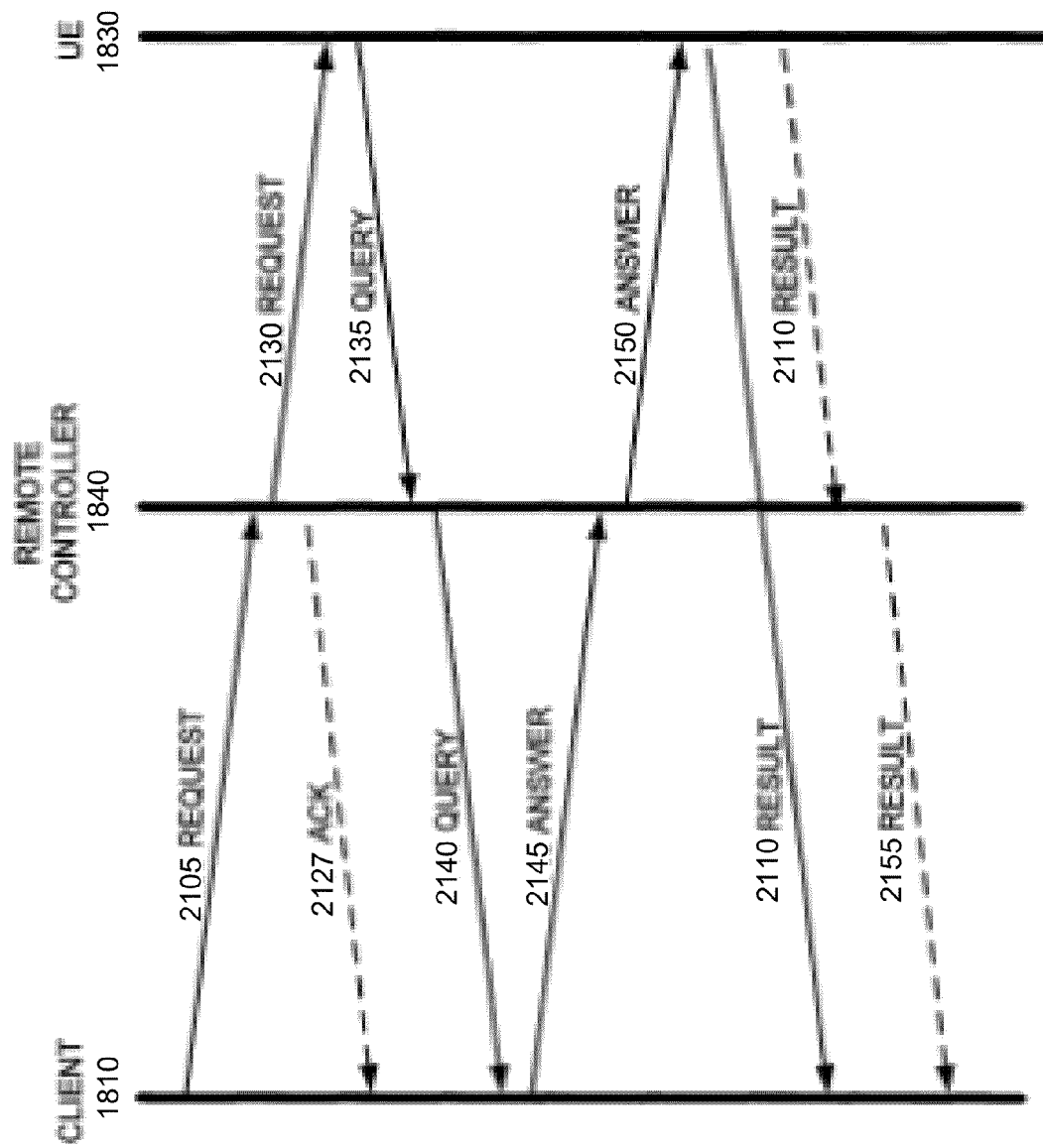
FIG. 21B illustrates an exemplary timing diagram showing an exchange of messages between a client, a remote controller and a unit of execution according to an exemplary embodiment.

FIG. 21B illustrates an exemplary timing diagram showing an exchange of messages between a client 1810, UE 1830, and remote controller 1840 according to an exemplary embodiment. Client 1810 may send request 2105 to remote controller 1840 instead of directly to UE 1830 (as shown in FIG. 21A). Remote controller 1840 may process request 2105 and may send an acknowledgement 2127 to client 1810 to inform client 1810 that request 2105 was received and understood.

Remote controller 1840 may forward request 2105 to UE 1830 as request 2130. In one implementation, remote controller 1840 may convert request 2105 from an incoming format into an outgoing format compatible with UE 1830. Request 2130 may be in the outgoing format. In another implementation, remote controller 1840 may forward request 2105 to UE 1830 as request 2130 without performing any conversion actions on request 2105.

UE 1830 may process request 2130 and may generate query 2135 to request information from a device, such as remote controller 1840, client 1810, etc. In one implementation, remote controller 1840 may respond to query 2135 without sending a message to another device (e.g., client 1810). In another implementation, remote controller 1840 may forward query 2135 to another device (e.g., client 1810) as query 2140. Remote controller 1840 may or may not convert query 2135 from an incoming format to an outgoing format before sending query 2140 to client 1810.

Client 1810 may process query 2140 and may generate an answer 2145. For example, query 2135 may request a password that allows UE 1830 to access sensitive data required for a simulation performed on behalf of client 1810. Client 1810 may send the password to UE 1830 via answer 2145. In one implementation, client 1810 may send answer 2145 to remote controller 1840, and remote controller 1840 may forward answer 2150 to UE 1830 for processing thereon. In another implementation, client 1810 may send answer 2145 directly to UE 1830 without assistance from remote controller 1840.

UE 1830 may process answer 2150 and/or information in request 2130 and may produce result 2110. In one implementation, UE 1830 may send result 2110 directly to client 1810 without assistance from remote controller 1840. In another implementation, UE 1830 may send result 2110 to remote controller 1840 and remote controller 1840 may forward result 2110 to client 1810 as result 455. In alternative implementations, client 1810, remote controller 1840, and UE 1830 can send and/or receive additional messages.

Exemplary Data Structure

Figure 22A:
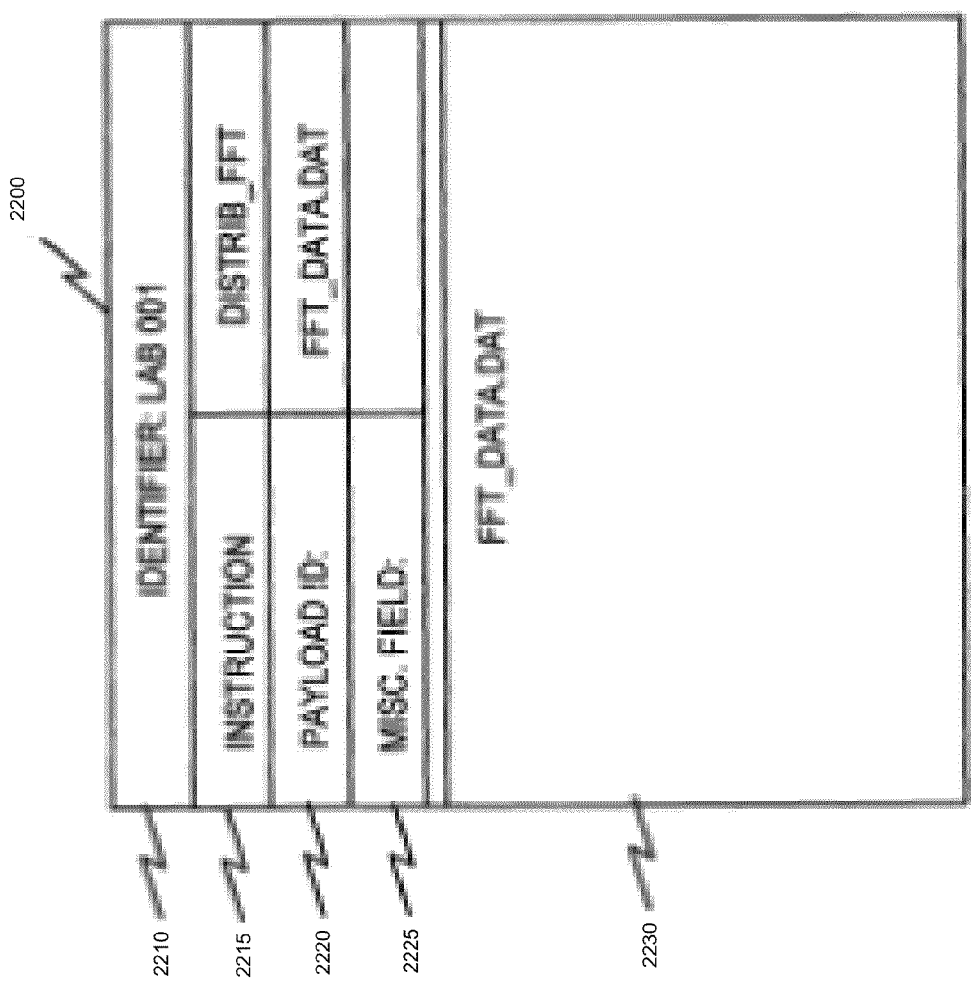
FIG. 22A illustrates an exemplary data structure for storing information associated with a client.

FIG. 22A illustrates an exemplary data structure 2200 for storing information associated with client 1810. Data structure 2200 may be implemented via a computer-readable medium that can be used to store information in a machine-readable format. Exemplary implementations may use substantially any number of data structures 2200 to store information associated with client 1810. Implementations of data structure 2200 may be populated via an operator or a device, such as a device in system 1800, 1802 or 1803, 1804, etc.

In one implementation, data structure 2200 may include information arranged in a row and column format to facilitate interpretation by users of client 1810 and/or by devices, logic (e.g., evaluation logic 1910), etc. Other implementations of data structure 2200 may be configured in other ways.

Data structure 2200 may include identifier 2210, instruction 2215, payload ID 2220, miscellaneous field 2225, and payload 2230. Identifier 2210 may include information that identifies a user or device associated with other information in data structure 2200, such as instruction 2215 or payload 2230. For example, client 1810 may store a file that is associated with UE 1830. Identifier 2210 may include information that uniquely identifies UE 1830.

Instruction 2215 may include information that identifies an instruction that is associated with a device identified via identifier 2210. For example, instruction 2215 may include information that identifies a type of processing that a UE 1830 will perform on behalf of client 1810. In one implementation, instruction 2215 may include information that identifies how payload 2230 will be divided for parallel processing (e.g., what portion of payload 2230 should be processed on a particular processor 1835). In another implementation, instruction 2215 may include a general instruction and UE 1830 may determine how to process the instruction in a parallel manner.

Payload ID 2220 may include information that identifies a payload that will be operated on by a device that performs parallel processing on behalf of client 1810. For example, a payload may include data that is operated on using a parallel fast Fourier transform (FFT) processing technique. Payload ID 2220 may identify where the payload is stored (e.g., an address, a device name, a file name, etc.). In one implementation, the payload may be part of data structure 2200 (e.g., the implementation of FIG. 22A) and in another implementation, the payload may be stored remotely with respect to data structure 2200 (e.g., data structure 2200 is stored in first memory location and payload 2230 is stored in a second memory location or on a different storage device).

Miscellaneous field 2225 may include information that can be useful for client 1810 or other devices, such as UE 1830. For example, miscellaneous field 2225 may include a password, a time value, a date value, payload size information, error handling information, etc.

Payload 2230 may include information that is operated on by client 1810, UE 1830, or another device. For example, payload 2230 may include data or other information that is operated on by processors 1835 to produce a result.

Figure 22B:
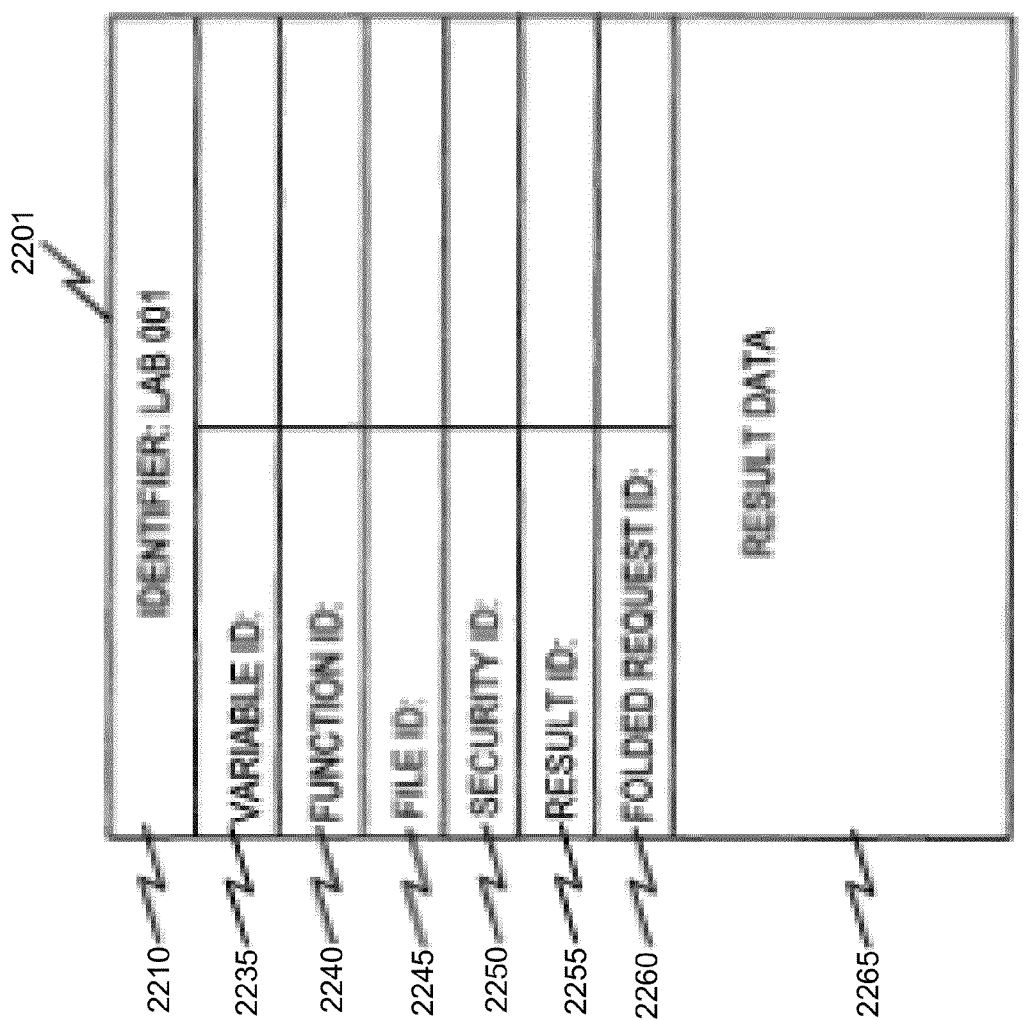
FIG. 22B illustrates an exemplary data structure for storing information associated with a unit of execution.

FIG. 22B illustrates an exemplary data structure 2201 for storing information associated with UE 1830. Data structure 2201 may be similar to data structure 2200 in organization and/or in other ways, or data structure 2201 may be different than data structure 2200. The data structure of FIG. 22B is illustrative and other implementations of data structure 2201 may take other forms, may include other types of information, and/or may include information in an arrangement that differs from the arrangement of FIG. 22B.

Data structure 2201 may include identifier 2210, variable ID 2235, function ID 2240, file ID 2245, security ID 2250, result ID 2255, folded request ID 2260 and result data 2265. Identifier 2210 may identify a unit of execution, processor, etc., that is associated with data structure 2201. Variable ID 2235 may include information that identifies a variable used with UE 1830 or with another device. For example, in one embodiment, variable ID 2235 may include information that identifies a variable that UE 1830 needs to complete parallel processing on payload 2230 (FIG. 22A). In this embodiment, UE 1830 may send data structure 2201 to client 1810 and client 1810 may read information in variable ID 2235 to identify one or more variables that are needed by UE 1830. Client 1810 may send the identified one or more variables to UE 1830 so that UE 1830 can perform parallel processing on behalf of client 1810. In another embodiment, variable ID 2235 may identify variables that UE 1830 makes available to processors 1835 during parallel processing activities.

Function ID 2240 may include information that identifies a function associated with UE 1830. For example, function ID 2240 may identify a function that UE 1830 will request from client 1810, a function that is stored on UE 1830 for use with one or more processors 1835, etc.

File ID 2245 may include information that identifies a file associated with UE 1830. For example, file ID 2245 may identify a file that UE 1830 will request from client 1810, a file stored on UE 1830 for use in performing parallel processing activities, etc.

Security ID 2250 may include security information associated with UE 1830. For example, in one embodiment, security ID 2250 may identify a password or other type of authorization mechanism that UE 1830 uses to perform parallel processing on behalf of client 1810. In another embodiment, security ID 2250 may include a request for an authorization mechanism (e.g., a password, digital certificate, watermark, key, token, etc.). For example, UE 1830 may send a portion of data structure 2201 that includes security ID 2250 to another device, such as client 1810 or remote controller 1840.

Result ID 2255 may include information that identifies a result associated with UE 1830. For example, UE 1830 may perform parallel processing on behalf of client 1810 using payload 2230. UE 1830 may generate a result file that includes one or more results of the parallel processing activities. Result ID 2255 may include a file name that identifies a file storing the one or more results. In one embodiment, result ID 2255 can refer to a folded result that is made up of two or more other results. A receiving device may process the folded result and may perform an operation based on the processing.

Folded request ID 2260 may include information about folded requests associated with UE 1830. For example, UE 1830 may perform parallel processing using two or more processors. During the processing, the two or more processors may generate similar or identical messages (e.g., requests, status indicators (e.g., flags), error messages, intermediate results, etc.). UE 1830 may include logic (e.g., mapping/look-up logic 1950) that allows UE 1830 to fold the similar and/or identical messages into a single message that can be sent to another device, such as client 1810 or remote controller 1840. Folded request ID 2260 may store the folded message or may store an identifier for the folded message, such as a link, etc. A receiving device, such as client 1810, may process the folded message and may use the folded message to access, e.g., look-up other information, etc.

Result data 2265 may include one or more results generated by UE 1830. Alternatively, result data 2265 may include one or more results generated on behalf of UE 1830 by another device (e.g., another parallel processing device connected to UE 1830 via a network). In one embodiment, result ID 2255 may identify result data 2265, and result data 2265 may be associated with data structure 2201, as shown in FIG. 22B, or result data 2265 may be located remotely with respect to data structure 2201 and referenced via result ID 2255 (e.g., via an address, pointer, link, etc.).

Implementations of data structures 2200, 2201, and/or other data structures compatible with client 1810, UE 1830, remote controller 1840, service provider 1880, etc., can be used locally on a device (e.g., stored, read, copied, transferred from one component to another component, etc.) or may be sent from one device to another device over a communication medium (e.g., a wired link, a wireless link, a network, a bus, etc.). Therefore, embodiments of data structures discussed herein are not limited to any particular implementation, device, configuration, etc. For example, some or all of data structures 2200 and/or 2201 can be used as code-based interfaces (e.g., APIs) to facilitate the exchange of information in exemplary embodiments.

Exemplary Application Program Interface

Figure 23A:
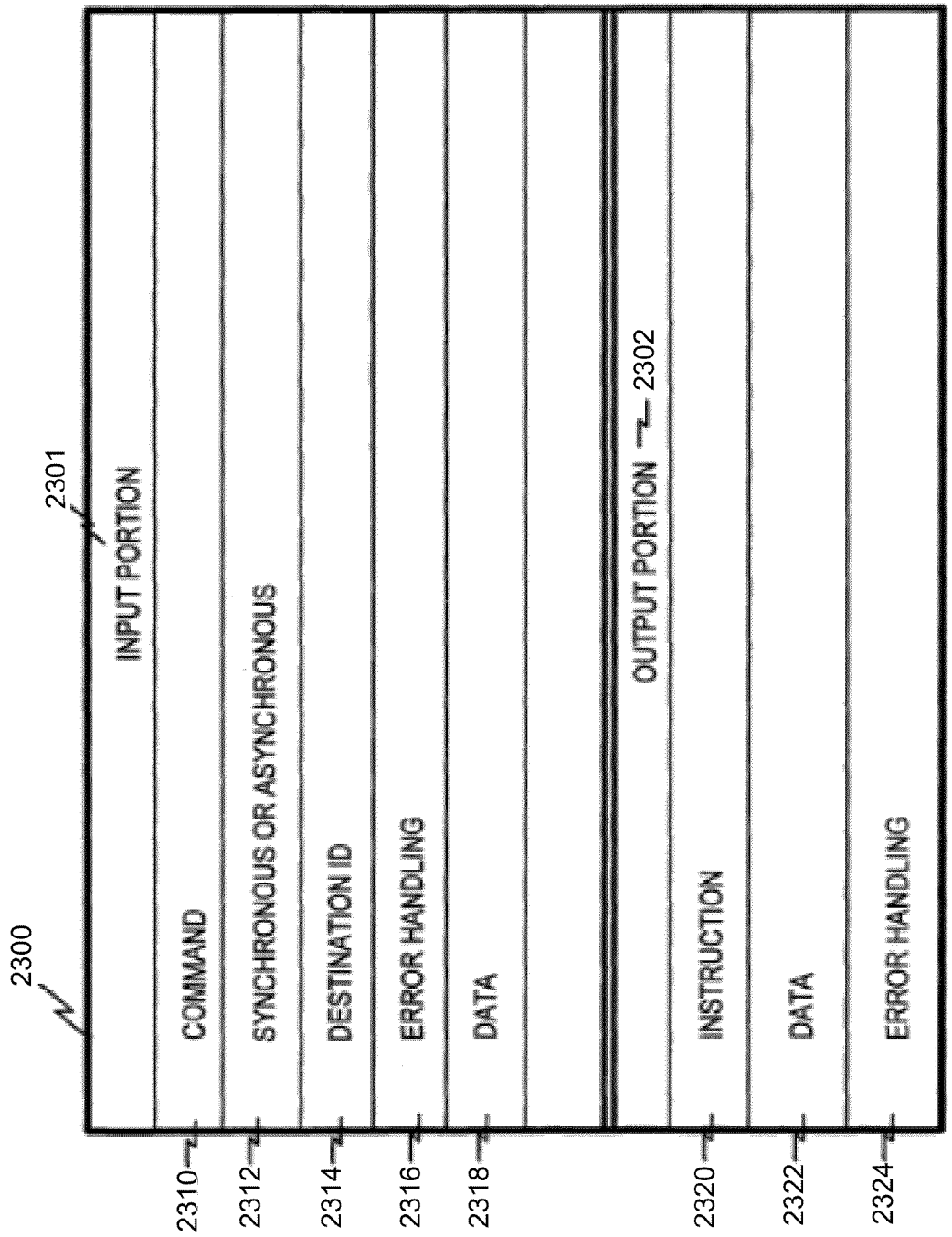
FIG. 23A illustrates an exemplary application program interface that can be used in an exemplary embodiment of a client.

FIG. 23A illustrates an exemplary API 2300 that can be used in an exemplary embodiment of client 1810. API 2300 may be a code-based interface that can be used by systems, devices, objects, etc., to exchange information with another system, device, object, etc. In one embodiment, API 2300 may operate on client 1810 and may allow client 1810 to receive information from and/or send information to UE 1830, remote controller 1840, service provider 1880, etc. Embodiments of API 2300 may be adapted for transmission from one device to another, e.g., by appending a header to API 2300 to allow API 2300 to be sent over network 1820 or 1890.

API 2300 may represent a structured format for distributing information across system 1800, 1802, 1803, 1804, 1805, etc.

API 2300 may include input portion 2301 and output portion 2302. Input portion 2301 may include information that can be used to allow client 1810 to receive information (e.g., data, instructions, identifiers, etc.) from another device, object, application, etc. In one embodiment, input portion 2301 may include command 2310, synchronous or asynchronous 2312, destination identifier (ID) 2314, error handling 2316, and data 2318.

Command 2310 may include information that identifies a command, instruction, request, return value, etc. For example, command 2310 may include the contents of query 2115 (FIG. 21A) from UE 1830. Synchronous or asynchronous 2312 may include information that identifies whether client 1810 should process information associated with command 2310 in a synchronous or an asynchronous manner.

Destination ID 2314 may include information that identifies a device, application, object, etc., that can send information to client 1810. For example, destination ID 2314 may include information that identifies a device that sends information to client 1810 via API 2300. In another embodiment, destination ID may include information that identifies a device, application, object, etc., that can receive information from client 1810 via an output portion of API 2300. For example, destination ID 2314 may include information that identifies UE 1830, processors 1835, clusters 1870, etc. Destination ID 2314 may include an address, name, port number, socket ID, link, pointer, etc.

Error handling 2316 may include information that can be used by client 1810 to identify or correct an error, such as an error reported by UE 1830 to client 1810. Data 2318 may include information that identifies data that can be used by client 1810 or that constitutes data used by client 1810. For example, UE 1830 may generate a result that includes data, such as a matrix, when performing parallel processing on behalf of client 1810. Data 2318 may include the matrix or may include information about the matrix, such as a link, file name, address, etc.

Output portion 2302 may include instruction 2320, data 2322, and error handling 2324. Instruction 2320 may include information that that is used by a destination (e.g., a device, application, object, etc.) to perform an operation on behalf of client 1810. For example, instruction 2320 may include information that instructs UE 1830 to perform an operation (e.g., performing parallel matrix computations) on behalf of client 1810.

Data 2322 may include data or may include information that identifies data that can be used by a destination (e.g., UE 1830, clusters 1870, etc.) to perform an operation on behalf of client 1810. For example, data 2322 may include the matrix on which parallel processing will be performed by UE 1830. Error handling 2324 may include information that identifies or reports an error to a destination.

Figure 23B:
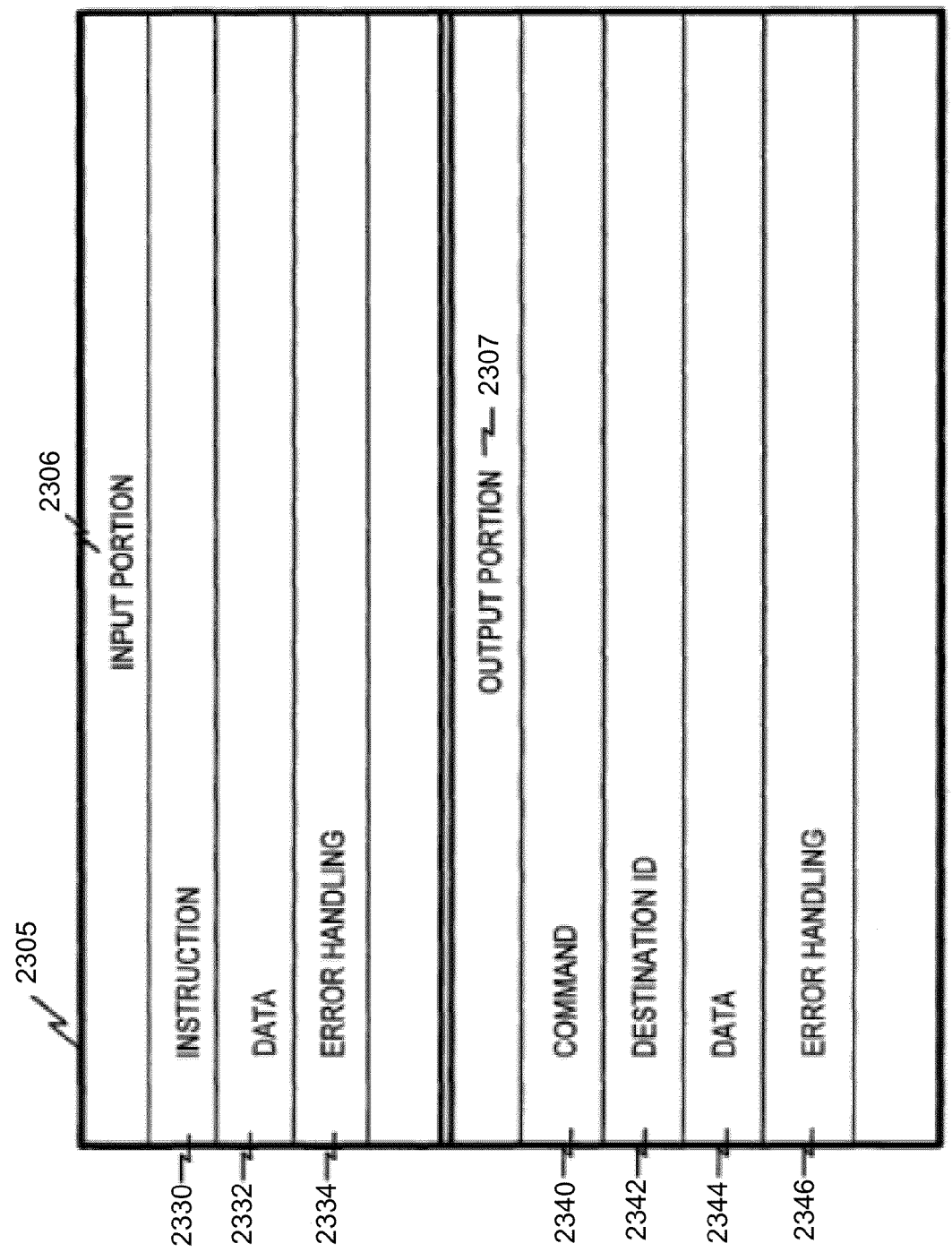
FIG. 23B illustrates an exemplary application program interface that can be used in an exemplary embodiment of a unit of execution.

FIG. 23B illustrates an exemplary application program interface 2305 that can be used in an exemplary embodiment of a unit of execution. API 2305 may be a code-based interface that can be used by systems, devices, objects, etc., to exchange information with another system, device, object, etc. In one embodiment, API 2305 may operate on UE 1830 and may allow UE 1830 to receive information from and/or send information to client 1810, remote controller 1840, service provider 1880, etc. Embodiments of API 2305 may be adapted for transmission from one device to another, e.g., by appending a header to API 2305 to allow API 2305 to be sent over a network.

API 2305 may include an input portion 2306 and an output portion 2307. Input portion 2306 may include information that is received by UE 1830 and output portion 2307 may include information sent from UE 1830 to another device, application, object, etc.

Input portion 2306 may include instruction 2330, data 2332, and error handling 2334. Instruction 2330 may include one or more executable instructions that are used by UE 1830 to perform parallel processing on behalf of another device, such as client 1810. Instruction 2330 may include an actual instruction, or an identifier for an instruction, e.g., a link, address, etc. In one embodiment the contents of instruction 2320 (from API 2300 in FIG. 23A) may be in instruction 2330.

Data 2332 may include information that is operated on by UE 1830. Alternatively, data 2332 may include an identifier for information that is operated on by UE 1830 (e.g., a link, address, etc.). For example, client 1810 may send an instruction 2320 and data 2322 to UE 1830 for processing using API 2300. UE 1830 may receive the instruction via instruction 2320 and may receive the data via data 2332. UE 1830 may operate on the data using the instruction while performing parallel processing on behalf of client 1810. Error handling 634 may include information that identifies an error. For example, client 1810 may send an error message to UE 1830. UE 1830 may receive the error message via error handling 2334.

Output portion 2307 may include command 2340, destination ID 2342, data 2344 and error handling 2346. Command 2340 may include information that identifies a command sent from UE 1830 to another device. For example, UE 1830 may perform processing for client 1810 and may generate a result that includes a command, such as a plot command. UE 1830 may send the command to client 1810 via command 2340.

Destination ID 2342 may include information that identifies a device that will receive information from UE 1830. Data 2344 may include information produced by UE 1830 based on performing parallel processing activities. For example, data 2344 may include information making up a result, a link to a file that includes a result, etc. Error handling 2346 may include information that identifies an error. For example, UE 1830 may have generated an error while performing parallel processing (e.g., UE 1830 may not have had enough memory to complete a computation). UE 1830 may insert an error message into error handling 2346 and may send the error to a device identified by information in destination ID 2342.

APIs 2300 and 2305 are exemplary and exemplary embodiments may include more APIs, fewer APIs, or APIs in configurations that differ from those of FIGS. 23A and 23B. In addition, APIs used with exemplary embodiments may include more fields, fewer fields, or fields arranged in orders that differ from the ordering of fields in FIGS. 23A and 23B.

Exemplary User Interfaces

Figure 24:
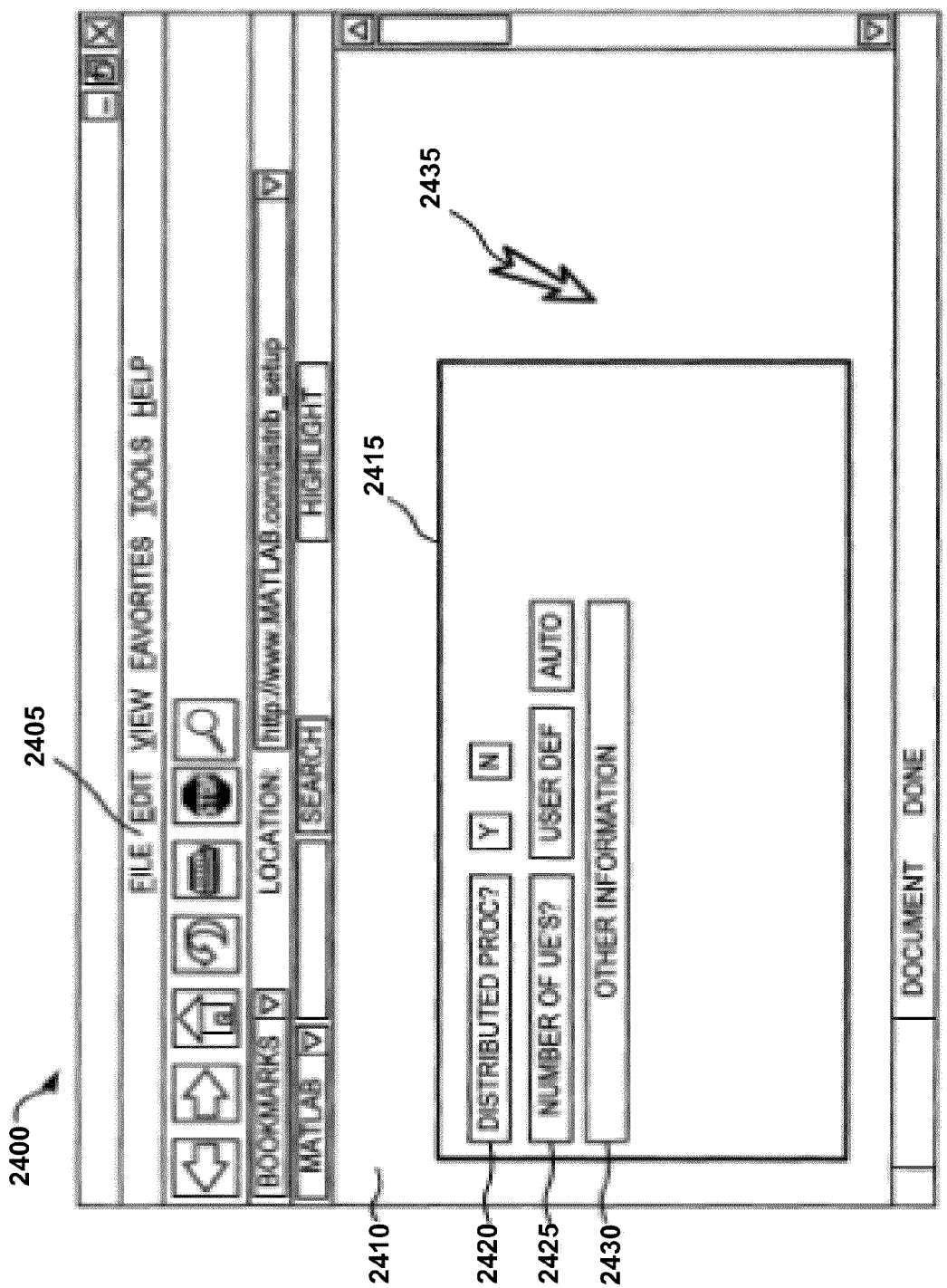
FIG. 24 illustrates an exemplary user interface that can be used to display information to a user in an exemplary embodiment.

FIG. 24 illustrates an exemplary user interface 2400 that can be used to display information to a user in an exemplary embodiment. Interface 2400 and/or other interfaces described herein may be a graphical user interface (GUI) or a non-graphical user interface, such as a text based interface. User interface 2400 and/or other user interfaces described herein may further provide information to users via customized interfaces (e.g., proprietary interfaces) and/or interfaces that are generally known to those of skill in the art (e.g., browser-based interfaces). User interfaces described herein, may receive user inputs via input devices, such as but not limited to, keyboards, pointing devices (e.g., a mouse, stylus, trackball, touchpad, joystick, other types of motion tracking devices, etc.), biometric input devices, touch sensitive displays, microphones, etc. User interfaces described herein may be user configurable (e.g., a user may change the size of the user interface, information displayed in a user interface, color schemes used by the user interface, positions of text, images, icons, windows, etc., in the user interface, etc.) and/or may not be user configurable.

Interface 2400 may be displayed to a user via display 1850, output device 2070, etc., and may include menu 2405, display area 2410, information window 2415, selection field 2420, UE's field 2425, other information field 2430, and cursor 2435. Menu 2405 may include information associated with menus that are accessed by the user. For example, in one embodiment, menu 2405 my identify items, such as File, Edit, View, etc., that can be selected by a user (e.g., via cursor 2435) to open one or more drop down menus. Drop down menus may provide the user with substantially any number of items that can be selected by the user to invoke various types of functionality on the user's behalf. For example, selecting File may open a drop down menu that includes Open, Close, Save, Save As, Print, Print Preview, etc. Interface 2400 may further include icons that let the user perform actions, such as moving to a previous display, returning to a home display (or page), printing the contents of a portion of interface 2400, etc.

Display area 2410 may include a portion of interface 2400. For example, display area 2410 may include a portion of interface 2400 that is located below menu 2405. Display area 2410 may, or may not, be defined by a border (e.g., a boundary).

Information window 2415 may include a portion of display area 2410 that is used to display information to a user, such as information about UE 1830. Information window 2415 may display text or graphics to the user. For example, information window 2415 may display information about UE 1830, a status of a parallel processing task, a text editor that allows the user to modify source code, debugging information that allows the user to diagnose code, a dashboard to show a user the operating status of processors 1835, etc. In one embodiment, information window 2415 may include selection field 2420, UE's field 2425, and other information field 2430.

Selection field 2420 may include information related to a user's selection regarding parallel processing. For example, selection field 2420 may allow a user to select whether his/her application should be processed in a parallel manner. In one embodiment, the user may select "yes" to have an application, problem, etc., processed in a parallel manner or "no" to have the application, problem, etc., processed on a single device. In another embodiment, selection field 2420 may be omitted and a system, such as client 1810, may determine whether parallel processing should be used without obtaining input from the user.

UE's field 2425 may include information about a number of UE's that will be used to perform parallel processing on behalf of a user or device. For example, UE's field 2425 may allow a user to specify a number of UE's, processors, clusters, grids, etc., that should be used to perform parallel processing on behalf of the user. Alternatively, the user may decide to let a device, such as client 1810, UE 1830 and/or remote controller 1840 determine how many UE's, processors, clusters, grids, etc., should be used to perform parallel processing.

Other information field 2430 may include other types of information that can be used with system 1800, 1802, 1803, etc. For example, other information field 2430 may include information about a data file that will be processed by UE 1830, information about code that will be used to perform parallel processing, information about a drive on which results of parallel processing will be stored, etc.

Cursor 2435 may include a mechanism that can be positioned by a user or device to identify information in interface 2400. Cursor 2435 may be positioned within interface 2400 via a pointing device, a spoken command, a keyboard input, etc.

Figure 25:
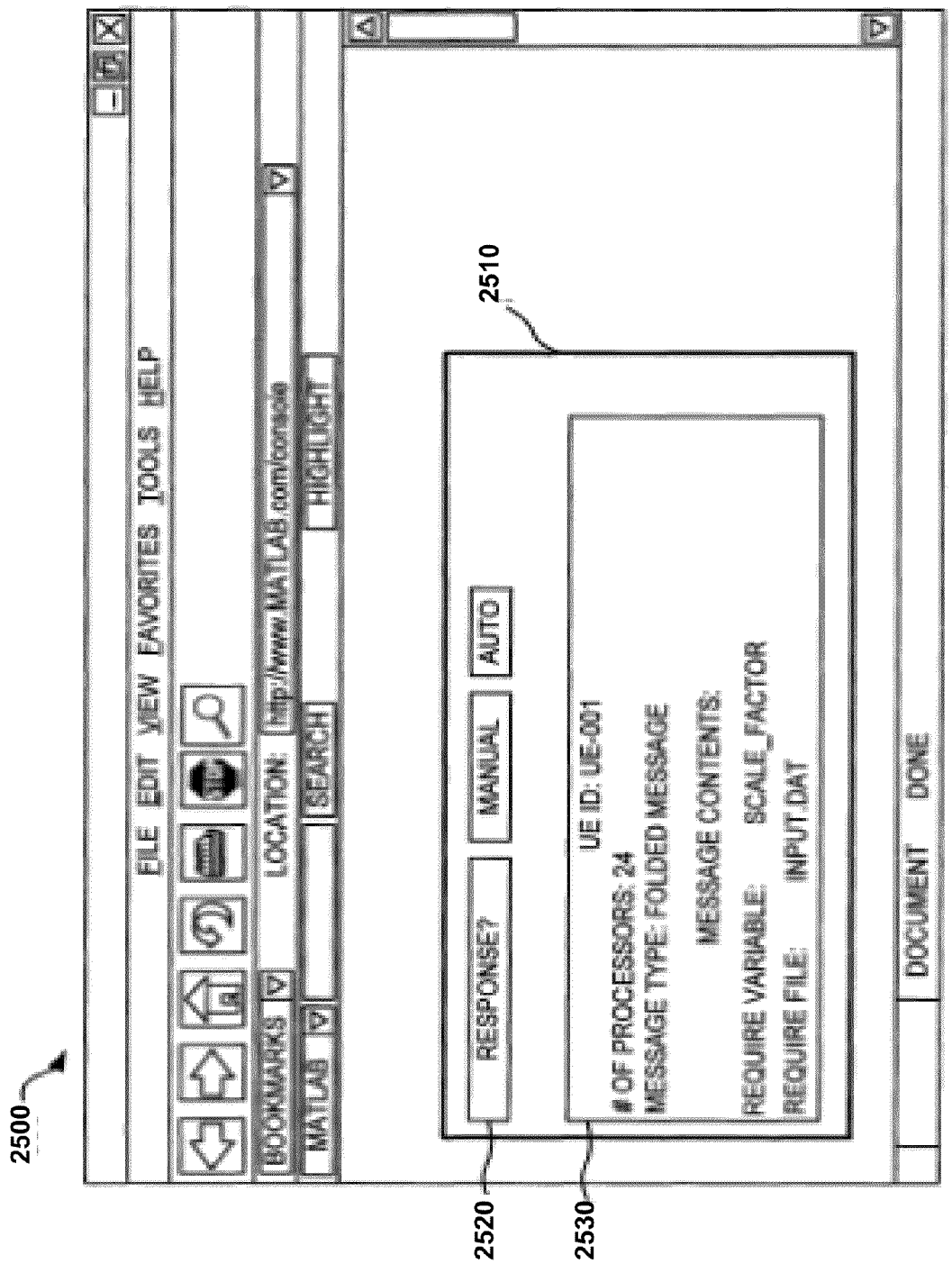
FIG. 25 illustrates an exemplary user interface that can be used to display bi-directional communication information received from a unit of execution.

FIG. 25 illustrates an exemplary user interface 2500 that can be used to display bi-directional communication information received from a parallel processing device. In one embodiment, interface 2500 may include window 2510, response field 2520, and message 2530.

Window 2510 may include a portion of interface 2500 in which bi-directional messages may be displayed to a user. For example, window 2510 may have a border within which one or more bi-directional messages are displayed. Information displayed in window 2510 may be interactive in that a user may respond to displayed information, may edit displayed information, etc. In one embodiment, window 2510 may be a pop-up dialog window that opens on display 1850 when a message is received at client 1810 from UE 1830. In one embodiment, window 810 may include response field 2520 and message 2530.

Response field 2520 may include information that identifies how bi-directional messages should be responded to. For example, response field 2520 may allow a user to specify that bi-directional messages received from UE 1830 should be manually responded to by the user or should be automatically responded to by client 1810. Selecting manual in response field 2520 may require that a user acknowledge messages received from UE 1830 before parallel processing can continue. For example, UE 1830 may send a message to client 1810 requesting a variable. A user may have to respond to the message by typing in a name or other information about the variable before UE 1830 can continue parallel processing. In contrast, client 1810 may automatically provide the variable name or other information to UE 1830 without requiring user interaction when "auto" is selected in response filed 2520.

Message 2530 may include information received from UE 1830 and/or another device that performs parallel processing activities. In one embodiment, message 2530 may include information that identifies a device that sent the message, e.g., UE 001, information about a number of processors operating on a task associated with client 1810, or a user thereof, information identifying a type of message (e.g., information indicating that a message is a folded message that includes information related to two or more other messages (e.g., two or more un-folded messages)). Message 2530 may further include information, such as message contents, about items that are needed by parallel processing devices, such as variable names, file names, constants, permissions, additional memory, etc.

Figure 26:
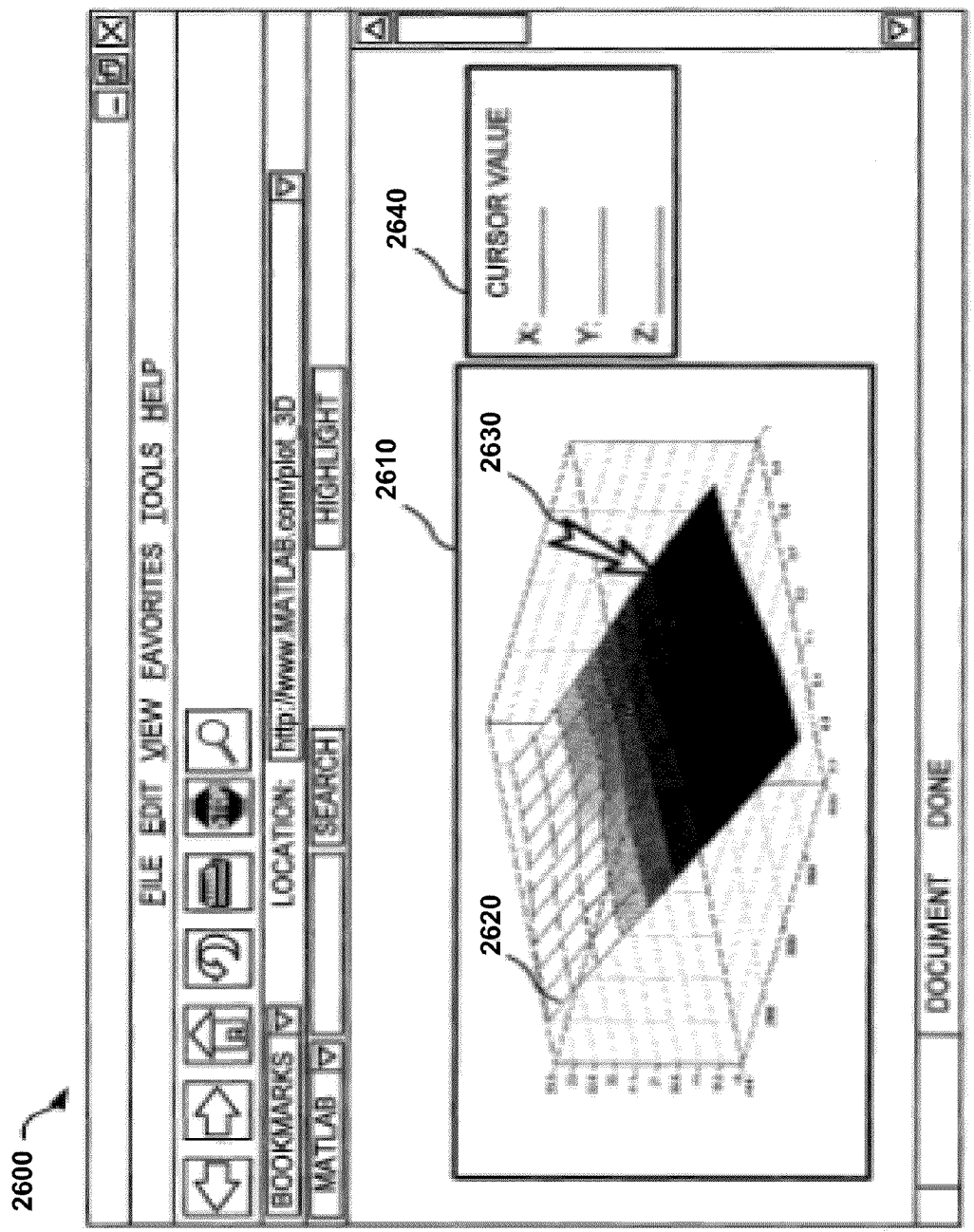
FIG. 26 illustrates an exemplary user interface that can be used to display a result that is received at a client device from a unit of execution.

FIG. 26 illustrates an exemplary user interface 2600 that can be used to display a result that is received client 1810 from a parallel processing device, such as UE 1830. Interface 2600 may display textual and/or graphical results to a user. For example, interface 2600 may include window 2610, plot 2620, cursor 2630 and cursor value 2640.

Window 2610 may include a portion of interface 2600 that is used to display a result to a user. For example, client 1810 may send a problem to UE 1830, and UE 1830 may perform parallel processing on the problem using processors 1834. UE 1830 may receive results from processors 1835 and may assimilate the results into a final, or aggregate, result. UE 1830 may send the result to client 1810 and client 1810 may display the result to a user via window 2610. In one implementation, window 2610 may include a three dimensional plot 2620 of a surface. A user may move cursor 2630 over the surface and cursor window 2640 may display information related to the position of cursor 2630. For example, cursor window 2640 may display x, y, and z coordinates that are related to the position of cursor 2630. Embodiments of interface 2600 may provide allow a user to interact with results displayed in window 2610.

Exemplary Processing

Figure 27:
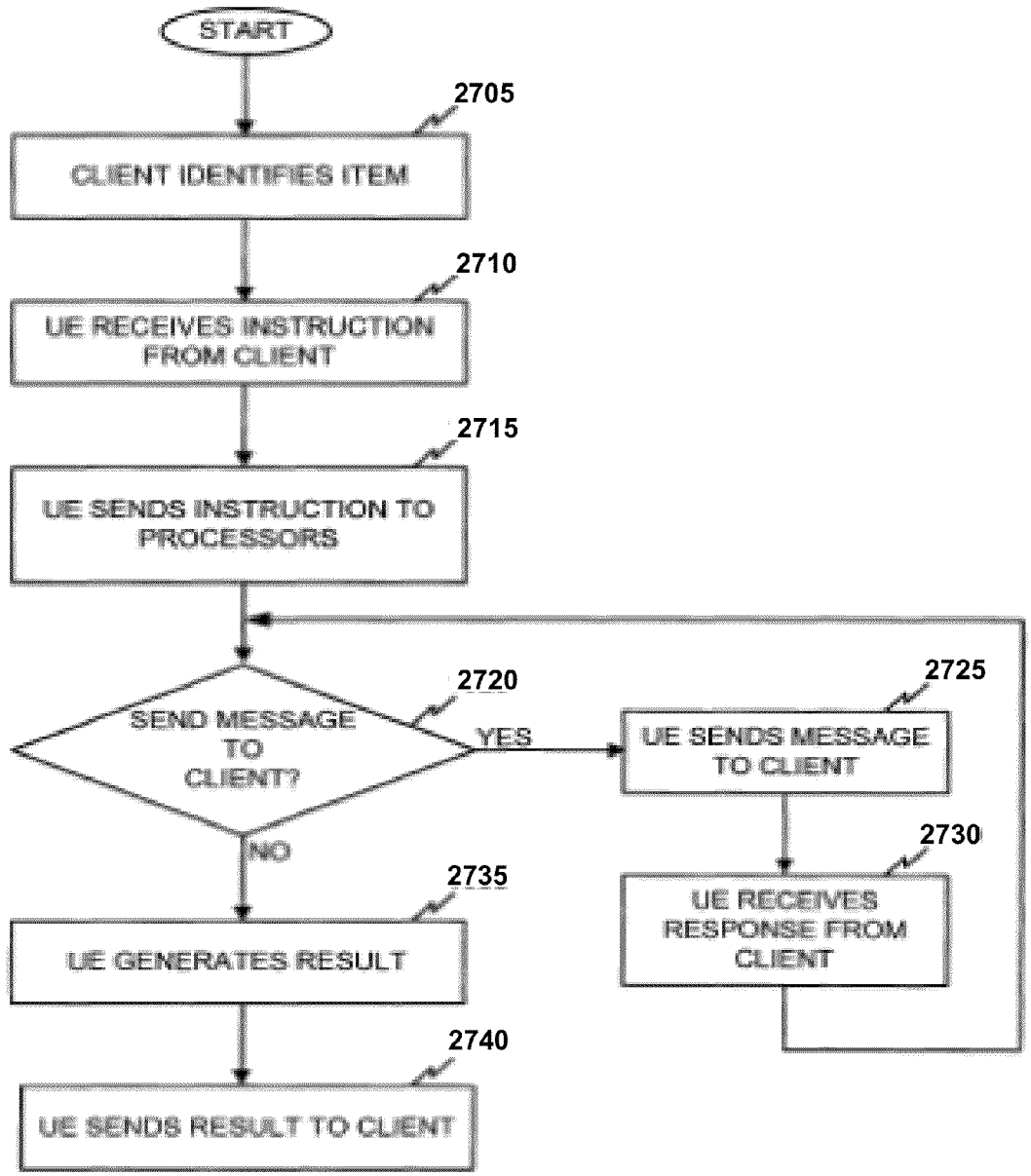
FIG. 27 illustrates a flow chart showing exemplary processing that can be used with an exemplary embodiment.

FIG. 27 illustrates a flow chart showing exemplary processing that can be used with an exemplary embodiment. The acts discussed in connection with FIG. 27 are illustrative. Other implementations may include more acts, fewer acts, or acts illustrated in FIG. 27 in an order that differs from the ordering shown in FIG. 27. Client 1810 may identify an item that can be processed using more than one processing device (act 2705). For example, client 1810 may identify a model that can benefit from being run in a parallel environment, such as by being run on a number of processors operating in parallel. In one embodiment, client 1810 may determine that UE 1830 can run the model in parallel. In another embodiment, client 1810 may send the problem or a request to remote controller 1840 or service provider 1880 and remote controller 1840 or service provider 1880 may determine whether parallel processing should be performed.

UE 1830 may receive an instruction from client 1810 (act 2710). For example, UE 1830 may receive an instruction that identifies the model and that may include data for the model. In one embodiment, client 1810 may send the instruction to UE 1830 using data structure 2200 (FIG. 5A) and/or API 2300. UE 1830 may evaluate the instruction and may investigate to determine whether adequate resources are available on UE 1830 to perform the parallel processing. In one embodiment, UE 1830 may operate with other devices, such as remote controller 1840 and/or other UE's/clusters to obtain resources when UE 1830 does not have adequate resources residing thereon.

UE 1830 may process the instruction alone or may obtain assistance from other devices to process the instruction. For example, client 1810 may assist UE 1830 with processing the instruction, such as by providing a password, a variable, a file, etc., to UE 1830. In one implementation, UE 1830 may ask client 1810 if UE 1830 can proceed with running the model after UE 1830 make an initial determination with respect to resources required to run the model.

UE 1830 may send information related to the instruction to processors 1835 (act 2715). For example, UE 1830 may have four processors that operate in parallel, such as processors 1835-1, 1835-2, 1835-3, and 1835-4. UE 1830 may divide the model into four portions and may send one portion to each available processor.

UE 1830 may determine whether it needs to send a message to client 1810 (act 2720). For example, processors 1835 may begin running the model using the data received from client 1810. While running the model, one or more processors 1835 may determine that it needs additional data, where the additional data resides on client 1810. UE 1830 may send a message to client 1810 requesting the additional data (act 2725). The message may cause a pop-up dialog window to open on display 1850. For example, window 2510 may be displayed on display 1850. A user of client 1810 may need to interact with the pop-up window in order for client 1810 to respond to the message. Client 1810 may process the message and may retrieve the requested data from storage logic 1940 and/or storage device 2050. For example, the user may need to click "OK" via a pointing device to allow client 1810 to retrieve the data.

UE 1830 may receive the requested data from client 1810 via a response (act 2730). UE 1830 may make the data available to processors 1835 so that processors 1835 can continue running the model. When UE 1830 determines that it does not have to send a message to client 1810 (act 2720), processors 1835 may continue running the model. Processors 1835 may each generate a portion of a final result and may provide the respective portions to UE 1830. UE 1830 may assemble the portions into a final result (2735).

UE 1830 may send the final result to client 1810 (act 2740). In one embodiment, UE 1830 may send the result to client 1810 via data structure 2201 and/or API 2305. Client 1810 may process data structure 2201 and may extract the result therefrom. Client 1810 may, or may not, perform additional processing on the result. Client 1810 may store the result in a file, make the result available to a user via display 1850, print the result, make the result available to another software application running on client 1810, make the result available to another device, such as specialized hardware 1860, etc.

In one embodiment, UE 1830 may return a value to client 1810 instead of an instruction and/or result. In another embodiment, UE 1830 may send a command, such as a plot command, to client 1810 along with a data set, where the plot command and the data set make up the result. Client 1810 may display the data via user interface 2600 in response to the plot command. For example, client 1810 may operate as a dumb terminal when UE 1830 sends a plot command and a data set to client 1810.

Exemplary Alternative Embodiments

Many alternative embodiments are possible based on the foregoing description. For example, a first alternative embodiment may include a client 1810 that includes a configuration (e.g., an operating system) that is vastly different from a configuration on UE 1830. Client 1810 may send a parallel processing request to UE 1830 along with data to be processed. UE 1830 may determine that its configuration is so different from the configuration of client 1810 that UE 1830 cannot perform the requested operation on the data. UE 1830 may send a request to client 1810 for resources to allow UE 1830 to perform the requested operation. For example, UE 1830 may request that client 1810 allow UE 1830 to assume remote control of client 1810 to allow UE 1830 to perform parallel processing using resources on UE 1830 and resources on client 1810 simultaneously. Alternatively, UE 1830 may request that client 1810 send portions of operating system code to UE 1830, where the requested portions will allow UE 1830 to perform the requested operation.

A second alternative embodiment may include a client 1810 that operates with a first UE and a second UE. Client 1810 may send an instruction and data to both UE's and may have the UE's perform parallel processing independently (e.g., without having the first and second UE share results). Client 1810 may further instruct the first UE to begin processing at a determined time before the second UE starts its processing so that processing on the first UE is ahead of processing on the second UE. Client 1810 may further instruct the first UE to notify client 1810 and/or the second UE if the first UE encounters an error, such as a fatal processing error. The notification may be designed to allow the second UE to stop its processing before hitting the instruction or operation that caused the error. Alternatively, the notification may cause the second UE to turn on monitoring and/or diagnostic logic to determine what instruction or operation caused the fatal error. Operating UE's with an offset may allow errors in code to be quickly and accurately identified and/or may allow partial results to be saved before the error is encountered on the later running UE (e.g., the second UE in the example above).

A third alternative embodiment may allow a UE to advertise its capabilities to one or more clients. Clients may process the advertised information and may select the UE based on the advertised information when the UE is available. A selected UE may perform parallel processing on behalf of one or more clients using bi-directional communication as described in connection with the figures hereinabove.

A fourth alternative embodiment may include a real-time testing environment that includes a client and a number of UE's. The UE's may further be configured with various types of hardware, such as specialized test hardware. The client may select a particular UE based on the type of real-time testing that is being performed. For example, a first UE may have a first test device attached thereto. The client may send an instruction and/or data to the first UE when the client desires to have real-time testing performed on the first test device. Real-time test environments may include other types of hardware, such as target devices and/or code generators for creating code that can be run on the target devices. The client and the selected UE may exchange bi-directional messages while the UE performs real-time testing on behalf of the client.

A fifth alternative embodiment may implement TCE 1815 using one or more text-based products. For example, a text-based TCE 1815, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. The text-based TCE may support one or more commands that support parallel processing using one or more UE's 1830.

A sixth alternative embodiment may implement TCE 1815 in a graphically-based TCE 1815 using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment. The graphically-based TCE may support parallel processing using one or more UE's 1830.

A seventh alternative embodiment may be implemented in a language that is compatible with a product that includes a TCE, such as one or more of the above identified text-based or graphically-based TCE's. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the product may use the MATLAB commands to perform parallel processing using one or more UE's 1830.

An eighth alternative embodiment may be implemented in a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards to monitor UE 1830, etc.).

A ninth alternative embodiment may employ a copy of TCE 1815 on both client 1810 and UE 1830, where the TCE's allow workspace sharing. For example, client 1810 may maintain a first workspace with a copy of TCE 1815 running on client 1810 and UE 1830 may maintain a second workspace with a copy of TCE 1815 running thereon. Client 1810 may create variables in the first workspace and UE 1830 may request the variables from the first workspace and may store the variables in the second workspace when performing parallel processing. UE 1830 may further make variables in the second workspace available to another UE 1830, client 1810, remote controller 1840, etc., to further facilitate parallel processing on behalf of client 1810 and/or another device. Alternatively, only client 1810 may have a workspace, and client 1810 may communicatively couple the workspace to UE 1830 so that UE 1830 can access information therein.

A tenth alternative embodiment may use pointers to facilitate sharing information, such as variables, between client 1810 and UE 1830. For example, a pointer may link a variable in a workspace on client 1810 to one or more processors 1835 operating in UE 1830. A processor, such as processor 1835-1, may request the variable using the pointer when the variable is needed to perform an operation on UE 1830. UE 1830 and client 1810 may exchange variables with each other and/or with other devices using pointers. The use of workspaces and/or pointers may allow client 1810 and/or UE 1830 to operate with nested functions by passing variables between workspaces on client 1810, UE 1830 and/or workspaces on other devices.

An eleventh alternative embodiment may perform parallel processing for a model on client 1810. For example, client 1810 may run a Simulink model that includes a number of subsystems. Client 1810 may parse the model based on the subsystems and may send a first subsystem to a first UE and may send the second subsystem to a second UE, where the first and second UE's are each configured as MATLAB-UE's (e.g., by running a version of MATLAB on each UE). The first and second UE's may process their respective subsystems and may request variables from client 1810 or from other devices (e.g., from other UE's). For example, client 1810 may have a sharable workspace that is communicatively coupled to the first and second UE to allow the UE's access to variables needed to perform processing. The first and second UE's may each produce a result file that is sent back to client 1810, where client 1810 combines the files and performs a compilation operation to compile the model. Alternatively, the first and second UE's may send the result files to a third UE, where the third UE combines the result files and compiles the model on behalf of client 1810.

A twelfth alternative embodiment may perform parallel processing using stream processing techniques. For example, a first UE may perform code generation for a model received from client 1810. The first UE may send a result to a second UE and the second UE may perform a portion of a build operation on the generated code. The second UE may send its result to a third UE that performs a compile operation on the result received from the second UE. The third UE may generate a result that includes the compiled code and may send the result to client 1810.

A thirteenth alternative embodiment may perform parallel processing on behalf of a client using one or more commercial computing grids. For example, client 1810 may send a request for parallel processing to a server that operates with a commercial computing grid, where the commercial computing grid provides parallel processing resources to clients for a fee (e.g., a fee based on an amount of processing resources used by client 1810). The commercial computing grid may contain one or more clusters that can be associated with one or more providers (e.g., computing service providers). Client 1810 may rent time (e.g., during a rental period) on the grid and may perform parallel processing during the rental period. For example, client 1810 may exchange bi-directional messages with one or more clusters within the grid, one or more devices within a cluster, etc., during the rental period. Rented resources may request state information from client 1810 (e.g., information about available memory, information about variables, information about programming code, information about functions, etc.). Rented resources may also task client 1810 to perform operations (e.g., processing activities, sending information, etc.) on behalf of the rented resources. For example, a device in a cluster may request that client 1810 perform processing to convert a data value from a first format to a second format before client 1810 sends the data value to the requesting device. Client 1810 and the cluster(s) used to perform parallel processing on behalf of client 1810 may operate in a homogeneous or heterogeneous configuration depending on particular implementations used to perform parallel processing.

A fourteenth alternative embodiment may run a technical computing environment that includes MATLAB on client 1810 and on UE 1830. Client 1810 may send MATLAB instructions (e.g., code, files, function handles, etc.), MATLAB-compatible instructions (e.g., an instruction that is in a non-MATLAB language but that can be recognize and executed in MATLAB), and/or other types of instructions to UE 1830 for processing thereon. UE 1830 may in turn send MATLAB instructions, MATLAB-compatible instructions, and/or other types of instructions to client 1810 for processing thereon. For example, UE 1830 may ask client 1810 to evaluate a MATLAB function and to pass a result back to UE 1830, where UE 1830 uses the result to perform parallel processing on behalf of client 1810.

A fifteenth alternative embodiment may use parallel processing resources (e.g., UE's 1830) to perform optimizations for client 1810. For example, client 1810 may request that UE 1830 evaluate an expression to determine whether the expression can be optimized. UE 1830 may send a request to client 1810 for additional information (e.g., may request that client 1810 provide state information to UE 1830), may request that client 1810 perform a portion of the processing, etc., while UE 1830 operates on the optimization problem. UE 1830 may provide a result to client 1810 that includes an optimized expression. Client 1810 may use the optimized expression in an application to produce a useful and/or tangible result for a user of client 1810 and/or a device associated with client 1810.

In a sixteenth alternative embodiment, a first UE can act as a client with respect to a second UE, a third UE, etc. For example, client 1810 may request that the first UE perform parallel processing. Client 1810 and the first UE may exchange bi-directional messages while the first UE performs parallel processing. The first UE may determine that it can use additional parallel processing resources from a second UE and a third UE. The first UE may perform bi-directional communication with the second UE and the third UE to allow the second UE and third UE to assist the first UE with performing parallel processing on behalf of client 1810. Configurations can include substantially any number of clients and UE's arranged in any type of hierarchical relationship without departing from the spirit of the invention.

In a seventeenth alternative embodiment, client 1810 may use UE 1830 to perform parallel processing. Client 1810 may send a problem to UE 1830 for processing. Client 1810 may attempt to anticipate the types of information that UE 1830 will request while performing processing. For example, client 1810 may anticipate that UE 1830 will request a function call and a list of variables. Client 1810 may send the function call and list of variables to UE 1830 before UE 1830 sends a request for the function call and list of variables to client 1810. In this embodiment, client 1810 sends a speculative response to UE 1830 before UE 1830 sends a query to client 1810. The use of speculative responses can reduce the number of message exchanges that occur between client 1810 and UE 1830.

In an eighteenth alternative embodiment, client 1810 can communicate with UE 1830 using communication layers that may include message passing interface (MPI) libraries and/or socket libraries. For example, when UE 1830 is installed on client 1810, messages exchanged between client 1810 and UE 1830 may occur via shared memory communication. In contrast, communication may take place over a TCP/IP connection when client 1810 and UE 1830 do not reside on a single device. The communication layers can be adapted to operate with any of a number of networking protocols and/or over types of networks, such as, but not limited to, ad hoc wireless networks, quantum networks, etc.

Still other alternative implementations are possible consistent with the spirit of the invention.

Embodiments described herein produce useful and tangible results. For example, tangible results (e.g., results that can be perceived by a human) can be produced when a result is displayed to a user, when a device makes a sound, vibrates, performs an operation (e.g., moves, interacts with a person, etc.), etc. Useful results may include storage operations, transmission operations (e.g., sending information or receiving information), display operations, displacement operations, etc. Tangible and/or useful results may include still other activities, operations, etc., without departing from the spirit of the invention.

CONCLUSION

Implementations described herein may provide a parallel programming interface for a program for execution. For example, in one implementation, the parallel programming interface may analyze the program, may generate one or more program portions based on the analysis of the program, and/or may specify a behavior of a segment and/or all of the one or more portions. The parallel programming interface may dynamically allocate the one or more portions to one or more software units of execution (UEs), and/or may forward the one or more software UEs to one or more hardware UEs for execution. The parallel programming interface may receive one or more results associated with the one or more portions from the software UEs, and may provide the one or more results to the program.

The foregoing description of implementations provides illustration and description, but is not intended to be exhaustive or to limit the invention to the precise form disclosed. Modifications and variations are possible in light of the above teachings or may be acquired from practice of the invention.

For example, while series of acts has been described with regard to FIGS. 14-19, the order of the acts may be modified in other implementations. Further, non-dependent acts may be performed in parallel.

Also, the term "user" has been used herein. The term "user" is intended to be broadly interpreted to include a client or a user of a client.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving an instruction associated with an application;
commencing parallel processing, associated with the application, using a unit of execution,
the unit of execution operating with one or more other units of execution when performing the parallel processing associated with the application;
sending a query to a destination,
the query being:
related to the parallel processing,
sent after the unit of execution has commenced parallel processing, and
sent from the unit of execution;
receiving an answer to the query,
the answer being:
associated with the query,
received at the unit of execution, and
received after the query is sent;
modifying the parallel processing when the answer is received, the modifying being:
related to the instruction, and
based on the answer; and
generating a result using the unit of execution,
the result including at least one of:
executable code, or
data generated by the unit of execution,
the receiving the instruction, the commencing, the sending, the receiving the answer, the modifying, and the generating being performed by one or more computers.

2. The method of claim 1, where the unit of execution is a hardware unit of execution.

3. The method of claim 1, where the application operates on a client device.

4. The method of claim 3, where the instruction is received from a device that is remote with respect to the client device.

5. The method of claim 1, where the destination is the application, a device remote with respect to the application, a remote application, or a file system.

6. The method of claim 5, where the remote device or the remote application generates the answer to the query.

7. The method of claim 1, where the query includes a message.

8. The method of claim 7, where the message includes particular executable code.

9. The method of claim 8, where the particular executable code implements a function.

10. The method of claim 1, where the query requests graphics processing unit (GPU) resources.

11. The method of claim 10, where the GPU resources are used to generate the result on behalf of the unit of execution or in conjunction with the unit of execution.

12. A method comprising:
receiving an instruction;
participating in parallel processing,
the parallel processing operating on the instruction using a plurality of workers;
sending a query to a licensing manager,
the query being sent once the parallel processing has begun on the instruction,
the query identifying additional information, and
the additional information being used to facilitate completing the parallel processing on the instruction;
receiving an answer from the licensing manager,
the answer indicating whether a worker is allowed to participate in the parallel processing of the instruction;
continuing with the parallel processing of the instruction using the worker when the answer indicates that the worker is authorized to participate in the parallel processing; and
generating a result based on the parallel processing,
the result including at least one of:
executable code, or
data generated during the parallel processing,
the receiving the instruction, the participating, the sending, the receiving the answer, the continuing; and the generating being performed by one or more computers.

13. The method of claim 12, further comprising:
receiving a file, particular executable code, a variable, a pointer, a link, or an address based on processing the query,
where the receiving the file, the executable code, the variable, the pointer, the link, or the address is performed by the licensing manager.

14. The method of claim 13, further comprising:
providing the received file, the particular executable code, the variable, the pointer, the link, or the address in the answer, where the providing is performed by the licensing manager.

15. The method of claim 14, where:
the instruction is associated with an application operating at a first destination, and
the licensing manager receives the file, the particular executable code, the variable, the pointer, the link, or the address from a second destination.

16. The method of claim 13, further comprising:
forwarding at least a portion of the query to a destination, where the forwarding is performed by the licensing manager, and
where the receiving the file, the particular executable code, the variable, the pointer, the link, or the address occurs in response to the forwarded at least a portion of the query.

17. The method of claim 16, where the destination operates on behalf of an application that generated the instruction.

18. The method of claim 12, where the query is sent based on a determination that additional resources are needed to complete the parallel processing of the instruction.

19. The method of claim 12, where the query is generated by one of the plurality of workers on behalf of another of the plurality of workers.

20. A device comprising:
one or more processors to:
receive an instruction associated with an application;
commence parallel processing, associated with the application, using a unit of execution,
the unit of execution operating with one or more other units of execution when performing the parallel processing associated with the application;
send a query to a destination,
the query being:
related to the parallel processing,
sent after the unit of execution has commenced parallel processing, and
sent from the unit of execution;
receive an answer to the query,
the answer being:
associated with the query,
received at the unit of execution, and
received after the query is sent;
modify the parallel processing when the answer is received, the modifying being:
related to the instruction, and
based on the answer
generate a result using the unit of execution,
the result including at least one of:
executable code, or
data generated using the unit of execution.

* * * * *